(12) United States Patent  (10) Patent No.: US 7,894,710 B2
Kawakami et al.  (45) Date of Patent: Feb. 22, 2011

(54) RECORDING AND REPRODUCTION APPARATUS AND RECORDING AND REPRODUCTION METHOD

(75) Inventors: Yoshio Kawakami, Osaka (JP); Shigeaki Watanabe, Mount Laurel, NJ (US); Yuki Horii, Kyoto (JP)

(73) Assignee: Panasonic Corporation, Osaka (JP)

( * ) Notice: Subject to any disclaimer, the term of this patent is extended or adjusted under 35 U.S.C. 154(b) by 1162 days.

(21) Appl. No.: 11/420,982

(22) Filed: May 30, 2006

(65) Prior Publication Data

US 2006/0280444 A1  Dec. 14, 2006

Related U.S. Application Data

(60) Provisional application No. 60/752,887, filed on Dec. 23, 2005, provisional application No. 60/685,377, filed on May 31, 2005.

(51) Int. Cl.
*H04N 9/80* (2006.01)
(52) U.S. Cl. ..................... 386/248; 386/293
(58) Field of Classification Search .......... 386/46, 386/68, 95, 125, 126
See application file for complete search history.

(56) References Cited

U.S. PATENT DOCUMENTS 5,732,217 A * 3/1998 Emura ............... 725/90
7,046,911 B2 * 5/2006 Zimmerman et al. ..... 386/68

2004/0210949 A1 10/2004 Sugiura et al.
2005/0100321 A1 5/2005 Koudo et al.
2006/0078296 A1 4/2006 Takao
2006/0140091 A1 6/2006 Iwamoto et al.

FOREIGN PATENT DOCUMENTS

EP  0692123  6/2000
WO  2005/045840  11/2004

OTHER PUBLICATIONS

U.S. Appl. No. 11/383,816 to Hashimoto et al., which was filed May 17, 2006.
U.S. Appl. No. 11/420,639 to Horii, which was filed May 26, 2006.
U.S. Appl. No. 11/421,146 to Horii, which was filed May 31, 2006.

(Continued)

*Primary Examiner*—Huy T Nguyen
(74) *Attorney, Agent, or Firm*—Greenblum & Bernstein, PLC

(57) ABSTRACT

In the case where plural applications are executed at the same time, if each application instructs for different trick play to the same content, a difference is caused between an ideal reproduction state expected by each application and an actual reproduction state. The present invention makes it possible to keep the reproduction state unchanged as long as normal reproduction or trick play is not accepted, by including a moving picture trick play reproduction management unit which determines, in response to an instruction for one of normal reproduction and trick play, whether or not to accept, according to a rule, the instruction, and retains details specified by the instruction in the case of accepting the instruction, and a moving picture reproduction processing unit which reproduces a moving picture based on the details retained by the moving picture trick play management unit.

2 Claims, 38 Drawing Sheets

OTHER PUBLICATIONS

U.S. Appl. No. 11/421,126 to Hashimoto et al., which was filed May 31, 2006.
U.S. Appl. No. 10/596,107 to Hashimoto et al., which was filed May 31, 2006.
U.S. Appl. No. 11/349,955 to Horii et al., which was filed Feb. 9, 2006.
U.S. Appl. No. 11/421,145 to Suzuki et al., which was filed May 31, 2006.
U.S. Appl. No. 11/425,727 to Horii et al., which was filed Jun. 22, 2006.
ETSI ES 201 812 v1.1.1 (Dec. 2003), Digital Video Broadcasting (DVB); Multimedia Home Platform (MHP) Specification 1.0.3.
INTERACTIVETVWEB.COM: "OCAP Tutorial: The interactive TV Web," WWW.ARCHIVE.ORG, Dec. 12, 2004, retrieved from Internet: URL:http://web.archive.org/web/20041212174705/http://www.interactivetvweb.org/tutorial/ocap/applications.shtml.
Interactiveweb.com: "OCAP Tutorial: The interactive TV Web," www.interactiveweb.org, Sep. 14, 2005, XP002397928.
Cable Television Laboratories: "OpenCable Application Platform Specification: OCAP 1.0 Profile, OC-SP-OCAP1.0-I10-040305," www.Lydtv.com, [Online], Mar. 5, 2004, pp. 33-41, 53-66, and 133-137, retrieved from the Internet: URL:http://www.Lydtv.com/resource/OC-SP-OCAP1%5B1%5D.0-I10-040305.pdf [retrieved on Sep. 7, 2006].
Cable Television Laboratories: "OpenCable Application Platform Specification: OCAP Digital Video Recorder (DVR), OC-SP-OCAP-DVR-I02-050524," www.opencable.com, [Online], May 24, 2005, pp. 1-20, XP002397927 retrieved from the Internet: URL:http://www.opencable.com/downloads/specs/OC-SP-OCAP-DVR-I02-050524.pdf [retrieved on Sep. 6, 2006].
DVB Project and Cable Television Laboratories Inc.: "DVB Document A088; Digital Recording Extension to Globally Executable MHP (GEM)," www.mhp.org [Online], Apr. 2005, XP002397929, retrieved from the Internet: URL:http://www.mhp.org/mhp_technology/other_mhp_documents/a088rev1_cmp_rev0.pdf [retrieved on Sep. 5, 2006].
European Broadcasting Union, "ETSI ES 201 812 v1.1.1 (Dec. 2003) (ETSI Specification): Digital Video Broadcasting (DVB); Multimedia Home Platform (MHP) Specification 1.0.3," pp. 787, 47-51, 61-103, and 295-328.
Cable Television Laboratories: "OpenCable Application Platform Specification: OCAP Digital Video Recorder (DVR), OC-SP-OCAP-DVR-I02-050524 (Issued Specification)," May 24, 2005, pp. 15-24.
Cable Television Laboratories: "OpenCable Application Platform Specification: OCAP Digital Video Recorder (DVR), OC-SP-OCAP-DVR-I01-040524 (Issued Specification)," May 24, 2004, pp. 11-20.
Cable Television Laboratories: "OpenCable Application Platform Specification: OCAP 1.0 Profile, OC-SP-OCAP1.0-I14-050119 (Issued Specification)," Jan. 19, 2005, pp. 47-52, 57-86, and 187-194.

* cited by examiner

FIG. 2

| Frequency band | Usage | Modulation technique |
|---|---|---|
| 5~130MHz | Out Of Band (OOB) Data exchange between head end and terminals | QPSK |
| 130~864MHz | In-band Normal television broadcast including video/audio | QAM |

FIG. 3

| Frequency band | Usage |
|---|---|
| 70~74MHz | Data transmission from head end 101 to terminal apparatuses |
| 10.0~10.1MHz | Data transmission from terminal apparatus A111 to head end 101 |
| 10.1~10.2MHz | Data transmission from terminal apparatus B112 to head end 101 |
| 10.2~10.3MHz | Data transmission from terminal apparatus C113 to head end 101 |

FIG. 4

| Frequency band | Usage |
|---|---|
| 150~156MHz | Television channel 1 |
| 156~162MHz | Television channel 2 |
| ⋮ | ⋮ |
| 310~311MHz | Radio channel 1 |
| ⋮ | ⋮ |

| Java program identifier 1901 | Control information 1902 | DSMCC identifier 1903 | Program name 1904 | Priority 1905 |
|---|---|---|---|---|
| 301 | autostart | 1 | /a/TopXlet | 100 |
| 302 | present | 1 | /b/GameXlet | 50 |

1911 → (row 1)
1912 → (row 2)

FIG. 23

| Recorded data identifier 2301 | Channel information 2302 | Storage information 2303 |
|---|---|---|
| 001 | Channel 1 | TS_001 |
| 002 | Channel 2 | TS_002 |

| Service type 2401 | Service identifier 2402 |
|---|---|
| Recorded content | 1 |
| Abstract service | 100 |

```
public void    setMediaTime(Time now)

public Time    setMediaTime()

public float   setRate(float factor)

public float   getRate()
```

FIG. 28

```
public void    start()

public void    close()
```

FIG. 43

```
Public boolean reserve()

Public void release()
```

FIG. 50

| Java program identifier 1801 | Control information 1802 | DSMCC identifier 1803 | Program name 1804 | Priority 1805 | |
|---|---|---|---|---|---|
| 301 | autostart | 1 | /a/TopXlet | 100 | 1 |
| 302 | present | 1 | /b/GameXlet | 50 | 0 |

RECORDING AND REPRODUCTION APPARATUS AND RECORDING AND REPRODUCTION METHOD

CROSS REFERENCE TO RELATED APPLICATIONS

This application claims the benefit of U.S. Provisional Applications No. 60/685,377, filed May 31, 2005, and No. 60/752,887, filed Dec. 23, 2005, the contents of which are herein incorporated by reference in their entirety.

BACKGROUND OF THE INVENTION (1) Field of the Invention

The present invention relates to a recording and reproduction apparatus which accumulates contents and reproduces the accumulated contents. In particular, the present invention relates to an exclusive trick play control system for use with the recording and reproduction apparatus for trick play processing.

(2) Description of the Related Art

Various contents are included in a broadcast wave sent from a broadcasting station. Aside from video and audio used in a normal television program, there are cases where data is included in the contents. There are several methods for sending the data, which can be roughly divided into a method of sending the data chronologically and a method of repeatedly sending the data per set interval. In the former method of sending the data chronologically, for example, data that continues of the course of time is sent in sequential order. This method is suitable for sending large amounts of data over a long period of time, but there is a drawback in that data which could not be received due to timing of the send cannot be received again. On the other hand, in the latter method of repeatedly sending the data at a set interval, the same data is repeatedly sent any number of times during a fixed period. This method has an advantage in that during the period when the same data is being sent, it is acceptable to receive any one of the repeatedly-sent pieces of data, and thus the timing of receiving is not limited.

For instance, data broadcast, represented by BML, and file sending through DSMCC data carousel are examples of this method. It is unknown, particularly in broadcast, when a recipient will select a channel and commence reception. In the method of sending the data chronologically, when the reception is commenced after the timing of the send and acquisition of the data fails, the data cannot be re-acquired. Therefore, when sending data such as an application program along with video and audio in the broadcast wave, the method of repeatedly sending the data per set interval is favorable.

At present, specifications for receiving a broadcast wave that includes video, audio, and an application program and executing the application program in synchronization with video and audio, as in the above method, have been developed, and are in operation. It is possible to receive the sent application program, load the application program in a terminal, and implement various additional functions by executing the loaded application program, rather than simply viewing the ordinary video and audio. This method for sending the application program and loading the application program in the terminal is also called "downloading". For example, a specification called Digital Video Broadcasting—Multimedia Home Platform (DVB-MHP) ETSI ES 201 812 V1.1.1 (2003-12) has been developed in Europe, and operations according to this specification have already commenced.

In addition, OCAP 1.0 (Open Cable Application Platform OC-SP-OCAP1.0-114-050119) specification, which provides the same specification in the cable broadcast environment in the United States, is being developed in the United States, and actually operations are set to commence in 2005. In these specifications, the application is written in the Java language. In the terminal, various types of Application Programming Interface (API) for tuning and graphics displaying are prepared so that the Java application can control those functions by calling the API.

In addition, in North America, the OCAP-DVR specification (OC-SP-OCAP-DVR-I01-040524), which is aimed at adding a function for recording and reproducing the contents in the OCAP specification, is being developed. This is for recording the content to be broadcast (such as video, audio, and an application) and further reproducing the recorded content as well as the content to be broadcast.

Moreover, with OCAP-DVR, trick play of contents is realized by recording broadcast contents to a high-speed random-accessible storage medium, such as a hard disk, a semiconductor memory, and the like. Here, the trick play refers to functions for reproducing the contents at an arbitrary speed, from an arbitrary position, and so on, such as fast-forward, rewind, slow-motion, pause, and skip. With OCAP-DVR, the application taken into the terminal from the broadcast wave can control the recording and trick play of contents by defining the API on the terminal for the recording and trick play. In particular, a Java Media Framework (JMF) is adopted for the trick play. The JMF is an API which is designed in Java language and used for controlling the reproduction of video and audio. The application can perform trick play by sending various instructions to a class called Player. Also, a technique for realizing the trick play is described in the Patent Reference "EP 0 692 123". Specifically, it is a method of easily manufacturing a reproduction apparatus (mainly software) which reproduces video and audio (contents). The method can easily realize a consistency between an original time axis of the content and a time axis actually used by the reproduction apparatus, by physically and conceptually integrating the concepts of time.

In the case where plural applications are executed at the same time, if each of the applications instructs, on the same content, to perform different trick play, a difference is caused between an ideal reproduction state intended by each application and an actual reproduction state.

This problem is obvious in the case where there are an application which is linked with a certain program and an application which is not linked with the program. For example, the application linked with the program knows optimum instruction timing of trick play of the program. While the application instructs to perform trick play at the optimum instruction timing, if the application which is not linked with the program sends a different instruction for trick play, an optimum trick play result cannot be obtained. In the case where the plural applications separately instructs, on the same video and audio, to perform trick play using the known technique represented by the JMF, a reproduction state unexpected by the application is created since each of the applications cannot prevent trick play instructions sent from other applications. As the result, unexpected operations and malfunctions of the applications are caused so that the optimum trick play result cannot be obtained.

SUMMARY OF THE INVENTION

In order to realize the aforementioned object, a recording and reproduction apparatus of the present invention is a recording and reproduction apparatus which receives and records a content included in a broadcast wave, and executes an application program included in a predetermined service in parallel with reproduction of the recorded content. The recording and reproduction apparatus includes: a storage unit in which the received content and the application program are stored; an execution unit which executes the application program; a reproduction unit which reproduces the content stored in the storage unit; and a reproduction speed control unit which receives a reproduction speed of the content requested by the application program, and controls a reproduction speed of the content to be reproduced by the reproduction unit so as to be in the received reproduction speed, wherein, in the case where there are a first application program which has requested the reproduction speed of the content already accepted as a normal reproduction and a second application program which requests a new reproduction speed, when receiving the new reproduction speed request, the reproduction speed control unit accepts the new reproduction speed request from the second application program.

Accordingly, a reproduction status cannot be changed as long as not receiving a trick reproduction. Therefore, an unexpected operation or malfunction of the application program can be prevented, and an optimum trick play result can be obtained. Consequently, it can be prevented the viewers from being confused.

Furthermore, in order to realize the aforementioned object, a recording and reproduction apparatus of the present invention is a recording and reproduction apparatus which receives and records a content included in a broadcast wave, and executes an application program included in a predetermined service in parallel with reproduction of the recorded content. The recording and reproduction apparatus includes: a storage unit in which the received content and the application program are stored; an execution unit which executes the application program; a reproduction unit which reproduces the content stored in the storage unit; and a reproduction speed control unit which receives a reproduction speed of the content requested by the application program, and controls a reproduction speed of the content to be reproduced by the reproduction unit so as to be in the received reproduction speed, wherein in the case where a first application program which has requested the reproduction speed of the content already accepted as a normal reproduction and a second application program which requests a new reproduction speed are different, when receiving the new reproduction speed request, the reproduction speed control compares a priority level of the first application program with a priority level of the second application program, and controls the reproduction speed of the content so as to be in a reproduction speed requested by the application with a higher priority level.

Accordingly, it can be prevented the application program with a low priority level from changing the reproduction status while an application program is changing the reproduction speed. Therefore, an unexpected operation or malfunction of the application program can be prevented, and an optimum trick play result can be obtained. Consequently, it can be prevented the viewers from being confused.

Furthermore, the reproduction speed control unit may determine whether or not the first application program and the second application program belong to different services by comparing information relating to an identifier of a service to which the first application program belongs with information relating to an identifier of a service to which the second application program belongs; and refuse a reproduction speed change request from the second application program, in the case where the second application program does not belong to the service of the first application program.

Accordingly, while an application program is changing the reproduction speed, only an application program which belongs to the same service as that application program can change the reproduction status.

Furthermore, the reproduction speed control unit may determine whether or not the first application program and the second application program belong to different services by comparing information relating to an identifier of a service to which the first application program belongs with information relating to an identifier of a service to which the second application program belongs; and in the case where the second application program belongs to the service of the first application program, when the priority level of the second application program is higher than the priority level of the first application program, control the reproduction speed of the content so as to be in the reproduction speed requested by the second application program.

Accordingly, it can be prevented the application program with a low priority level from changing the reproduction status while an application program is changing the reproduction speed.

Furthermore, in the case where the priority level of the first application program is same as the priority level of the second application program, the reproduction speed control unit may control the reproduction speed of the content so as to be in the reproduction speed requested by the second application program.

Accordingly, it can be prevented the viewers from being confused even in the case where two applications programs have the same priority level.

Furthermore, the reproduction speed of the content which has been already accepted having been requested by the first application program may be a reproduction speed which is different from the reproduction speed for a normal reproduction.

It should be noted that the present invention can be realized as the aforementioned recording and reproduction apparatus, the recording and reproduction method, a program, or as a recording medium for storing such program.

FURTHER INFORMATION ABOUT TECHNICAL BACKGROUND TO THIS APPLICATION

The disclosures of U.S. Provisional Applications No. 60/685,377 filed on May 31, 2005 and No. 60/752,887 filed on Dec. 23, 2005, each including specification, drawings and claims are incorporated herein by reference in their entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 2 shows an example of the usage of frequency bands used for communications between a head end and terminal apparatuses in the cable television system according to the present invention;

FIG. 3 shows an example of the usage of frequency bands used for communications between the head end and the terminal apparatuses in the cable television system according to the present invention;

FIG. 4 shows an example of the usage of frequency bands used for communications between the head end and the terminal apparatuses in the cable television system according to the present invention;

FIG. 23 shows an example of information stored in a primary storage unit 511 according to the present invention;

FIG. 24 shows an example of information stored in the primary storage unit 511 according to the present invention;

FIG. 27 is a diagram which shows a specific example of a moving picture generation speed management unit according to the present invention;

FIG. 28 is diagram which shows a specific example of a moving picture reproduction processing unit according to the present invention;

FIG. 43 is diagram which shows a specific example of recording reservation processing according to the sixth embodiment;

FIG. 50 is diagram which shows an example of an AIT according to the eighth embodiment;

DESCRIPTION OF THE PREFERRED EMBODIMENTS

Figure 1:
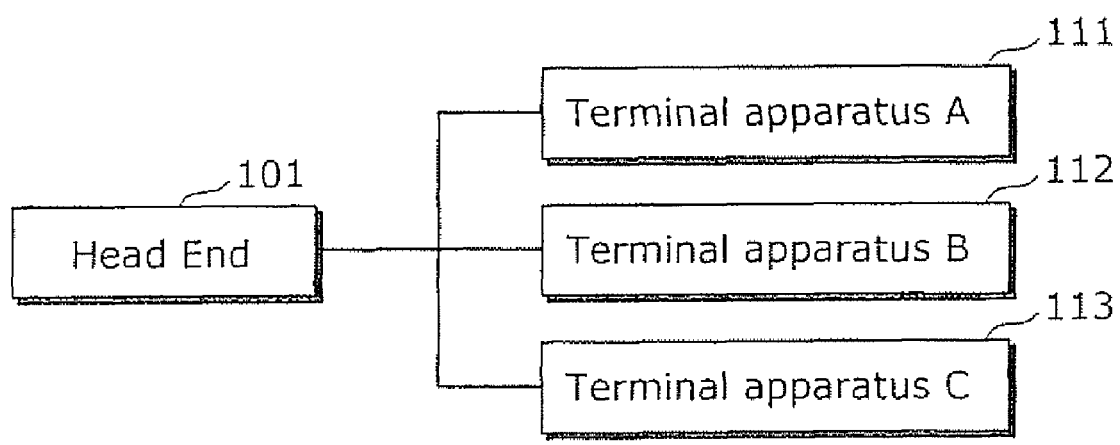
FIG. 1 is a diagram showing a structure of a cable television system according to a first embodiment of the present invention.

In order to overcome the conventional problems, the present invention includes: a moving picture trick play management unit which determines, in response to an instruction for one of normal reproduction and trick play, whether or not to accept, according to a rule, the instruction, and in the case of accepting the instruction, to retain details specified by the accepted instruction; and a moving picture reproduction processing unit which reproduces a moving picture based on the details retained by the moving picture trick play management unit. Accordingly, the reproduction status cannot be changed as far as not receiving one of normal reproduction and trick play.

Furthermore, the moving picture trick play management unit further accepts an instruction for one of normal reproduction and trick play from a program, and does not accept, while retaining the details specified by the accepted instruction, an instruction for one of normal reproduction and trick play from another program. Accordingly, it can be prevented that the reproduction status is to be changed by another program while a program is changing the reproduction speed.

Furthermore, the moving picture trick play management unit further accepts an instruction for one of normal reproduction and trick play from a program, and does not accept, while retaining the details specified by the accepted instruction, an instruction for one of normal reproduction and trick play from another program which belongs to a different category than the program. Accordingly, while the program is changing the reproduction speed, only program which belongs to the same category as the program can change the reproduction status.

Furthermore, the moving picture trick play management unit further accepts an instruction for one of normal reproduction and trick play from a program, and does not accept, while retaining the details specified by the accepted instruction, an instruction for one of normal reproduction and trick play from another program which belongs to a different service than the program. Accordingly, while the program is changing the reproduction speed, only program which belongs to the same service as the program can change the reproduction status.

Furthermore, the moving picture trick play management unit further accepts an instruction for one of normal reproduction and trick play from a program, and does not accept, while retaining the details specified by the accepted instruction, an instruction for one of normal reproduction and trick play from another program which has a different identifier than the program. Accordingly, while the program is changing the reproduction speed, only program which has the same identifier as that of the program can change the reproduction status.

Furthermore, the moving picture trick play management unit further accepts an instruction for one of normal reproduction and trick play from a program, and does not accept, while retaining the details specified by the accepted instruction, an instruction for one of normal reproduction and trick play from another program which has a lower priority level than the program. Accordingly, while the program is changing the reproduction speed, it can be prevented that the program having a lower priority level changes the reproduction status.

Furthermore, the moving picture trick play management unit further accepts an instruction for one of normal reproduction and trick play from a program, and does not accept, while retaining the details specified by the accepted instruction, an instruction for one of normal reproduction and trick play from another program which belongs to a different service and has a lower priority level than the program. Accordingly, while the program is changing the reproduction speed, only program which belongs to the same service and has a higher priority level as the program can change the reproduction status.

Furthermore, the moving picture trick play management unit further accepts only an instruction for one of normal reproduction and trick play from one or more predetermined programs. Accordingly, while the program is changing the reproduction speed, it can be prevented that a program that is different from a specific program changes the reproduction status.

Furthermore, the moving picture trick play management unit further accepts only an instruction for one of normal reproduction and trick play from one or more predetermined programs included in a content to be broadcast. Accordingly, while the program is changing the reproduction speed, it can be prevented that a program included in a content which is different from a specific content to be broadcast changes the reproduction status.

Furthermore, the moving picture trick play management unit further accepts only an instruction for one of normal reproduction and trick play from one or more predetermined programs included in a recorded content. Accordingly, while the program is changing the reproduction speed, it can be prevented that a program included in a content which is different from a specific content to be recorded changes the reproduction status.

Furthermore, the moving picture trick play management unit further accepts only an instruction for one of normal reproduction and trick play from one or more predetermined programs included in an abstract service. Accordingly, while the program is changing the reproduction speed, it can be prevented that a program included in a content which is different from a specific abstract service changes the reproduction status.

Furthermore, the moving picture trick play management unit further accepts only an instruction for one of normal reproduction and trick play from a program having an identifier within a certain range. Accordingly, while the program is changing the reproduction speed, only program having an identifier in certain range can change the reproduction status.

Furthermore, the present invention further includes a reservation management unit which manages a right to send an instruction for one of normal reproduction and trick play to the moving picture trick play management unit, wherein the moving picture trick play management unit accepts only an instruction for one of normal reproduction and trick play from a program having the right managed by the reservation management unit. Accordingly, it can be prevented that a program which does not have the right changes the reproduction status.

Furthermore, the moving picture trick play management unit further accepts an instruction for trick play from a program, and does not accept, while retaining details specified by the accepted instruction, an instruction for one of normal reproduction and trick play from another program. Accordingly, it can be prevented that, while the program is performing trick play, another program changes the reproduction status.

Furthermore, the present invention further includes a recording reservation management unit which provides, to a program which has instructed the moving picture reproduction processing unit to reproduce a moving picture, a right to give an instruction for trick play, and in the case where the program instructs the moving picture reproduction processing unit to stop the reproduction of the moving picture, to deprive the right to give an instruction for trick play, wherein the moving picture trick play management unit accepts only an instruction for one of normal reproduction and trick play from the program having the right managed by the reservation management unit. Accordingly, it can be prevented that, while the program which instructed content reproduction is performing trick play, another program changes the reproduction status.

Furthermore, the present invention further includes a recording reservation management unit which provides, to a program which has instructed the moving picture reproduction processing unit to reproduce a moving picture, a right to give an instruction for trick play, and in the case where the program instructs the moving picture reproduction processing unit to stop the reproduction of the moving picture, to deprive the right to give an instruction for trick play, wherein the moving picture trick play management unit accepts only an instruction for one of normal reproduction and trick play from a program in a service included in the program having the right managed by the reservation management unit. Accordingly, it can be prevented that, while the program which instructed content reproduction is performing trick play, another program changes the reproduction status.

Furthermore, the present invention further includes a moving picture selection unit which accepts an instruction for selection of a moving picture to be reproduced, to provide, to a program which has identified the moving picture to be reproduced, a right to give an instruction for trick play, and in the case where the program instructs to cancel the selection of the moving picture, to deprive the right to give an instruction for trick play, wherein the moving picture trick play management unit accepts only an instruction for one of normal reproduction and trick play from the program having the right managed by the moving picture selection unit. Accordingly, it can be prevented that, while the program which instructed selection of content to be reproduced is performing trick play, another program changes the reproduction status.

Furthermore, the present invention further includes a moving picture selection unit which accepts an instruction for selection of a moving picture to be reproduced, to provide, to a program which has identified the moving picture to be reproduced, a right to give an instruction for trick play, and in the case where the program instructs to cancel the selection of the moving picture, to deprive the right to give an instruction for trick play, wherein the moving picture trick play management unit accepts only an instruction for one of normal reproduction and trick play from a program in a service included in the program having the right managed by the moving picture selection unit. Accordingly, it can be prevented that, while the program which instructed content reproduction is performing trick play, another program changes the reproduction status.

It should be noted that the present invention can be realized as such moving picture reproduction apparatus, but also as a program execution method having, as steps, characteristic units included in the moving picture reproduction apparatus, or as a program for causing a computer to execute such steps. In addition, it is obvious that such program can be distributed via a recording medium such as CD-ROM and a transmission medium such as the Internet.

The moving picture reproduction apparatus according to the present invention can prevent the reproduction speed to be changed unless normal reproduction or trick play is received so that it can prevent an occurrence of situation in which an optimum trick play result cannot be obtained. Therefore, the present invention can prevent causing unexpected operations and malfunctions, increase usability of viewers, and reduce an occurrence of situation which a program generator has to expect, so that a program can be easily generated.

Hereinafter, the embodiments of the present invention shall be described with reference to the diagrams.

First Embodiment

The embodiment of the cable television system according to the present invention shall be explained with reference to the diagrams. FIG. 1 is a block diagram showing the relationship among apparatuses composing the cable system, which are a head end 101, and three terminal apparatuses that are recording and reproduction apparatuses: a terminal apparatus A111, a terminal apparatus B112, and a terminal apparatus C113. In the present embodiment, three terminal apparatuses are connected to one head end, but the present invention can be carried out even with an arbitrary number of terminal apparatuses being connected to the head end.

The head end 101 transmits, to plural terminal apparatuses, broadcast signals such as video, audio and data, and receives data transmitted from the terminal apparatuses. In order to implement this, frequency bands are divided for use in data transmission between the head end 101, and the terminal apparatus A111, the terminal apparatus B112, and the terminal apparatus C113. FIG. 2 is a table indicating one example of the division of the frequency bands. The frequency bands are roughly divided into two types: Out Of Band (abbr. OOB) and In-Band. A frequency band of 5 to 130 MHz is allocated to OOB to be mainly used for data exchange between the head end 101, and the terminal apparatus A111, the terminal apparatus B112, and the terminal apparatus C113. A frequency band of 130 MHz to 864 MHz is allocated to In-Band, and is mainly used in a broadcast channel including video and audio. QPSK modulation type is used with OOB, whereas QAM64 modulation type is used with In-Band. Modulation type technology is generally known and of little concern to the present invention, and detailed descriptions are therefore omitted.

FIG. 3 is one example of a more detailed use of the OOB frequency band. A frequency band of 70 MHz to 74 MHz is used to transmit data from the head end 101. In this case, all of the terminal apparatus A111, the terminal apparatus B112, and the terminal apparatus C113 receive the same data from the head end 101. Meanwhile, a frequency band of 10.0 MHz to 10.1 MHz is used to transmit data from the terminal apparatus A111 to the head end 101. A frequency band of 10.1 MHz to 10.2 MHz is used to transmit data from the terminal apparatus B112 to the head end 101. A frequency band of 10.2 MHz to 10.3 MHz is used to transmit data from the terminal apparatus C113 to the head end 101. Accordingly, data which is unique to each terminal apparatus can be transmitted to the head end 101 from the terminal apparatus A111, the terminal apparatus B112, and the terminal apparatus C113.

FIG. 4 is one example of use of an In-Band frequency band. The frequency bands of 150 MHz to 156 MHz and 156 MHz to 162 MHz are assigned to a channel 1 and a channel 2 respectively, and thereafter, channels are assigned at 6 MHz intervals. 310 MHz and the subsequent frequencies are allocated to radio channels at 1 MHz intervals. Each of these channels may be used as analog broadcast or as digital broadcast. In the case of digital broadcasting, data is carried in a transport packet format under MPEG-2 specifications, and it is also possible to send data for each kind of data broadcast, in addition to audio and video data.

The head end 101 has a QPSK modulation unit, a QAM modulation unit, and the like in order to transmit suitable broadcast signals to the respective frequency bands. In addition, the head end 101 has a QPSK demodulation unit for receiving data from the terminal apparatuses. Also, the head end 101 is assumed to further have various devices related to the above modulation units and demodulation unit. However, the present invention relates mainly to the terminal apparatuses, and therefore detailed descriptions are omitted.

The terminal apparatus A111, the terminal apparatus B112, and the terminal apparatus C113 receive and reproduce broadcast signals transmitted from the head end 101. Furthermore, the terminal apparatus A111, the terminal apparatus B112, and the terminal apparatus C113 transmit data unique to each terminal apparatus to the head end 101. In the present embodiment, these three terminal apparatuses shall have the same configuration.

Figure 5:
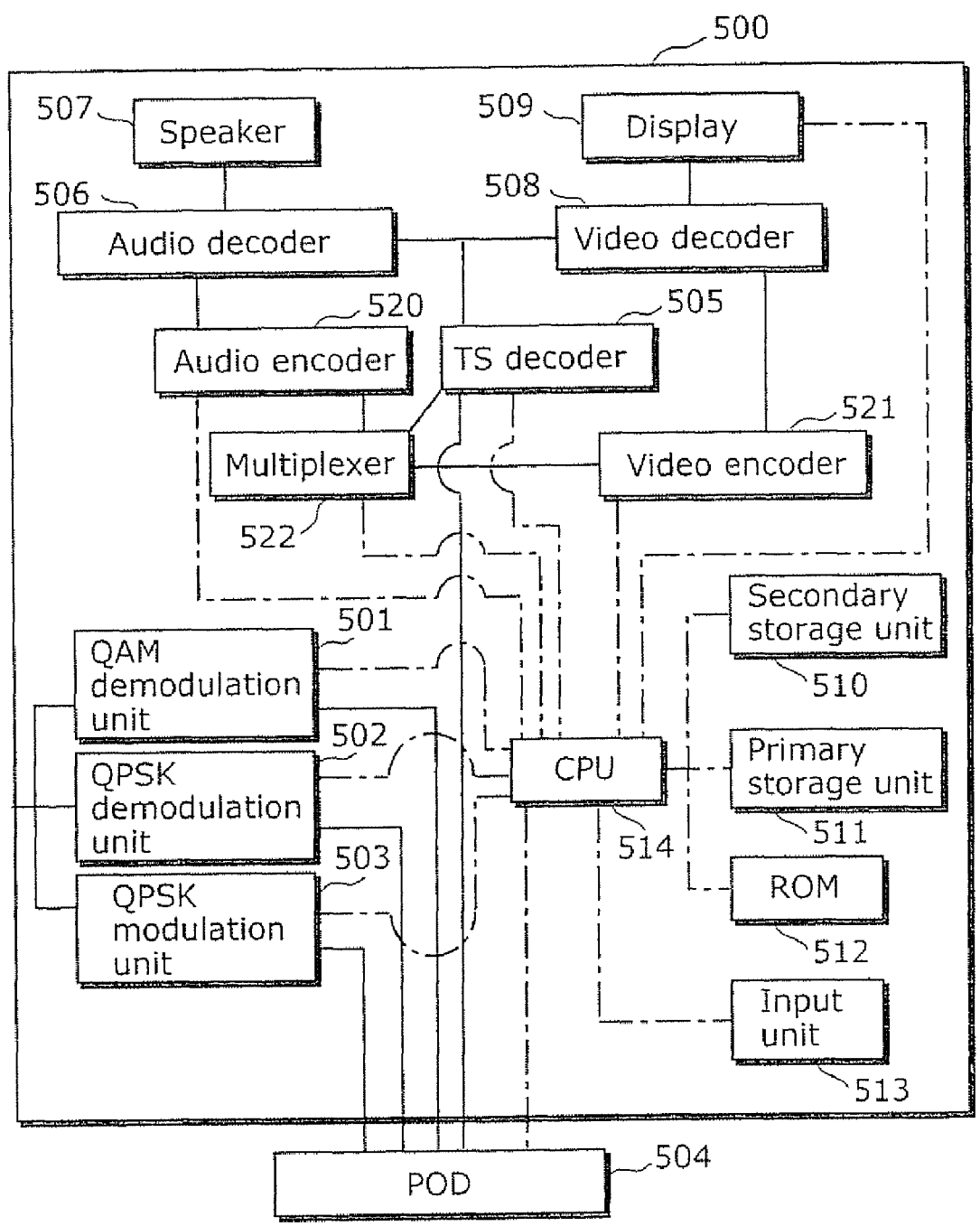
FIG. 5 is a diagram showing a configuration of a terminal apparatus in the cable television system according to the present invention.

FIG. 5 is a block diagram showing a hardware configuration of a broadcast receiving apparatus having a function of recording contents to be broadcast and a function of reproducing the recorded contents. 500 is a terminal apparatus, which is made up of a QAM demodulation unit 501, a QPSK demodulation unit 502, a QPSK modulation unit 503, a TS decoder 505, an audio decoder 506, a speaker 507, a video decoder 508, a display 509, a secondary storage unit 510, a primary storage unit 511, a ROM 512, an input unit 513, a CPU 514, an audio encoder 520, a video encoder 521, and a multiplexer 522. Furthermore, a POD 504 can be attached to/detached from the terminal apparatus 500.

Figure 6:
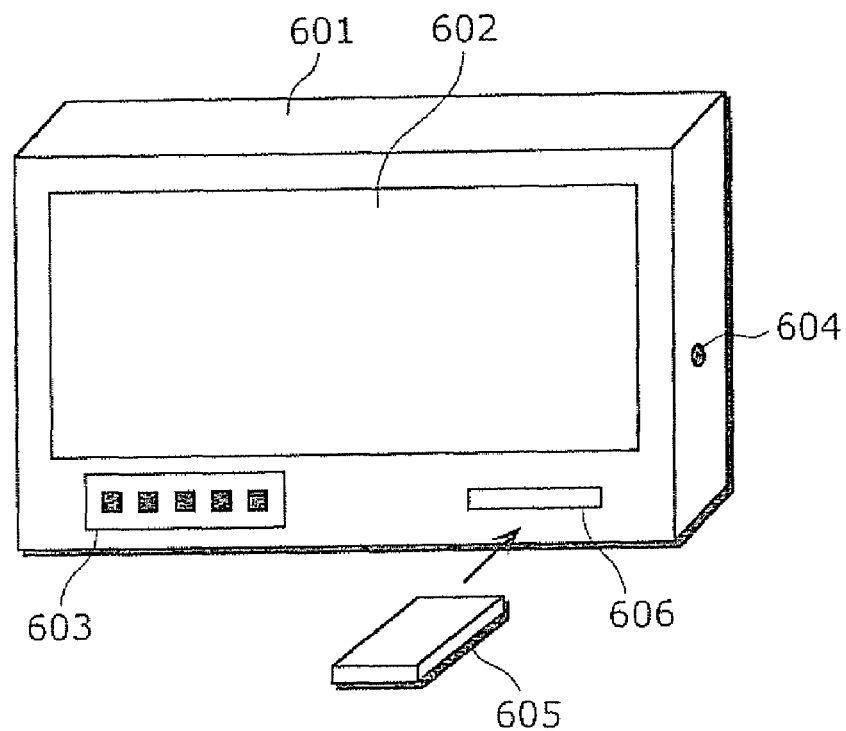
FIG. 6 shows an example of an external view of the terminal apparatus in the cable television system according to the present invention.

FIG. 6 shows a thin-profile television, which is an example of an external view of the terminal apparatus 500.

601 is a housing of the thin-profile television, which contains all constituent elements of the terminal apparatus 500 except for the POD 504.

602 is a display which corresponds to the display 509 in FIG. 5.

603 is a front panel unit which is made up of plural buttons and which corresponds to the input unit 513 in FIG. 5.

604 is a signal input terminal to which a cable line is connected for transmitting and receiving signals to and from the head end 101. The signal input terminal is connected to the QAM demodulation unit 501, the QPSK demodulation unit 502, and the QPSK modulation unit 503 shown in FIG. 5.

605 is a POD card corresponding to the POD 504 in FIG. 5. The POD 504 is embodied independently of the terminal apparatus 500 and can be attached to/detached from the terminal apparatus 500, as in the case of the POD card 605 in FIG. 6. A detailed explanation of the POD 504 is given later.

606 is an insertion slot into which the POD card 605 is inserted.

Referring to FIG. 5, the QAM demodulation unit 501 demodulates a signal which has been QAM-modulated in and transmitted from the head end 101, according to tuning information that includes a frequency specified by the CPU 514, and passes the resultant to the POD 504.

The QPSK demodulation unit 502 demodulates a signal which has been QPSK-modulated in and transmitted from the head end 101, according to tuning information that includes a frequency specified by the CPU 514, and passes the resultant to the POD 504.

The QPSK modulation unit 503 QPSK-modulates a signal passed from the POD 504, according to modulation information that includes a frequency specified by the CPU 514, and transmits the resultant to the head end 101.

The POD 504, as 605 in FIG. 6, is attachable to/detachable from the main body of the terminal apparatus 500. The definition of the connection interface between the main body of the terminal 500 and the POD 504 is given in OpenCable™ HOST-POD Interface Specification (OC-SP-HOSTPOD-IF-I12-030210) and in specifications referred to by such specification. POD is commonly called as CableCARD. The POD 504 mainly performs decoding processing (generally referred to as conditional access or as CA) on the coded signal transmitted from the head end 101 and intermediate processing for two-way communications between the head end 101 and the terminal apparatus 500. In the decoding of the coded signal transmitted from the head end 101, the POD 504 receives the signal from the QAM demodulation unit 501 and decodes the received signal in the case where the received signal has been coded. The POD 504 then transmits the decoded signal to the TS decoder 505 of the terminal apparatus 500.

Whereas any decoding methods are applicable, the method to be used is generally kept unknown so that there is a common case where even a manufacturer of the terminal apparatus 500 does not know the method used. Furthermore, in the intermediate processing for the two-way communications between the head end 101 and the terminal apparatus 500, the terminal main body 500 performs processing for indirectly allowing the two-way communications with the head end 101, using a function defined as a connection interface of the POD 504. The method of allowing the two-way communications between the POD 504 and the head end 101 is determined as a method defined in the specification and a method defined by a unique agreement between respective manufacturers of the POD 504 and the head end 101 (there is a case where the respective manufacturers are the same). However, since it is less related to the present invention, the detailed explanation is omitted.

The TS decoder 505 performs filtering on the signal received from the POD 504, and outputs necessary data to the output destination specified by the CPU 514. The output destination is selected from the audio decoder 506, the video decoder 508, and the CPU 514. Here, the signal sent from the POD 504 is an MPEG-2 transport stream. A detailed description about an MPEG-2 transport stream is given in the MPEG specification ISO/IEC13818-1, and therefore detailed explanation shall be omitted in the present embodiment. An MPEG-2 transport stream is composed of plural fixed-length packets, and a packet ID is assigned to each packet.

Figure 8:
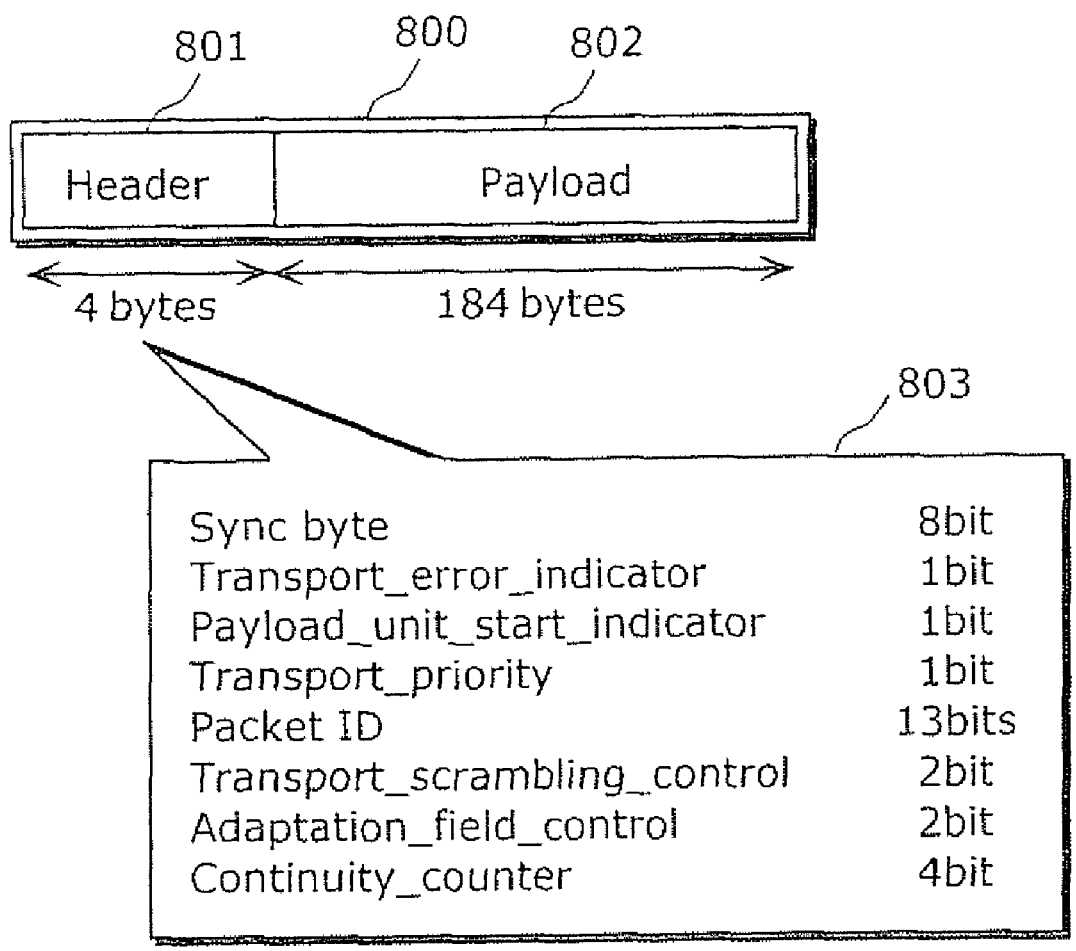
FIG. 8 is a diagram showing a structure of a packet defined in the MPEG standard.

FIG. 8 is a diagram showing the structure of a packet. 800 is a packet made up of 188 bytes having fixed length. The top four bytes is a header 801 storing information for identifying the packet, and the remaining 184 bytes is a payload 802 which contains the information to be transmitted. 803 shows the breakdown of the header 801. A packet ID is included in the 13 bits of the twelfth to twenty-fourth bits from the top.

Figure 9:
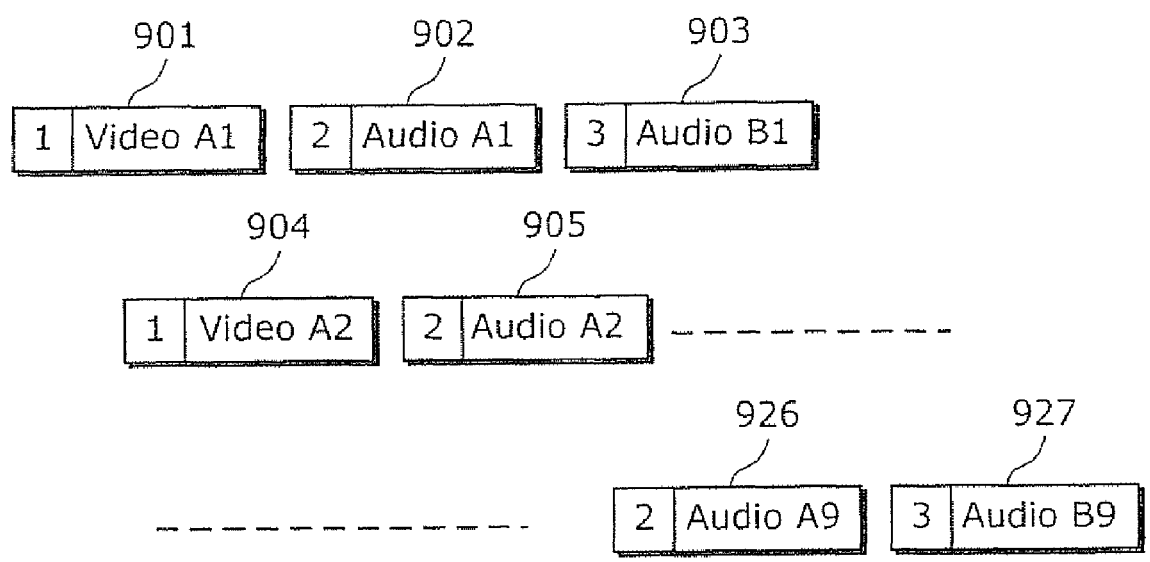
FIG. 9 shows an example of an MPEG-2 transport stream.

FIG. 9 is a schematic diagram illustrating plural packet strings to be transmitted. A packet 901 carries a packet ID "1" in its header and includes the first information of video A in its payload. A packet 902 carries a packet ID "2" in its header and includes the first information of audio A in its payload. A packet 903 carries a packet ID "3" in its header and includes the first information of audio B in its payload. A packet 904 carries the packet ID "1" in its header and includes the second information of the video A in its payload, and is the continuation of the packet 901. Similarly, packets 905, 926, and 927 carry subsequent data of the other packets. By concatenating the contents of the payloads of packets with the same packet IDs in the above manner, it is possible to reproduce a continuing video and audio.

Referring to FIG. 5, when the CPU 514 indicates, to the TS decoder 505, the packet ID "1" as well as "the video decoder 508" as an output destination, the TS decoder 505 extracts packets with the packet ID "1" from the MPEG-2 transport stream received from the POD 504, and passes them to the video decoder 508. In FIG. 5, therefore, only the video data is passed over to the video decoder 508. At the same time, when the CPU 514 indicates, to the TS decoder 50S, the packet ID "2" as well as "the audio decoder 506", the TS decoder 505 extracts packets with the packet ID "2" from the MPEG-2 transport stream received from the POD 504, and passes them to the audio decoder 506. In FIG. 5, therefore, only the audio data is passed over to the audio decoder 506 and the CPU 514.

This process of extracting only necessary packets according to the packet IDs corresponds to the filtering performed by the TS decoder 505. The TS decoder 505 is capable of performing more than one filtering processing simultaneously, at the instruction of the CPU 514.

Referring to FIG. 5, the audio decoder 506 concatenates audio data embedded in the packets in the MPEG-2 transport stream provided by the TS decoder 505, and outputs the resultant to the predetermined output destination or the output destination indicated by the CPU 154. For example, the audio data is an MPEG audio which is coded based on the MPEG audio specification ISO/IEC13818-3. The audio decoder is mounted as an MPEG audio decoder, and outputs a normal audio signal. The CPU 154 designates, as the output destination, the speaker 507 or the audio encoder 506.

The speaker 507 outputs, in audio, the signal provided by the audio decoder 506.

The video decoder 508 concatenates video data embedded in the packets in the MPEG-2 transport stream provided by the TS decoder 505, performs digital-to-analog conversion on the concatenated data, and outputs the resultant to a predetermined output destination or the output destination indicated by the CPU 154. For example, the video data is an MPEG video coded based on the MPEG video specification ISO/IEC13818-2, and the video decoder is mounted as an MPEG video decoder and outputs an ordinary video signal. The CPU 154 designates, as an output destination, the display 509 or the video encoder 2102.

The display 509, to be more specific, configured of a CRT or a liquid crystal and the like, outputs (displays) a video signal provided by the video decoder 508 and displays a message specified by the CPU 514, and so forth.

The secondary storage unit 510, to be more specific, configured of one or more flash memories or a hard disk and the like, stores and deletes data and programs specified by the CPU 514 or an MPEG transport stream. Furthermore, the stored data and programs are outputted to the CPU 514 and the TS decoder 505. The stored data and programs are kept in storage even when power to the terminal apparatus 500 is cut off.

The primary storage unit 511, to be more specific, configured of a Random Access Memory (RAM) and the like, temporarily stores and deletes data and programs specified by the CPU 514. Furthermore, the stored data and programs are referred to by the CPU 514. The stored data and programs are deleted when power to the terminal apparatus 500 is cut off.

The ROM 512 is a read-only memory device, to be more specific, configured of a Read Only Memory (ROM), a CD-ROM, or a DVD, and the like. The ROM 512 stores a program to be executed by the CPU 514.

Figure 7:
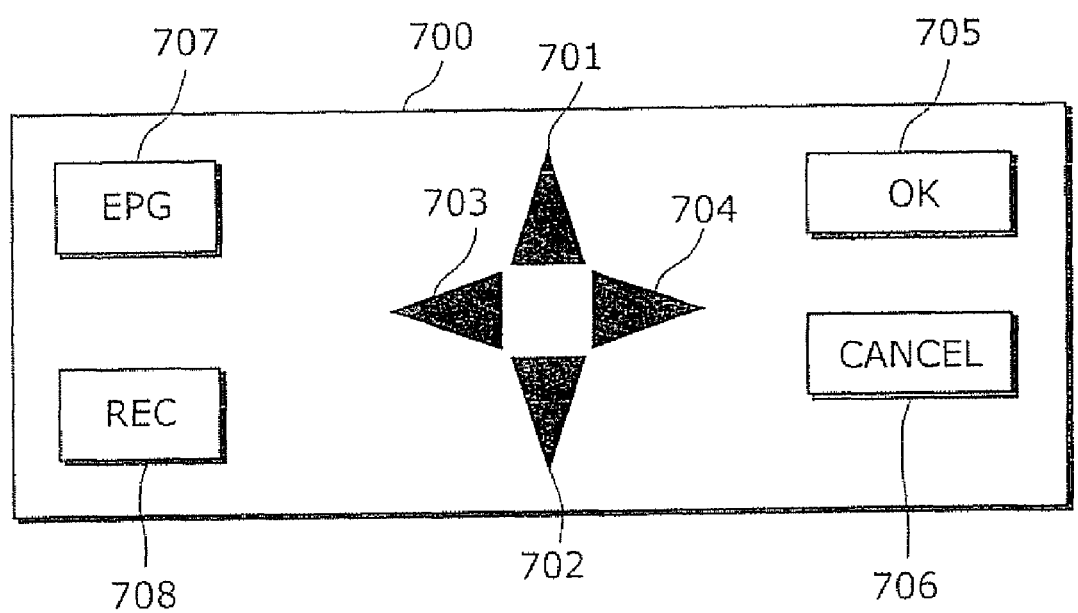
FIG. 7 shows an example external view of an input unit 513 in the case where it is configured in the form of a front panel.

The input unit 513, to be more specific, configured of a front panel or a remote control, accepts an input from the user. FIG. 7 is one example of a case where the input unit 513 is configured of the front panel. 700 is a front panel, which corresponds to the front panel unit 603 shown in FIG. 6. The front panel 700 has an up cursor button 701, a down cursor button 702, a left cursor button 703, a right cursor button 704, an OK button 705, a cancel button 706, an EPG button 707, and a REC button 708. When the user presses down a button, the identifier of such pressed button is notified to the CPU 514.

Referring to FIG. 5, the CPU 514 executes the program stored in the ROM 512. Following the instructions from such program to be executed, the CPU 514 controls the QAM demodulation unit 501, the QPSK demodulation unit 502, the QPSK modulation unit 503, the POD 504, the TS decoder 505, the display 509, the secondary storage unit 510, the primary storage unit 511, the ROM 512, the audio encoder 520, the video encoder 521, and the multiplexer 522.

The audio encoder 520 receives an output from the audio decoder 506, encodes the received output into a predetermined format or a format specified by the CPU 514, and outputs the resultant to a predetermined output destination or an output destination specified by the CPU 154. For example, the audio data is an MPEG audio coded in compliance with the MPEG audio specification ISO/IEC13818-3. The audio encoder 520 is mounted as an MPEG audio encoder, and outputs a normal audio signal as an MPEG audio data.

The video encoder 521 receives an output from the video decoder 508, encodes the received output into a predetermined format or a format specified by the CPU 514, and outputs the resultant to a predetermined output destination or an output destination specified by the CPU 154. For example, the video data is an MPEG video coded in compliance with the MPEG video specification ISO/IEC13818-2. The video encoder 521 is mounted as an MPEG video encoder, and outputs a normal video signal as an MPEG video data.

The multiplexer 522 multiplexes the received video and audio data, and outputs the resultant to the predetermined output destination or the output destination specified by the CPU 154. The known technology can be used for a specific multiplexing method and the details shall be referred to the MPEG specifications. For example, the multiplexing is an MPEG transport stream that is multiplexed in compliance with the MPEG system specification ISO/IEC13818-1. The multiplexer 522 is mounted as an MPEG transport stream multiplexer, multiplexes the MPEG audio data and the MPEG video data into the MPEG transport stream format, and outputs the resultant.

The output destination of each of the aforementioned constituent elements is specified by the CPU 514 based on an expected operational result. Specifically, it is specified by a program group that is stored in an after-mentioned ROM 512 and is executed by the CPU 514.

For example, in the case where a content being broadcast is reproduced, the CPU 514 indicates, to each constituent element, an output destination so as to have a data flow as described below. First, the output from the QAM demodulation unit 501 is inputted to the POD 504, and the output of the POD 504 is inputted to the TS decoder 505. After that, the audio packet output from the TS decoder 505 is inputted to the audio decoder 506, the audio output from the audio decoder 506 is inputted to the speaker 507, and the audio is reproduced from the speaker 507. On the other hand, the video packet output from the TS decoder 505 is inputted to the video decoder 508, the video output from the video decoder 508 is inputted to the video display 509, and the video is displayed on the display 509. Through the aforementioned operations, the content being broadcast is reproduced from the speaker and on the display.

For example, in the case where the content being broadcast is recorded, the CPU 514 indicates, to each constituent, an output destination so as to have a data flow as described below. First, the output from the QAM demodulation unit 501 is inputted to the POD 504, and the output of the POD 504 is inputted to the TS decoder 505. After that, the audio packet output from the TS decoder 505 is inputted to the audio decoder 506, the audio output from the audio decoder 506 is inputted to the audio encoder 520, and the audio data output from the audio encoder 520 is inputted to the multiplexer 522. On the other hand, the video packet output from the TS decoder 505 is inputted to the video decoder 508, the video output from the video decoder 508 is inputted to the video encoder 521, and the video data output from the video encoder 521 is inputted to the multiplexer 522. The multiplexer 522 multiplexes the input audio data and video data into the MPEG transport stream format, and outputs the resultant to the secondary storage unit. Through the aforementioned operations, the broadcast content is recorded into the secondary storage unit.

For example, in the case where a content recorded in the secondary storage unit is reproduced, the CPU 514 indicates, to each constituent element, an output destination so as to have a data flow as described below. First, the MPEG transport stream output from the secondary storage unit is inputted to the TS decoder 505. After that, the audio packet output from the TS decoder 505 is inputted to the audio decoder 506, the audio output from the audio decoder 506 is inputted to the speaker 507, and the audio is reproduced from the speaker 507. On the other hand, the video packet output from the TS decoder 505 is inputted to the video decoder 508, the video output from the video decoder 508 is inputted to the display 509, and the video is displayed on the display 509. Through the aforementioned operations, the content stored in the secondary storage unit is reproduced.

In the above, the hardware configuration was explained.

Hereinafter, a software configuration shall be explained.

Figure 10:
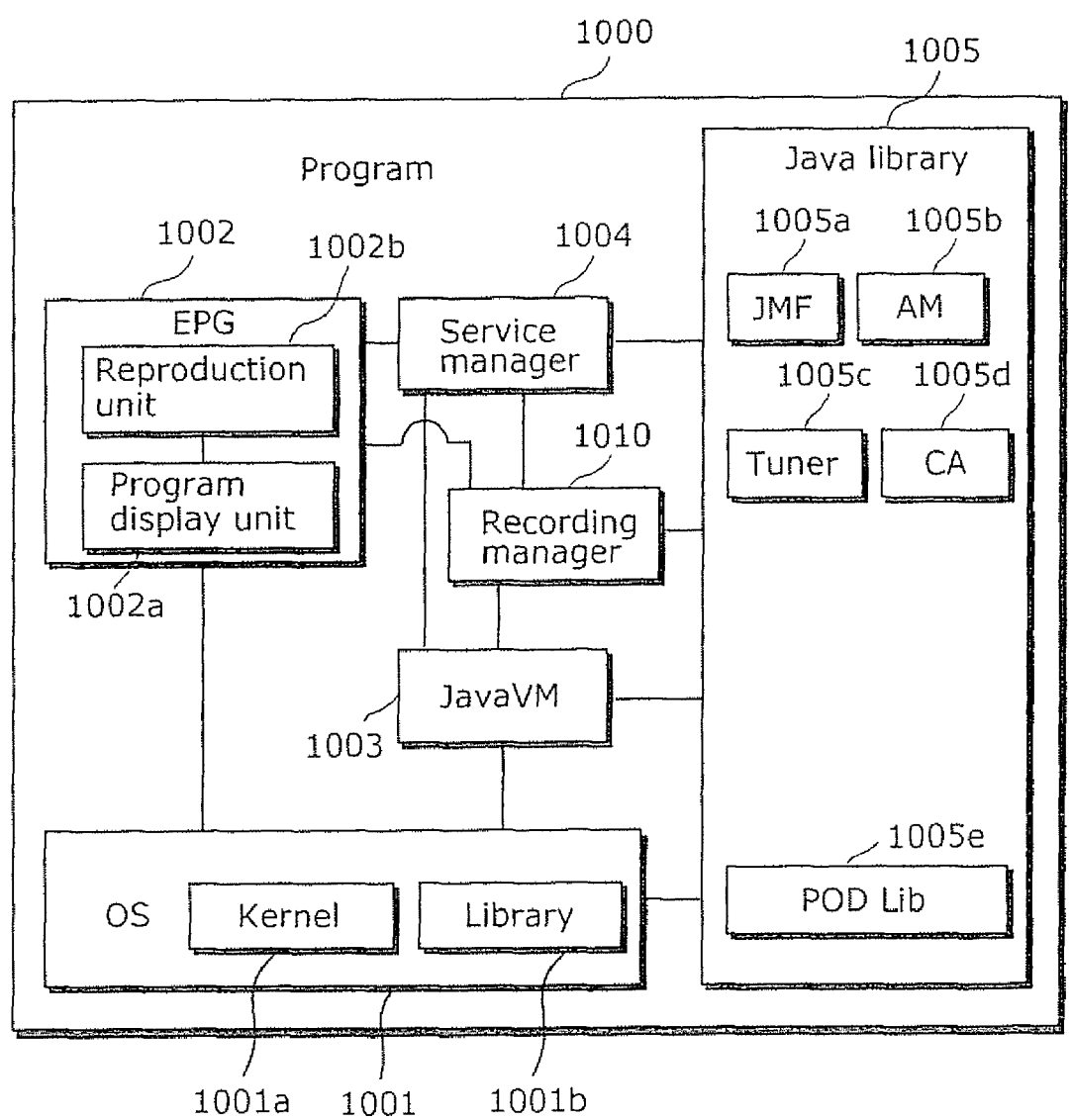
FIG. 10 is a diagram showing a structure of the program stored in a terminal apparatus 500 according to the present invention.

FIG. 10 is one example of a configuration diagram of the program that is stored in the ROM 512 and to be executed by the CPU 514.

A program 1000 is made up of plural subprograms. To be more specific, the program 1000 is made up of an OS 1001, an EPG 1002, a Java™ VM 1003, a service manager 1004, a Java™ library 1005, and a recording manager 1010.

The OS 1001 stands for operating system, an example of which is Linux and the like. The OS 1001 is a generic name for publicly known technology made up of a kernel 1001a and a library 1001b for executing subprograms in parallel, and therefore a detailed explanation is omitted. In the present embodiment, the kernel 1001a of the OS 1001 executes the EPG 1002 and the Java™ VM 1003 as subprograms. Meanwhile, the library 1001b provides these subprograms with plural functions required for controlling the constituent elements of the terminal apparatus 500.

Here, tuning is introduced as an example of such functions. In the tuning function, tuning information including a frequency is received from another subprogram and then passed over to the QAM demodulation unit 501. Accordingly, the QAM demodulation unit 501 can demodulate data based on the provided tuning information, and pass the demodulated data to the POD 504. As a result, the other subprograms can control the QAM demodulation unit via the library 1001b.

The EPG 1002 has a function of making a user select a content while displaying, for the user, information relating to the content to be broadcast or the recorded content. The EPG 1002 is made up of a program display unit 1002a for accepting an input from the user, and a reproduction unit 1002b for indicating an instruction for content reproduction. Here, EPG stands for Electric Program Guide.

First, it is described about the procedure by which the EPG 1002 displays the content to be broadcast and reproduces the content selected by the user. The EPG 1002 is started by the kernel 1001a when power to the terminal apparatus 500 is turned on. Inside the started EPG 1002, the program display unit 1002a awaits input from the user through the input unit 513 of the terminal apparatus 500. Here, in the case where the input unit 513 is configured of the front panel shown in FIG. 7, when the user presses down the EPG button 707 on the input unit 513, the CPU 514 is notified of the identifier of such EPG button. The program display unit 1002a of the EPG 1002, which is a subprogram running on the CPU 514, accepts this identifier and displays program information on the display 509.

Figure 11A:
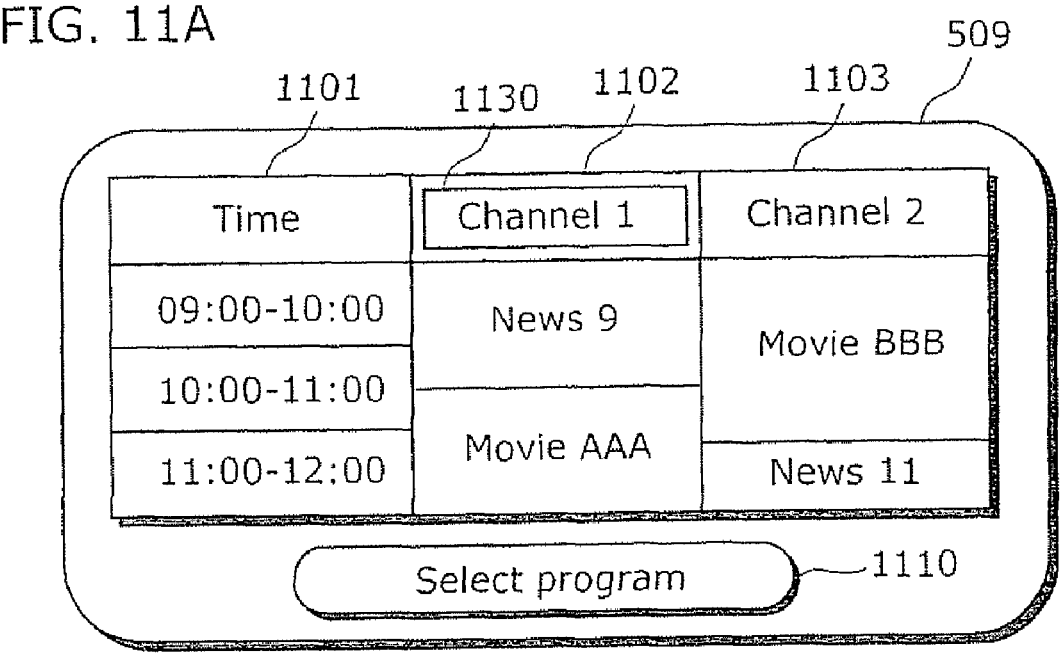
FIG. 11 shows an example of a screen displayed by a display 509 according to the present invention.
Figure 11B:
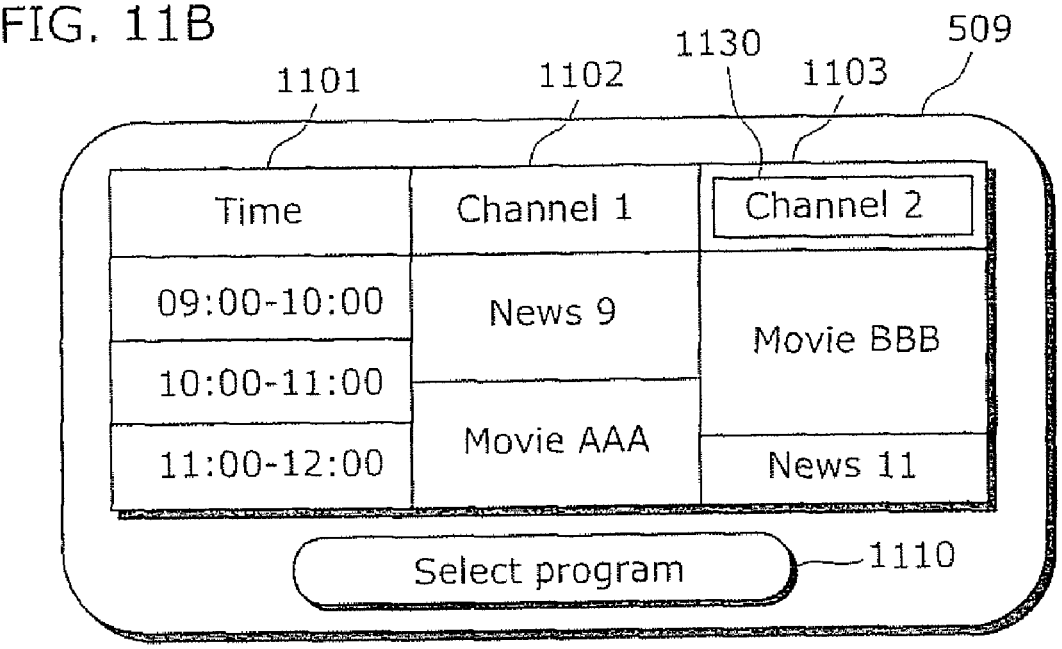

FIG. 11A and FIG. 11B show examples of a program table displayed on the display 509. Referring to FIG. 11A, the program information is displayed on the display 509 in a grid pattern. Time information is displayed in column 1101. A channel name "Channel 1" and programs to be broadcast during time periods corresponding to the respective times described in the column 1101 are displayed in column 1102. The channel name is also called channel identifier. It is shown that a program "News 9" is broadcast from 9:00 to 10:30, and "Movie AAA" is broadcast from 10:30 to 12:00 on "Channel 1". In the same manner as column 1102, a channel name "Channel 2" and a program shown during a time period corresponding to the time in the column 1101 are displayed in column 1103. It is shown that a program "Movie BBB" is broadcast from 9:00 to 11:00, and "News 11" is broadcast from 11:00 to 12:00.

1101 is a region on which the details displayed on the screen are displayed as a message to the user. Here, "program selection" is displayed for urging the user to select a program. 1130 is a cursor. The cursor 1130 moves at the press of the left cursor 703 and the right cursor 704 on the front panel 700.

When the right cursor 704 is pressed down in the state illustrated in FIG. 11A, the cursor 1130 moves towards the right as shown in FIG. 11B. Meanwhile, when the left cursor 703 is pressed down in the state illustrated in FIG. 11B, the cursor 1130 moves towards the left as shown in FIG. 11A.

When the OK button 705 on the front panel 700 is pressed down in the state shown in FIG. 11A, the program display unit 1002a notifies the reproduction unit 1002b of the identifier of "Channel 1". When the OK button 705 on the front panel 700 is pressed down in the state shown in FIG. 11B, the program display unit 1002a notifies the reproduction unit 1002b of the identifier of "Channel 2".

Furthermore, the program display unit 1002a periodically stores program information to be displayed from the head end 101 into the primary storage unit 511 via the POD 504. Generally, it takes time to obtain program information from the head end. However, it becomes possible to quickly display a program table by displaying the program information that is pre-stored in the primary storage unit 511 at the press of the EPG button 707 of the input unit 513.

The reproduction unit 1002b sends an instruction to reproduce the content to be broadcast using the received identifier of the channel, in the case where the received information is the content to be broadcast. The relationship between channel identifiers and channels is pre-stored in the secondary storage unit 510 as channel information.

Figure 12:
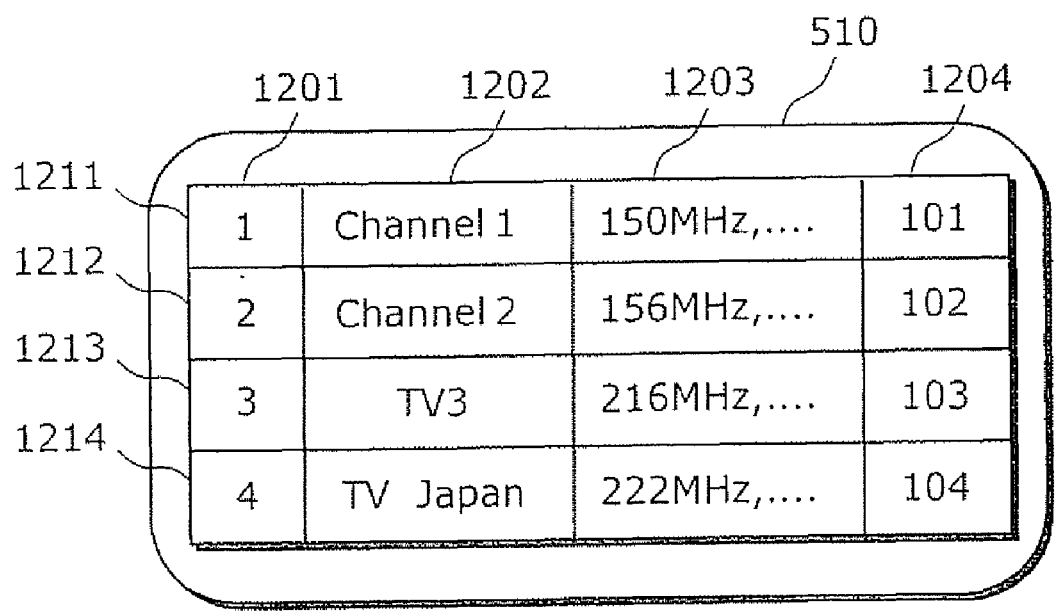
FIG. 12 shows an example of information stored in a secondary storage unit 510 according to the present invention.

FIG. 12 is one example of the channel information stored in the secondary storage unit 510. The channel information is stored in tabular format. A column 1201 describes the identifiers of channels. A column 1202 describes channel names. A column 1203 describes tuning information. Here, the tuning information is represented by values to be provided to the QAM demodulation unit 501 such as frequency, transfer rate, and coding ratio. A column 1204 describes program numbers. Program numbers are numbers used to identify PMTs defined by the MPEG-2 specification. A description about PMT is given later. Each of columns 1211 to 1214 indicates a set of the identifier, channel name, and tuning information of each channel. The column 1211 describes a set that includes an identifier of "1", a channel name of "Channel 1", a frequency of "150 MHz" as tuning information, and a program number of "101". The reproduction unit 1002b passes the identifier of the received channel directly to the service manager 1004 in order to reproduce the content of the channel.

It should be noted that, as shown in here, a channel indicates a frequency band; channel information is information for using the frequency band in which the channel exists; and the content to be broadcast is a collective of video, audio and application included in the channel.

Moreover, when the user presses down the up cursor 701 and the down cursor 702 on the front panel 700 while the content of a channel is being reproduced, the reproduction unit 1002b receives a notification about such press by the user from the input unit 513 via the CPU 514, and switches the channel being reproduced to another one. First, the reproduction unit 1002b stores, in the primary storage unit 511, the identifier of the channel that is currently being reproduced.

Figure 13A:
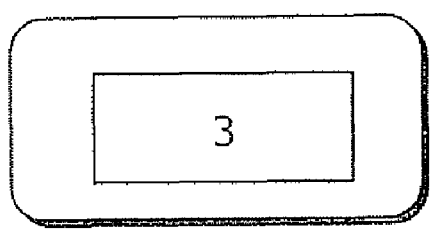
FIG. 13 shows an example of information stored in a primary storage unit 511 according to the present invention.
Figure 13B:
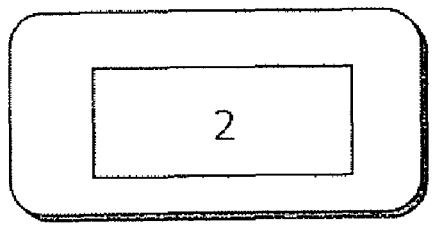
Figure 13C:
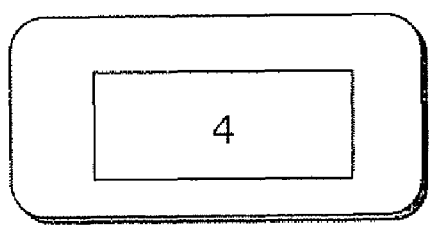

FIGS. 13A, 13B and 13C show example identifiers of channels stored in the primary storage unit 511. In FIG. 13A, a channel identifier "3" is stored, and referring to FIG. 12, it is indicated that the channel with a channel name of "TV 3" is being reproduced. When the user presses down the up cursor 701 in a state illustrated in FIG. 13A, the reproduction unit 1002b refers to the channel information shown in FIG. 12, and passes the identifier "2" of a so channel with the channel name of "Channel 2" to the service manager 1004 in order to newly reproduce a channel with the channel name of "Channel 2", which is the previous channel in the table. At the same time, the reproduction unit 1002b rewrites the identifier to the channel identifier "2" stored in the primary storage unit 511. FIG. 13B shows the state in which the channel identifier has been re-written. Meanwhile, when the user presses down the down cursor 702 in the state illustrated in FIG. 13A, the reproduction unit 1002b refers to the channel information shown in FIG. 12, and passes the identifier "4" of a channel with the channel name of "TV Japan" to the service manager 1004 in order to newly reproduce a channel with the channel name of "TV Japan", which is the next channel in the table. At the same time, the reproduction unit 1002b rewrites the identifier to the channel identifier "4" stored in the primary storage unit 511. FIG. 13C shows the state in which the channel identifier has been re-written.

Next, it is described about the procedure by which the EPG 1002 displays the content to be broadcast, and performs a recording reservation of the content selected by the user. Here, in the case where the input unit 513 is configured of the front panel shown in FIG. 7, when the user presses down the REC button 708 on the input unit 513, the CPU 514 is notified of the identifier of such REC button. The program display unit 1002a of the EPG 1002, which is a subprogram running on the CPU 514, accepts this identifier and displays program information on the display 509. The program display unit 1002a displays a screen for performing a recording reservation of the content to be broadcast, in contrast to the case where the identifier of the EPG button 707 is received.

Figure 14:
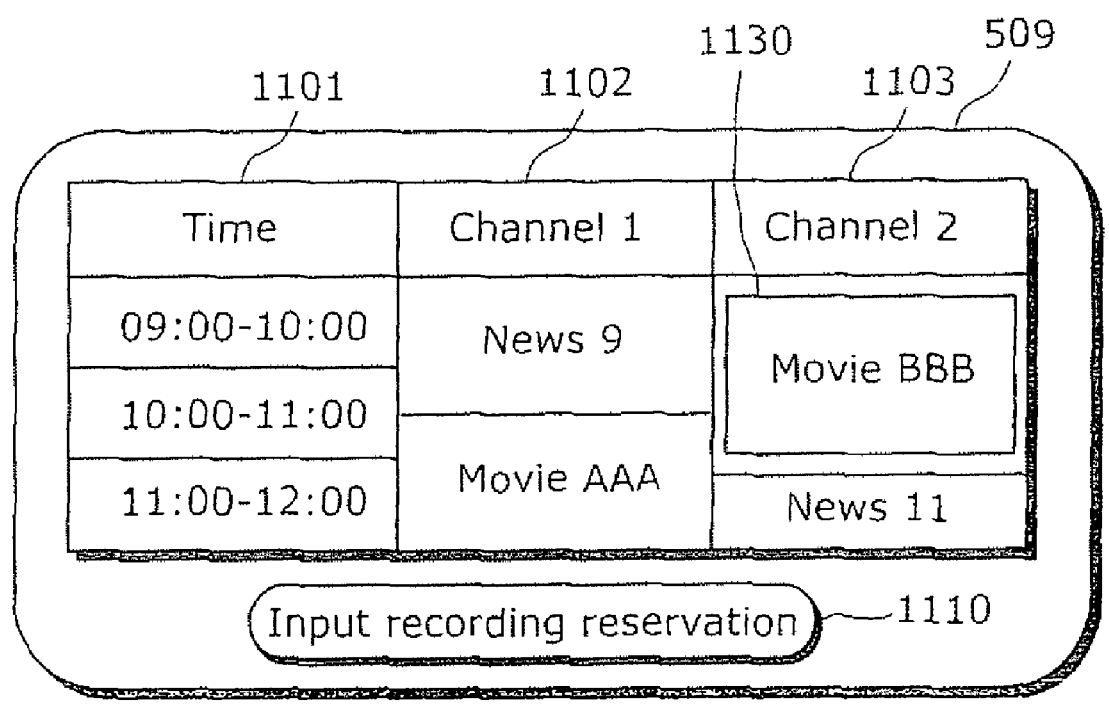
FIG. 14 shows an example of a screen displayed by the display 509 according to the present invention.

FIG. 14 is an example of the screen for performing a recording reservation displayed on the display 509. Same reference numbers are used for the constituent elements same as in FIG. 11 and the explanations about the same elements are therefore omitted. The cursor 1130 moves on the screen in accordance with the input by the user. For example, when the user presses down the OK button 705 on the front panel 700 where the cursor 1130 is placed at the position of "Movie 888" of "Channel 2", the program display unit 1002a notifies the recording manager 1010 of the information relating to "Movie 888".

Figure 15:
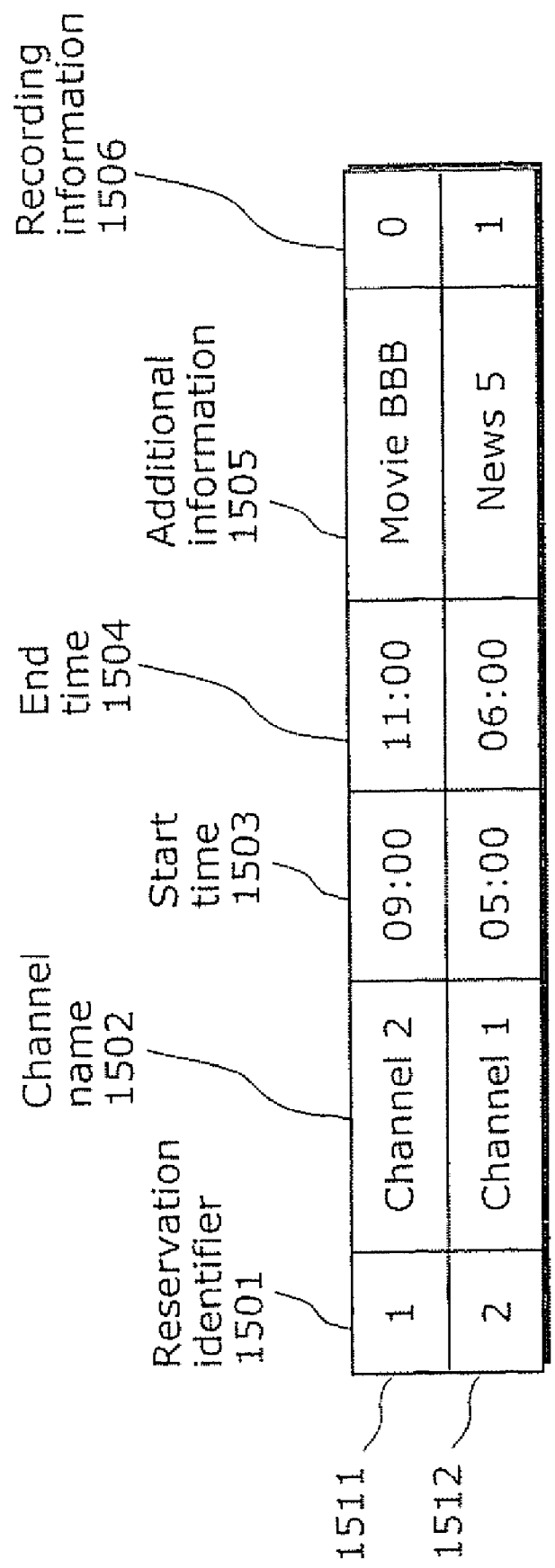
FIG. 15 shows an example of information stored in a primary storage unit 511 according to the present invention.

Referring to FIG. 10, the recording manager 1010 manages recording reservation, instructs to record a content in accordance with the recording reservation, and manages the recorded content. First, it is described about the management of recording reservation. For example, when receiving information relating to the recording reservation from the program display unit 1002a of the EPG 1002, the recording manager 1010 stores the received information into the primary storage unit 511. FIG. 15 shows an example of details stored in the primary storage unit 511. A column 1501 describes a reservation identifier for identifying each recording reservation. A column 1502 describes a channel name included in the recording reservation. A column 1503 describes a start time of recording. A column 1504 describes an end time of recording. A column 1505 describes additional information attached to the recording reservation.

A column 1506 describes information indicating whether or not the recording has been finished (recording state). For example, "1" indicates that the recording has been finished, and "0" indicates that the recording has not been finished. A row 1511 and a row 1512 respectively indicate a recording reservation. Here, the row 1511 describes a recording reservation having a reservation identifier 1501 of "1" a channel name 1502 of "Channel 2", a start time 1503 of "09:00" an end time 1504 of "11:00", the additional information 1505 of "Movie BBB", and a recording state 1506 of "0". Furthermore, the row 1512 describes a recording reservation having a reservation identifier 1501 of "2", a channel name 1502 of "Channel 1", a start time 1503 of "20:00", an end time 1504 of "21:00", the additional information 1505 of "Drama C", and a recording state 1506 of "1".

In addition, the recording manager 1010 instructs, based on the information included in the recording reservation, to start recording, onto the secondary storage unit 510, a content of the channel corresponding to the current channel name, in other words, additional data such as video, audio and application when it is a start time of one of the stored recording reservations, and instructs to terminate recording when it is an end time of the recording reservation. The channel identifier corresponding to the channel name is found with reference to FIG. 12. When the recording is completed, the recording state 1506 is changed from "0" to "1". It should be noted that information relating to the recorded content, a format in which the information is stored in the primary storage unit 511 and the like are shown in FIG. 23. Whenever new content is recorded, one line of an entry is added to the format shown in FIG. 23.

In FIG. 23, 2311 and 2312 are respective entries relating to the recorded contents that are different from each other. The recorded data identifier 2301 is an ID for uniquely identifying the recorded content. The recording manager 1010 assigns a unique value to each content. The channel name 2302 is a channel name of each content and is equivalent to the channel name 1502 in FIG. 15. The storage information 2303 is a file path name in which each of the recorded contents is stored.

Next, it is described about the procedure by which the EPG 1002 displays the recorded content, and reproduces the content selected by the user. The program display unit 1002a receives information relating to the recorded content from the recording manager 1010, and presents the received information to the user.

Figure 16:
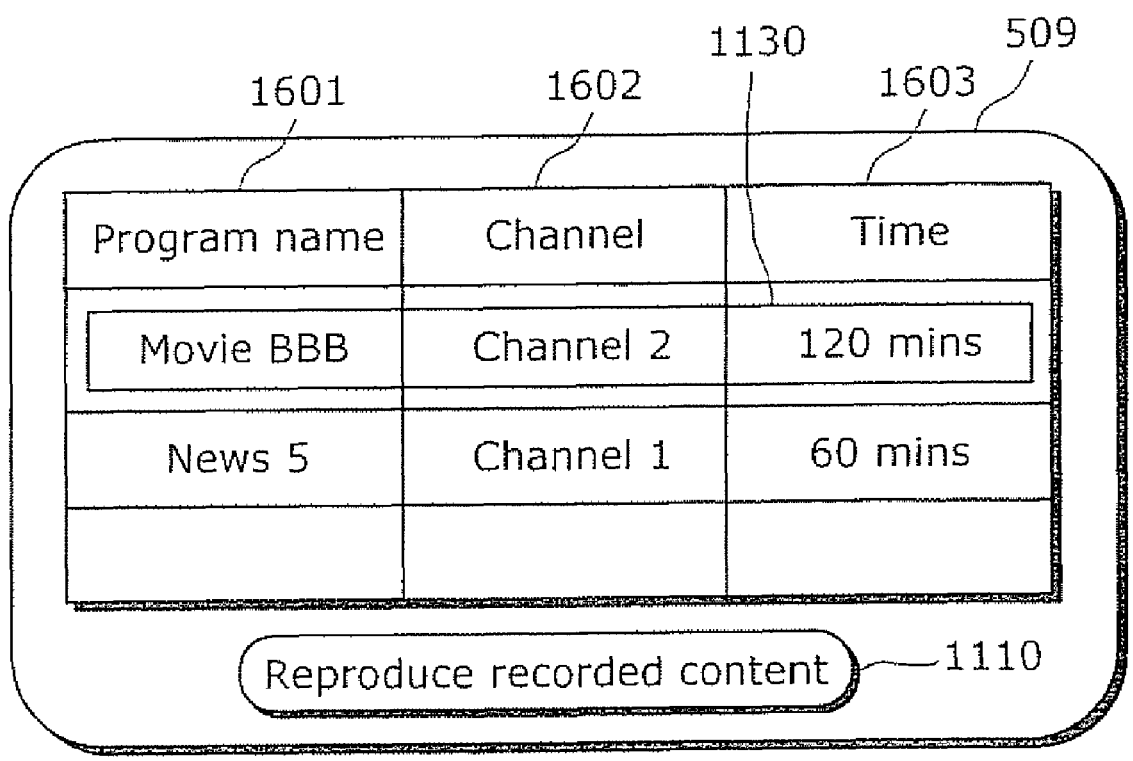
FIG. 16 shows an example of a screen displayed by the display 509 according to the present invention.

FIG. 16 is an example of a recorded content selection screen displayed on the display 509. Same reference numbers are used for the constituent elements same as in FIG. 11 and the explanation about the same elements is therefore omitted. A column 1601 describes program names of the recorded contents. A column 1602 describes channel names by which the recorded contents had been broadcast. A column 1603 describes length (time) of the recorded contents. When the user moves the cursor 1130 using the input unit 513 and selects one of the recorded contents, the program display unit 1002a notifies the reproduction unit 1002b of the information relating to the selected content. The reproduction unit 1002b instructs the service manager 1004 to reproduce the content based on the received information, in the case where the received information is the recorded content.

The information to be passed over is, for example, the details shown in the column 1511 of FIG. 15. Furthermore, a place where the content is recorded (for example, a file name) and the like may be included as information relating to the recorded content. Or, only the reservation identifier 1501 in FIG. 15 is passed over, and the service manager 1004 may obtain, from the recording manager 1010, information necessary for reproduction based on the reservation identifier 1501.

Referring to FIG. 10, the Java™ VM 1003 is a Java™ virtual machine which sequentially analyzes and executes programs written in the Java™ language. Programs written in the Java™ language are compiled of intermediate code which does not depend on hardware, called bytecode. The Java™ virtual machine is an interpreter which executes this bytecode. Some of the Java™ virtual machines translate the byte codes into an executable form which can be interpreted by the CPU 514 and pass the resultant to the CPU 514, which executes it. The Java™ VM 1003 is started, with a Java™ program to be executed being specified by the kernel 1001*a*.

In the present embodiment, the kernel 1001*a* specifies the service manager 1004 as a Java™ program to be executed. Details of the Java™ language are explained in many publications, such as "Java™ Language Specification (ISBN 0-201-63451-1)". Here, those details are omitted. In addition, detailed operations of the Java™ VM itself are explained in many publications, such as "Java™ Virtual Machine Specification (ISBN 0-201-63451-X)". Here, those details are omitted.

The service manager 1004, which is a Java™ program written in the Java™ language, is sequentially executed by the Java™ VM 1003. The service manager 1004 can call or to be called by another subprogram which is not written in the Java™ language through Java™ Native Interface (JNI). JNI is also described in many publications, such as "Java™ Native Interface". Here, those details are omitted.

The service manager 1004 receives information relating to the content to be reproduced such as the identifier of a channel from the reproduction unit 1002*b* through the JNI. The service manager 1004 also provides a Java API for another Java program to identify a channel identifier to be reproduced for the service manager. Specifically, it provides a Java method called select (int channel). That is, another Java program can specify a content to be reproduced by identifying, to the channel parameter, an identifier of the channel and calling this method.

As described in the above, the content to be reproduced is indicated to the service manager through JNI or select method of the Java method. In the case where the content to be reproduced is the content to be broadcast, the service manager 1004 first passes the identifier of the channel to a Tuner 1005*c* in the Java™ library 1005 so as to request for tuning. The Tuner 1005*c* obtains the turning information with reference to the channel information stored in the secondary storage unit 510. Assuming that the service manager 1004 passes the identifier "2" of the channel to the Tuner 1005*c*, the Tuner 1005*c* obtains the tuning information "156 MHz" corresponding to the channel with reference to the row 1212 shown in FIG. 12. The Tuner 1005*c* passes the tuning information to the QAM demodulation unit 501 via the library 1001*b* of the OS 1001. The QAM demodulation unit 501 demodulates the signal sent from the head end 101 according to the tuning information given to the QAM demodulation unit 501, and passes the resultant signal to the POD 504.

Next, the service manager 1004 requests a CA 1005*d* inside the Java™ library 1005 to perform descrambling. The CA 1005*d* provides the POD 504 with information required for descrambling through the library 1001*b* in the OS 1001. On the basis of such provided information, the POD 504 descrambles the signal provided by the QAM demodulation unit 501, and passes the resultant signal to the TS decoder 505. It should be noted that the CA 1005*d* does not necessarily perform processing relating to descrambling in the case where it is determined that descrambling is unnecessary to be performed (in other words, scrambling has not been performed).

Next, the service manager 1004 provides a JMF 1005*a* inside the Java™ library 1005 with the identifier of the channel, so as to request for the reproduction of the video and audio.

First, the JMF 1005*a* obtains, from a PAT and a PMT, packet IDs for identifying the video and audio to be reproduced. PAT and PMT are tables defined by the MPEG-2 specification that show the program line-up included in an MPEG-2 transport stream. PAT and PMT are carried in the payloads in packets included in an MPEG-2 transport stream, together with audio and video. Refer to the specification for a detailed description of PAT and PMT. Here, only an overview of PAT and PMT is given. PAT stands for Program Association Table, and, is carried in packets with the packet ID "0". In order to obtain PAT, the JMF 1005*a* indicates, to the TS decoder 505, the packet ID "0" and the CPU 514 through the library 1001*b* of the OS 1001. The TS decoder 505 then performs filtering based on the packet ID "0", and passes the resultant to the CPU 514. Accordingly, the JMF 1005*a* can collect the PAT packets.

Figure 17:
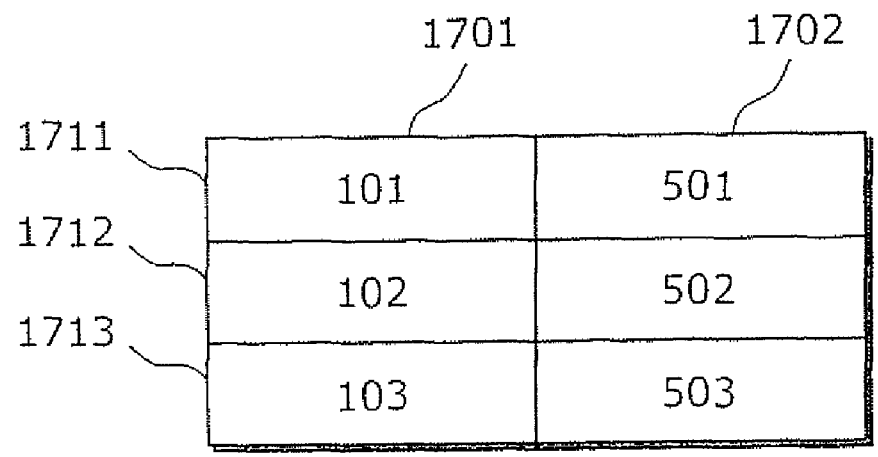
FIG. 17 is a schematic diagram showing the details of a PAT specified in the MPEG-2 standard according to the present invention.

FIG. 17 illustrates a table that schematically shows an example of the collected PAT information. A column 1701 describes program numbers. A column 1702 describes packet IDs. The packet IDs shown in the column 1702 are used to obtain the PMT. Each of rows 1711 to 1713 is a pair of the program number of a channel and a packet ID corresponding to it. Here, three channels are defined. The row 1711 defines a pair of the program number "101" and the packet ID "501". Assuming that the channel identifier provided to the JMF 1005*a* is "2", the JMF 1005*a* obtains the program number "102" corresponding to such channel identifier with reference to the row 1212 in FIG. 12, and then obtains the packet ID "502" corresponding to the program number "102" with reference to the row 1712 in the PAT shown in FIG. 17. PMT, which stands for Program Map Table, is carried in packets with the packet IDs specified in the PAT. In order to obtain PMT, the JMF 1005*a* indicates, to the TS decoder 505, a packet ID and the CPU 514 through the library 1001*b* of the OS 1001. Here, a packet ID to be specified is "502". The TS decoder 505 then performs filtering based on the packet ID "502", and passes the resultant to the CPU 514. Accordingly, the JMF 1005*a* can collect the PMT packets.

Figure 18:
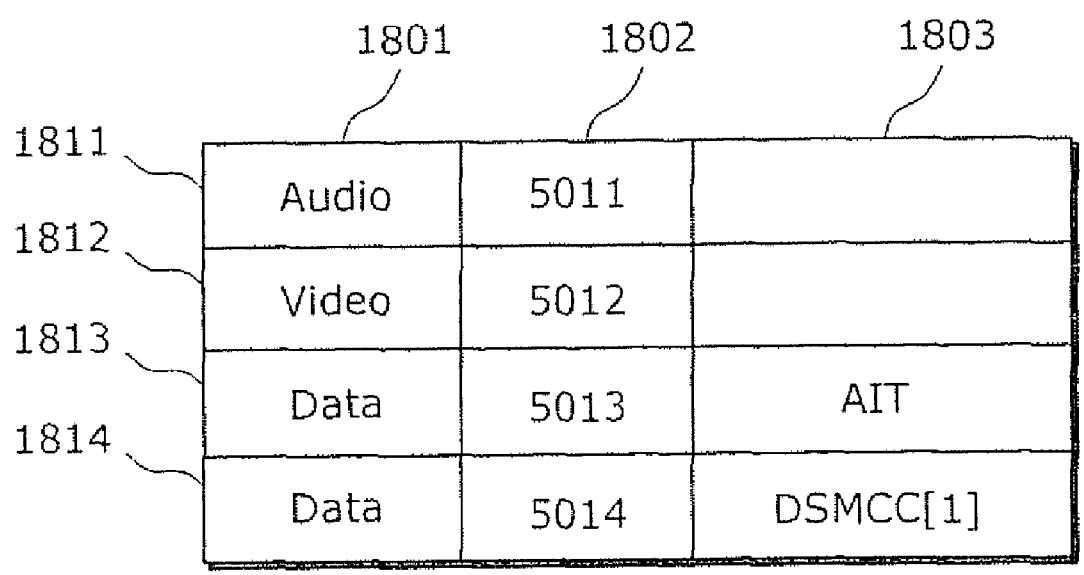
FIG. 18 is a schematic diagram showing the details of a PMT specified in the MPEG-2 standard according to the present invention.

FIG. 18 illustrates a table that schematically shows an example of the collected PMT information. A column 1801 describes stream types. A column 1802 describes packet IDs. Information specified by the respective stream types is carried in the payloads of packets with the packet IDs specified in the column 1802. A column 1803 describes additional information. Each of rows 1811 to 1814 is a pair of a packet ID and the type of information being transmitted, which is known as an elementary stream. The row 1811, which is a pair of the stream type "audio" and the packet ID "5011" indicates that audio data is stored in the payload of the packet with the packet ID "5011". The JMF 1005*a* obtains, from the PMT, the packet IDs of the video and audio to be reproduced. Referring to FIG. 18, the JMF 1005*a* obtains the audio packet ID "5011" from the row 1811, and the video packet ID "5012" from the row 1812.

The JMF 1005*a* then provides the TS decoder 505 with pairs of the obtained audio packet ID and the audio decoder 506 as an output destination as well as the video packet ID and the video decoder 508 as an output destination, via the library 1001*b* of the OS 1001. The TS decoder 505 performs filtering based on such provided packet IDs and the output destinations. Here, the packet with the packet ID "5011" is passed over to the audio decoder 506 and the packet with the packet ID "5012" is passed over to the video decoder 508. The audio decoder 506 performs digital-to-analog conversion on the provided packet, so as to reproduce the audio via the speaker 507. The video decoder 508 performs digital-to-analog conversion on the provided packet, so as to display the video on the display 509.

Finally, the service manager 1004 provides the channel identifier to an AM 1005*b* in the Java™ library 1005, so as to request for data broadcast reproduction. Here, data broadcast reproduction indicates to extract a Java™ program included in the MPEG-2 transport stream, that is an application, and cause the Java™ VM 1003 to execute it. A format called DSMCC, which is noted in the MPEG specifications ISO/IEC 13818-6, is used as the method of embedding the Java™ program into the MPEG-2 transport stream. Here, detailed descriptions of DSMCC are omitted.

DSMCC specification defines a method of encoding a file system comprised of directories and files used by a computer, in packets within an MPEG-2 transport stream. Furthermore, information of the Java™ program to be executed is carried in packets in the MPEG-2 transport stream in the form of AIT. Here, AIT stands for Application Information Table defined in OCAP 1.0 specification.

First, in order to obtain the AIT, the AM 1005b obtains the PAT and PMT as in the case of the JMF 1005a, so as to obtain the packet ID of the packet which stores the AIT. Assuming that "2" is the provided channel identifier and that the PAT shown in FIG. 17 and the PMT shown in FIG. 18 are being transmitted, the AM 1005b obtains the PMT shown in FIG. 18 according to the same procedure by the JMF 1005a. The AM 1005b extracts, from the PMT, the packet ID of the elementary stream whose stream type is "Data" and which has "AIT" as additional information. As shown in FIG. 18, the elementary stream in the row 1813 corresponds to such elementary stream, and therefore the AM 1005b obtains the packet ID "5013" from it.

Figures 19, 20:
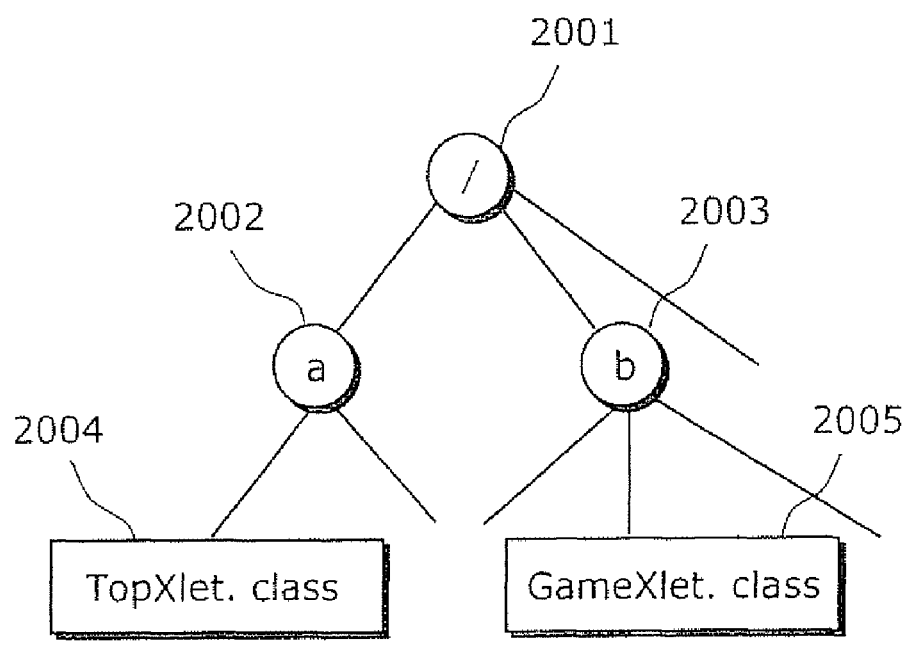
FIG. 19 is a schematic diagram showing the details of an AIT specified in the OCAP1.0 standard according to the present invention.
FIG. 20 is a schematic diagram showing a file system sent in DSMCC format according to the present invention.

The AM 1005b provides the TS decoder 505 with the packet ID of the AIT and the CPU 514 as an output destination through the library 1001b of the OS 1001. The TS decoder 505 then performs filtering based on such provided packet ID, and passes the resultant to the CPU 514. Accordingly, the AM 1005b can collect the packets of AIT. FIG. 19 is a table that schematically shows an example of the collected AIT information. A column 1901 describes identifiers of Java™ programs. A column 1902 describes control information for controlling the Java™ programs. The control information includes "autostart", "present" and "kill". "autostart" means that the terminal apparatus 500 automatically executes the program promptly. "present" means that the program is not executed automatically. "kill" means that the program is to be terminated.

A column 1903 describes DSMCC identifiers used for extracting packet IDs that include Java™ programs in the DSMCC format. A column 1904 describes program names of the Java™ programs. A column 1905 describes priorities. Priorities can be used for deciding orders among plural applications in a process. Each of rows 1911 and 1912 is a set of information of a Java™ program. The Java™ program defined in the row 1911 is a set of an identifier "301", control information "autostart", a DSMCC identifier "1", a program name "a/TopXlet", and a priority level "100". The Java™ program defined in the row 1912 is a set of an identifier "302", control information "present", a DSMCC identifier "1", a program name "b/GameXlet", and a priority level "50". Here, these two Java™ programs have the same DSMCC identifier, to which indicates that two Java™ programs are included in the file system which has been encoded according to the same DSMCC method. Here, only four items of information are specified for the respective Java™ programs, but more items of information are specified in actuality. The OCAP 1.0 specification shall be referred for the details.

The AM 1005b finds the "autostart" Java™ program from the AIT, and extracts the corresponding DSMCC identifier and Java™ program name. Referring to FIG. 19, the AM 1005b extracts the Java™ program in the row 1911, and obtains the DSMCC identifier "1" and the Java™ program name "a/TopXlet".

Next, the AM 1005b obtains, from the PMT, the packet ID of packets that store Java™ programs in the DSMCC format, using the DSMCC identifier obtained from the AIT. More specifically, the AM 1005b obtains, from the PMT, the packet ID included in the elementary stream having a stream type of "Data" and having a matching DSMCC identifier in the additional information.

Here, assuming that such DSMCC identifier is "1" and the PMT is the one shown in FIG. 18, the elementary stream in the row 1814 satisfies the above condition. Therefore, the packet ID "5014" is to be extracted.

The AM 1005b indicates, to the TS decoder 505, the packet ID of packets in which data is embedded in the DSMCC format as well as the CPU 514 as an output destination through the library 1001b of the OS 1001. Here, the packet ID "5014" is provided. The TS decoder 505 then performs filtering based on such provided packet ID, and passes the resultant to the CPU 514. Accordingly, the AM 1005b can collect the required packets. The AM 1005b reconstructs the file system from the collected packets according to the DSMCC method, and stores the reconstructed file system into the primary storage unit 511. The process of extracting data such as the file system from packets in the MPEG-2 transport stream and storing the extracted data into storage units such as the primary storage unit 511 is hereinafter called download.

FIG. 20 is one example of a downloaded file system. In the diagram, a circle represents a directory and a square represents a file; 2001 is a root directory; 2002 is a directory "a"; 2003 is a directory "b"; 2004 is a file "TopXlet.class"; and 2005 is a file "GameXlet.class".

Subsequently, the AM 1005b passes, to the Java™ VM 1003, a Java™ program to be executed out of the file system downloaded into the primary storage unit 511. Assuming that the name of the Java™ program to be executed is "a/TopXlet", the file "a/TopXlet.class", in which ".class" is added to the end of the Java™ program name, is the file to be executed. "/" is a directory and file name division, and referring to FIG. 20, the file 2004 is the Java™ program which should be executed. Next, the AM 1005b passes the file 2004 to the Java™ VM 1003.

The Java™ VM 1003 executes such received Java™ program.

Upon receiving a different channel identifier, the service manager 1004 terminates, through each library included in the Java™ library 1005, the video/audio being reproduced through the same respective libraries included in the Java™ library 1005 and the executed Java™ program, and then, based on the newly-accepted channel identifier, carries out video/audio reproduction and Java™ program execution.

It should be noted that the application executed by the AM 1005b based on the aforementioned AIT is a type of Java program so that the content to be reproduced can be designated by calling select (int channel) method provided by the service manager 1004.

In the OCAP 1.0 specification, instead of the program that is previously prepared in the terminal such as the EPG 1002, it is defined a procedure of downloading an application from outside the terminal apparatus and executing it. Hereinafter, such application is referred to as a monitor application.

Figure 21:
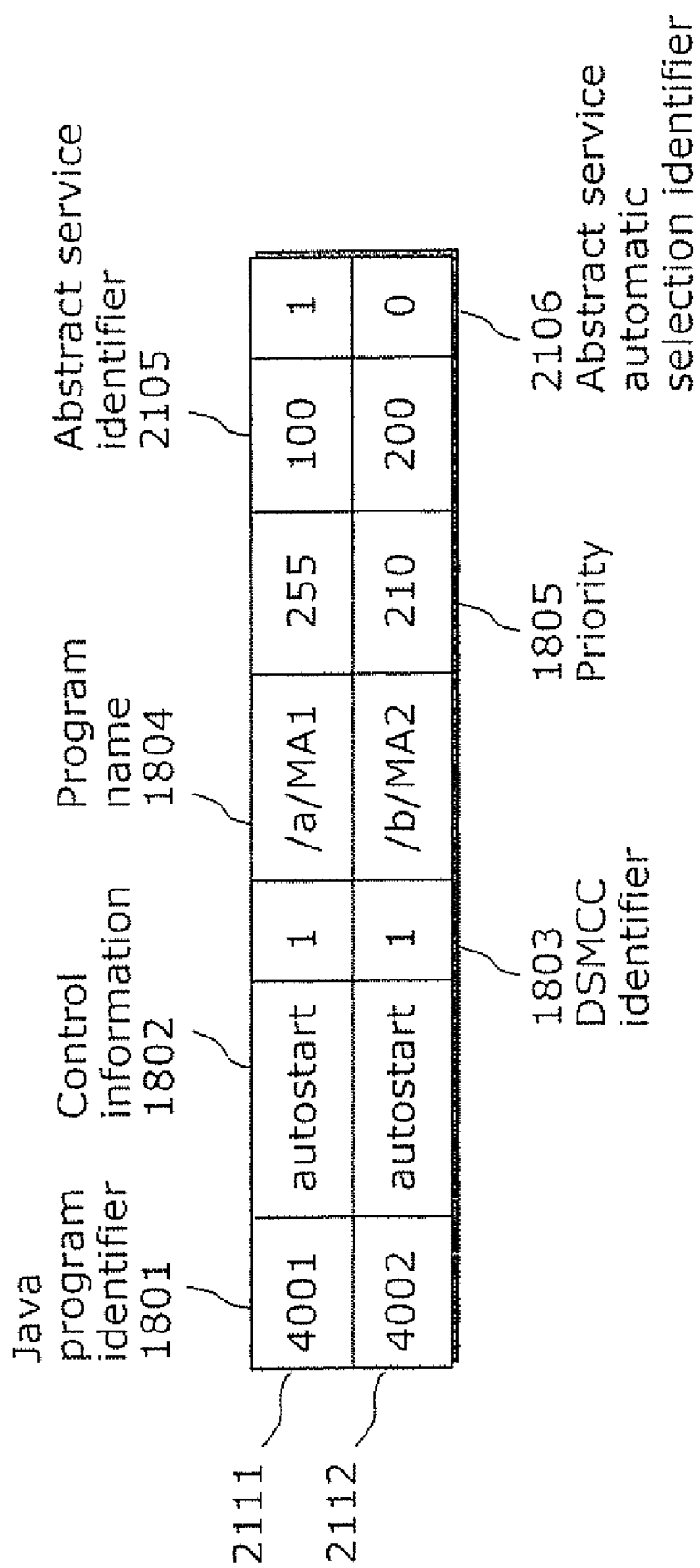
FIG. 21 is a schematic diagram showing the details of an XAIT according to the present invention.

FIG. 21 illustrates a table that schematically shows an example of special program information (hereinafter referred to as XAIT) sent from the head end 101. The structure of XAIT is similar to that of the AIT shown in FIG. 19 so that same reference numbers are attached to the same constituent elements and the redundant explanations are omitted. A column 2105 describes abstract service identifiers, each of which indicates an abstract service to which a monitor application belongs. Here, the abstract service is a concept indicating a set of applications. Its feature is different from the content to be broadcast in that it does not relate to video and audio but only relates to applications. In other words, the service manager 1004 does not perform processing relating to video and audio (specifically, the process of calling CA 1005d and JMF 1005a). A column 2106 describes abstract service automatic selection identifiers. According to such identifier, it is determined whether or not a current abstract service is to be selected. For example, an abstract service is automatically selected when the abstract service automatic selection identifier 2106 is 1, and the monitor application belonging to the abstract service is started as the result. An abstract service is not automatically selected except when the abstract service automatic selection identifier 2106 is 1. Therefore, the monitor application belonging to the abstract service is not started unless the abstract service is selected using some means.

A row 2111 and a row 2112 respectively describe a set of information relating to a monitor application. The monitor application defined by the row 2111 is a set of a Java program identifier "401", control information "autostart", a DSMCC identifier "1", a program name "a/MA1", a priority level "255", an abstract service identifier "100", and an abstract service automatic selection identifier "1". The monitor application defined by the row 2112 is a set of an identifier "402", control information "present", a DSMCC identifier "1", a program name "b/MA2", a priority level "210", an abstract service identifier "200", and an abstract service automatic selection identifier "0".

The service manager 1004 tries to obtain an XAIT after being started by the OS 1001. Whereas the XAIT can be sent and obtained by any type of methods, it is sent by being stored in a place that is previously determined by a specification, for example, using OOB. When obtaining the XAIT shown in FIG. 21, the service manager 1004 searches for an abstract service whose abstract service automatic selection identifier 2106 is 1, while analyzing the details. When the abstract service whose abstract service automatic selection identifier 2106 is 1 is found, the service manager 1004 reproduces the abstract service. Unlike the case of reproducing the content to be broadcast, the service manager 1004 sends, as a process, an instruction to the AM 1005b to start a monitor application without sending it to the Tuner 1005c, the CA 1005d, and the JMF 1005a. The process in the AM 1005b is same as in the case of the channel at which a content is to be broadcast, and therefore the explanation is omitted.

The started monitor application can control constituent elements in the terminal using the Java library 1005. For example, in the case where the started monitor application selects a channel instead of the EPG 1002, the same processing as in the case where the EPG 1002 selects a channel is performed by which the monitor application directly calls the Java library 1005. Since the monitor application is a type of Java program, it is also possible that the monitor application selects a channel via the service manager by calling a select (int channel) method that is the Java method provided by the service manager 1003. Accordingly, the application which is not related to a channel can be started. More specifically, the service manager 1004 can simultaneously manage two or more services (that is, a channel at which a content is to be broadcast and an abstract service).

However, a specific restriction may be added. For example, the above restriction is assumed to be a restriction that only one of the contents to be broadcast can be managed at one time. This restriction causes the following: in the case where a content to be broadcast is currently being reproduced (that is, the content is being viewed), upon receiving an instruction to reproduce another content to be broadcast, the currently being reproduced content is excluded from the management (that is, the reproduction is stopped), and the another content is reproduced and managed (that is, the another content can be viewed).

Here, an example of the application to be started by the AM 1005b is described.

Figure 22:
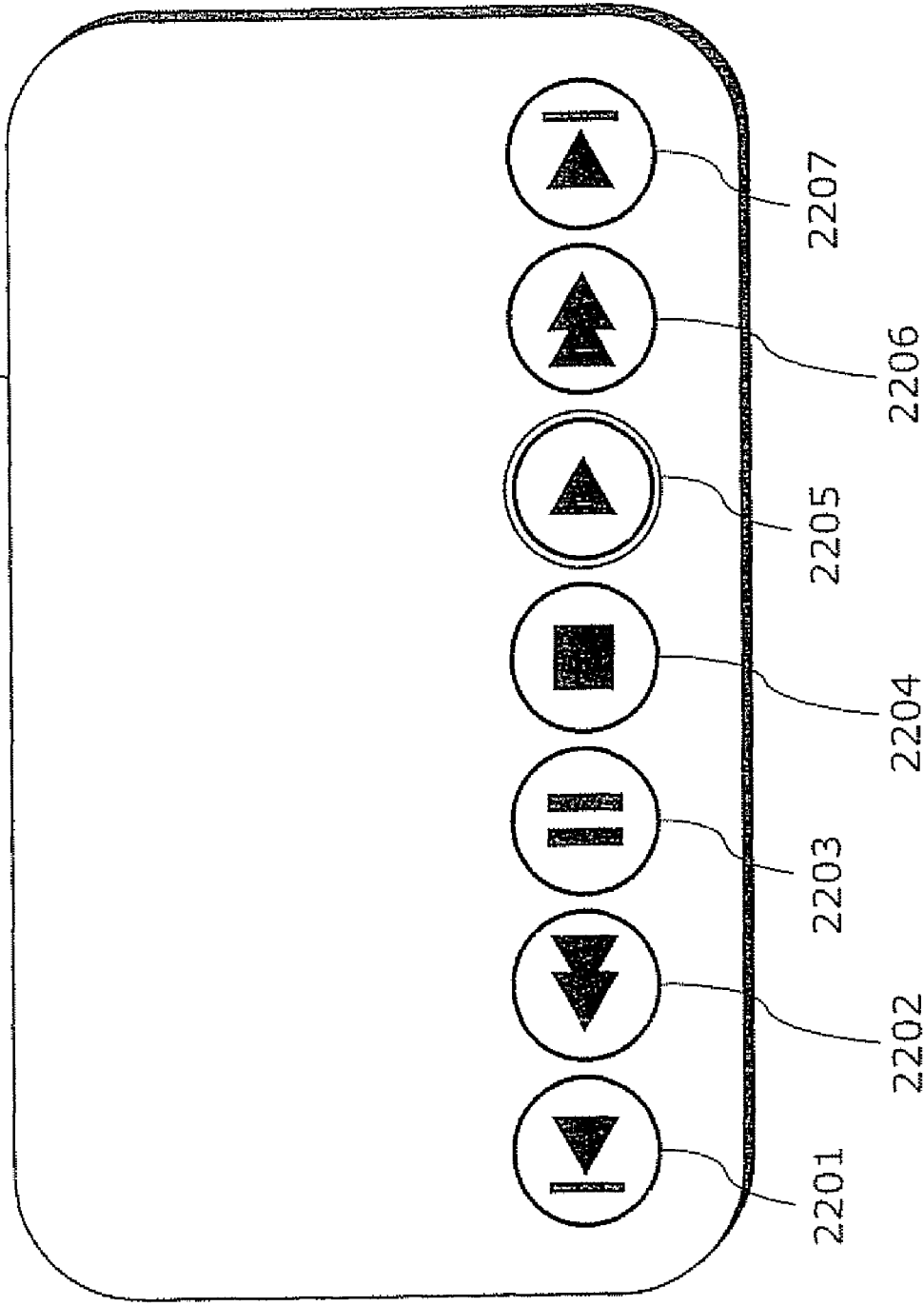
FIG. 22 shows an example of a screen displayed by the display 509 according to the present invention.

FIG. 22 shows an example of a Graphical User Interface (GUI) displayed on the display 509, for the application which performs trick play of video and audio included in the recorded content, to accept the instruction by the user. 2201 to 2207 respectively have a function of instructing the JMF 1005a to perform trick play or normal reproduction of video and audio according to a user's selection using the input unit 513. Specifically, 2201 has a function of moving a reproduction position forward for a predetermined section forward, 2202 has a function of rewind a reproduction, 2203 has a function of pause a reproduction, 2204 has a function of stop a reproduction, 2205 has a function of normal reproduction, 2206 has a function of fast-forward a reproduction, and 2207 has a function of moving a reproduction position backward for a predetermined section. The details about the method of moving, for a predetermined section, such positions of fast-forward and reproduction using the JMF 1005a is described in the explanation of the JMF 1005a.

Here, as described in the above, the service manager 1004 can accept not only reproduction instructions for the content being broadcast and the abstract service, but also a reproduction instruction for the content recorded in the secondary storage unit 510. As similar to the reproduction instruction of the broadcast content, the service manager 1004 can instruct to reproduce the recorded content by providing the recorded data identifier 2301 to the service manager through JNI, or by providing the recorded data identifier to the channel parameter of the select (int channel) method that is the Java method provided by the service manager 1004. The recorded data identifier is a value of the recorded data identifier 2301 shown in FIG. 23 and is assigned by the recording manager 1210. The detailed explanations about a format of recording data and the recording data identifier 2301 generated by the recording manager 1210 are given later.

It is described about the processing in the case where the service manager 1004 accepts a reproduction instruction of the recorded content using one of the aforementioned methods. Upon accepting the reproduction instruction of the recorded content, the service manager 1004 passes the MPEG transport stream output from the secondary storage unit 510 to the TS decoder 505. Note that, it may be configured that the CA 1005d performs descrambling by scrambling the content at the time of recording.

Next, the service manager 1004 provides a JMF 1005a inside the Java™ library 1005 with a recorded data identifier 2301, so as to request for the reproduction of the video/audio.

First, the JMF 1005a obtains storage information 2303 corresponding to the recorded data identifier 2301 from the data (FIG. 23) stored in the recording manager 1210. The storage information is a file path name for indicating a file location of the recorded content, that is, the additional data such as video, audio and application. However, the storage information 2303 may be passed from the service manager 1004 instead of being obtained by the JMF 1005a. The JMF 1005a determines, from information stored as the storage information 2303, video/audio to be reproduced, and reproduces the determined video/audio. A reproduction method can be realized by the aforementioned method shown in the case of reproducing the channel at which a content is to be broadcast or by a publicly-known technique. It is thus less related to the present invention so that the detailed explanation is omitted. For example, PAT and PMT are obtained from the recorded content, and video and audio are reproduced based on the information described in the obtained PMT.

Finally, the service manager 1004 provides the channel identifier to an AM 1005*b* in the Java™ library 1005, so as to request for execution of an application.

First, the AM 1005*b* obtains storage information 2303 corresponding to the recorded data identifier 2301 from the data (FIG. 23) stored in the recording manager 1210. However, the storage information 2303 may be passed from the service manager 1004 instead of being obtained by the AM 1005*b*. The AM 1005*b* obtains, from the information stored as the storage information 2303, information relating to an application to be executed. Whereas a method of saving files which configured of an application and a method of obtaining an AIT depend on the recording method used at the time of recording, the method of executing an application can be realized by a method shown in the case of executing the application in the channel to be broadcast or by a publicly-known technique. It is thus less related to the present invention, so that the detailed explanation is omitted. Furthermore, the present invention can be realized by any type of recording method or obtainment and analyzing methods as long as the application in the recorded channel is to be executed.

While it is described in the above that the service manager 1004 can simultaneously manage two or more services, in the case where the content to be broadcast can be recorded and reproduced, the service manager 1004 can accept reproduction instructions of three types of services (in other words, the content to be broadcast, the abstract service and the recorded content), and perform management corresponding to the accepted instructions.

Here, referring to FIG. 24, it is described about an example with respect to a management method performed by the service manager 1004.

The service manager 1004 retains the data structure in the primary storage unit 511 shown in FIG. 24. A column 2401 describes service types, each of which shows a type (in other words, one of the aforementioned three types) of service that is reproduced and managed. A column 2402 describes service identifiers, each of which is an identifier identified by one of the types, according to the service type. A row 2411 and a row 2412 respectively indicate a service that is reproduced and managed. The service indicated in the row 2411 has "Recorded content" as the service type 2401 and "Channel 1" as the service identifier 2402. Furthermore, the service indicated in the row 2412 has "Abstract service" as the service type 2401 and "100" as the service identifier 2402.

More specifically, as an example, the service indicated in the row 2411 is the one recorded the channel indicated in the row 1211 shown in FIG. 12. The service has constituent elements of video, audio, application (originally the one transmitted in the DSMCC method) and AIT shown in FIG. 18. A state where the service indicated in the row 2411 is being reproduced and managed shows a state in which the video and audio are being reproduced and the application is being executed. More specifically, an AIT is the one shown in FIG. 19, and an application (referred to as broadcast interlocking application hereinafter) having 301 as a Java program identifier is executed in accordance with the aforementioned procedure. Furthermore, the service indicated in the row 2412 is an abstract service that is reproduced and managed based on the XAIT shown in FIG. 21. A state where the service indicated in the row 2412 is being reproduced and managed shows a state where an application (simply referred to as a monitor application hereinafter) having 401 as a Java program identifier is being executed, as shown in FIG. 21.

Hereinafter, using this state as a representative example, it is described about the problems to be solved by the present invention and the solution thereof.

The broadcast interlocking application can perform, using JMF 1005*a*, trick play of video/audio being reproduced in association with the broadcast interlocking application itself. The broadcast interlocking application can construct attractive details under pre-estimated situation, by two-way conjunction with the viewers.

However, if the monitor application can similarly perform trick play of video/audio in association with the broadcast interlocking application using JMF 1005*a*, the broadcast interlocking application has to deal with reproduction states as much as they cannot be taken into consideration. Therefore, it is difficult to generate an application and to keep quality of a program in which the application is included. On the contrary, in the case where the monitor application plays a main role such as an EPG, there is a possibility that an instruction for trick play from the monitor application is interfered with the broadcast interlocking application. In the case where the instruction for trick play from the monitor application is an instruction based on an operation of a remote control by the viewer, there is a sufficient possibility that the viewer may be confused. Furthermore, in the case where two or more monitor applications are executed, there is a possibility that a discrepancy is caused for trick play instructions among monitor applications. The JMF specification does not include a framework for solving such problems.

In other to solve the aforementioned problems, the present invention introduces an exclusive control mechanism for trick play instructions.

Figure 25:
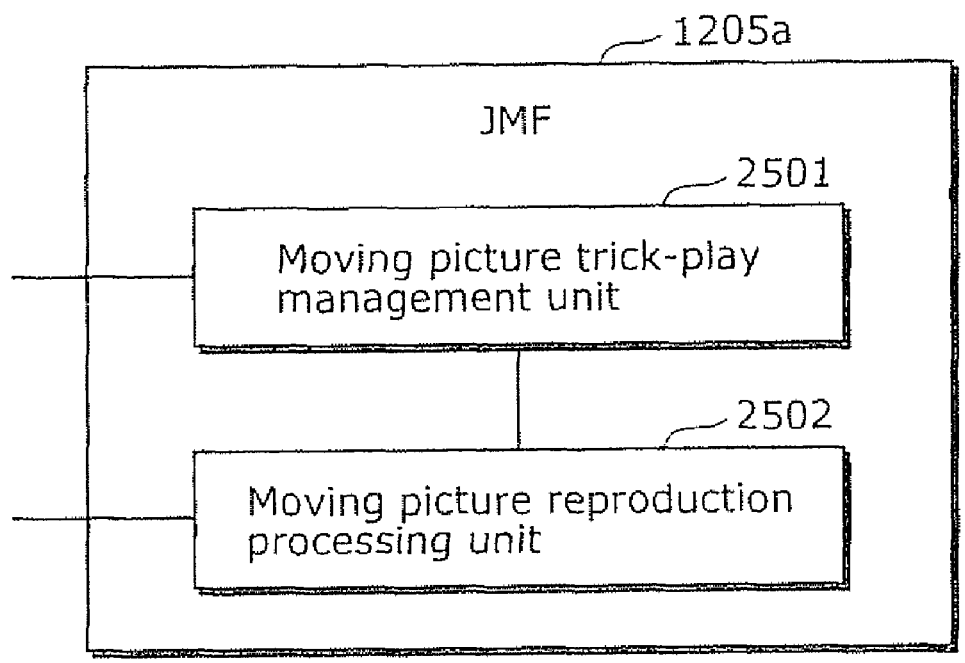
FIG. 25 is a diagram showing a structure of JMF 1205a according to the present invention.

FIG. 25 shows an internal structure of the JMF 1005*a*. The JMF 1005*a* includes a moving picture trick play management unit 2501 and a moving picture reproduction processing unit 2502.

The moving picture trick play management unit 2501 retains and manages speed (reproduction speed) and time information for reproducing a moving picture in the JMF 1005*a*. Furthermore, reproduction speed and time can be set and obtained from the application, the constituent elements in the Java™ library 1005, or the service manager 1004 (they are collectively referred to as external unit, hereinafter).

Figure 26A:
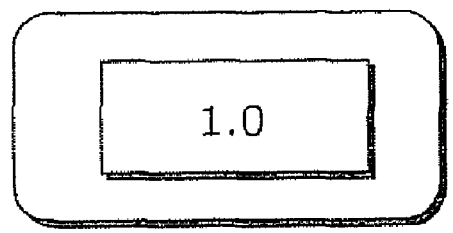
FIG. 26 shows an example of information stored in the primary storage unit 511 according to the present invention.
Figure 26B:
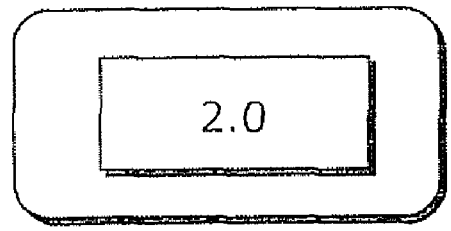
Figure 26C:
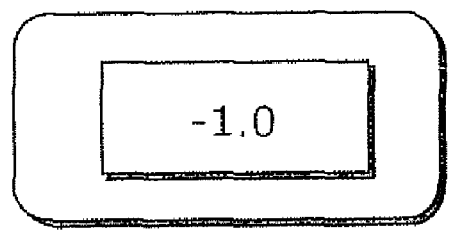

Reproduction speed indicates, for example, normal reproduction at the value of 1.0, fast-forward at the value larger than 1.0, stop at the value of 0.0, low-speed reproduction (slow) at the value that is larger than 0.0 and smaller than 1.0, and rewind at the value smaller than 0.0. In other words, it indicates that normal reproduction applies to only when the value is 1.0, and trick play applies to the values other than 1.0. FIGS. 26A, 26B and 26C are diagrams schematically showing reproduction speed stored in the primary storage unit 511 by the moving picture trick play management unit 2501 in the above cases. FIG. 26A shows a state where 1.0 indicating normal reproduction is retained. Here, in the case where 2.0 is set as an instruction for fast-forward sent from the external unit, the above state is changed to a state shown in FIG. 26B. Furthermore, in the case where −1.0 is set as an instruction for rewind sent from the external unit, the above state is changed to a state shown in FIG. 26C.

In addition, the moving picture trick play management unit 2501 always retains reproduction speed of some kind. In other words, it has reproduction speed of some kind as an initial value. For example, in the case where reproduction speed has not been set by the external unit, it retains the value of 1.0. It should be noted that the present invention can be realized using number values other than the above, as long as normal reproduction and trick play can be identified. Accordingly, an expression indicating that normal reproduction or trick play is set is used hereinafter instead of specific number values. Furthermore, the setting of reproduction speed instructs normal reproduction or trick play.

Time information is time on a time axis of video/audio. Specifically, for example, in the case where the length of video/audio is sixty minutes, zero minute indicates a head of the video/audio, sixty minutes indicate the end, and thirty minutes indicate the middle point. The time information is also stored in the primary storage unit 511 as well as the reproduction speed.

Referring to FIG. 25, the moving picture reproduction processing unit 2502 reproduces video/audio to be reproduced, and instructs, to the secondary storage unit 510, the audio decoder 506, or the video decoder 508, the reproduction speed and time information obtained or instructed by the moving picture trick play management unit 2501. The audio decoder 506 or the video decoder 508 can reproduce audio or video at an instructed speed and time, as the result of which the secondary storage unit outputs an MPEG transport stream at the instructed speed and time.

Furthermore, the application, constituent elements in the Java™ library 1005, or the service manager 1004 can change a designation of video/audio to be reproduced and a reproduction state (a state of being reproduced, a state of being stopped, and the like). In addition, the moving picture reproduction processing unit 2502 retains information indicating what kind of instruction is currently being sent to the audio decoder 506 or the video decoder 508 (this is referred to as a reproduction status, hereinafter), so that it can reply the retained details in response to a request from the external unit or the moving picture trick play management unit 2501.

FIG. 27 is a method of Java which shows one example of moving picture trick play management unit 2501. A setMediaTime method accepts time to be used as a current time. For example, it is possible to move a reproduction position to a top of the content by specifying the time 0. A getMediaTime method accepts a request to obtain time retained by the moving picture trick play management unit 2501, and sends the time back. A setRate method accepts number values indicating reproduction speed. For example, −1 indicates rewind, and 2 indicates double-speed reproduction. A getRate method accepts a request to obtain reproduction speed retained by the moving picture trick play management unit 2501, and sends the reproduction speed back.

FIG. 28 is a method of Java which shows one example of a moving picture reproduction processing unit 2502. A start method accepts an instruction to start reproduction of video/audio. Upon accepting the above instruction, information specified by the setMediaTime or setRate shown in FIG. 27 is used. Furthermore, a close method accepts an instruction to terminate the reproduction.

Figure 29:
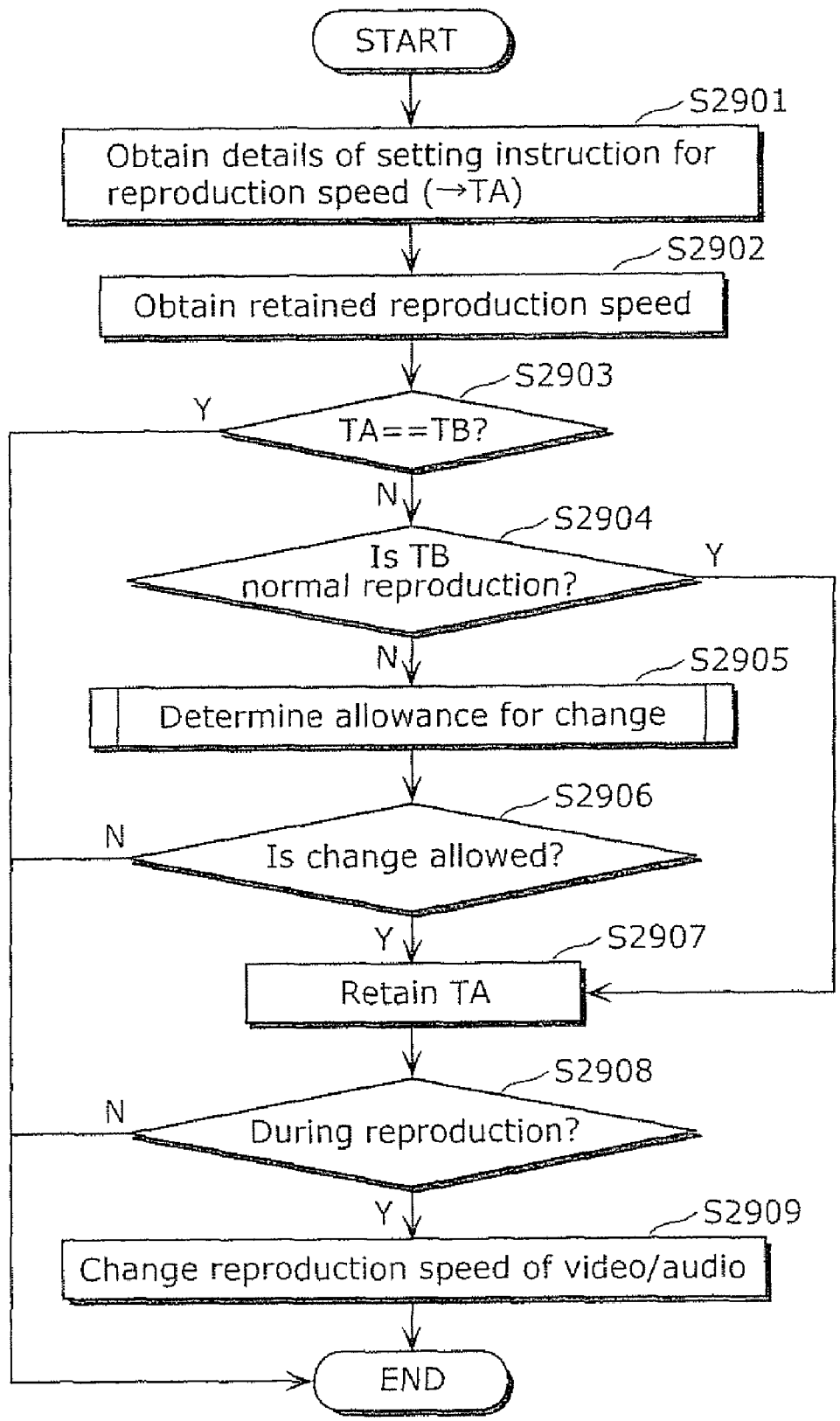
FIG. 29 is a flowchart according to the first embodiment.

FIG. 29 is a flowchart which shows a procedure by which the moving picture trick play management unit 2501 accepts an instruction to set reproduction speed from the external unit.

Upon receiving the instruction to set reproduction speed from the external unit, the moving picture trick play management unit 2501 obtains details of the instruction (hereinafter, the obtained details are referred to as TA) (S2901), obtains reproduction speed which has been stored in the primary storage unit 511 (hereinafter, the obtained details are referred to as TB) (S2902), and compares between TA and TB (S2903). When TA is equivalent to TB, the processing is terminated because there is no need for change. When TA is different from TB, it is determined whether or not TB indicates normal reproduction (S2904). When TB does not indicate normal reproduction (in other words, trick play), a change allowance determination is performed (S2905). The method of change allowance determination shall be later described in detail. When it is determined as "change denial" as the result of the change allowance determination (S2906), the processing is terminated. When it is determined as "change allowance", the details stored in the primary storage unit 511 are replaced to TA (S2907). In S2904, the details stored in the primary storage unit 511 are replaced to TA even in the case where TB indicates normal reproduction (S2907).

Next, the moving picture trick play management unit 2501 inquires the moving picture reproduction processing unit 2502 about a reproduction status, and determines whether or not the result indicates a state of being reproduced (S2908). When it does not indicate the state of being reproduced, the processing is terminated. When it indicates the state of being reproduced, the moving picture trick play management unit 2501 indicates a reproduction speed to the moving picture reproduction processing unit 2502 (S2909). Accordingly, the instruction to set reproduction speed from the external unit is reflected to a reproduction status of video and audio.

Note that, when it is determined as "change denial" in S2906, the change denial may be notified to an instruction setter that made a setting instruction of the reproduction speed. With respect to a notification method, the present invention can be realized by any type of method such an exceptional mechanism in Java™ language that is a publicly-known technique.

Figure 30:
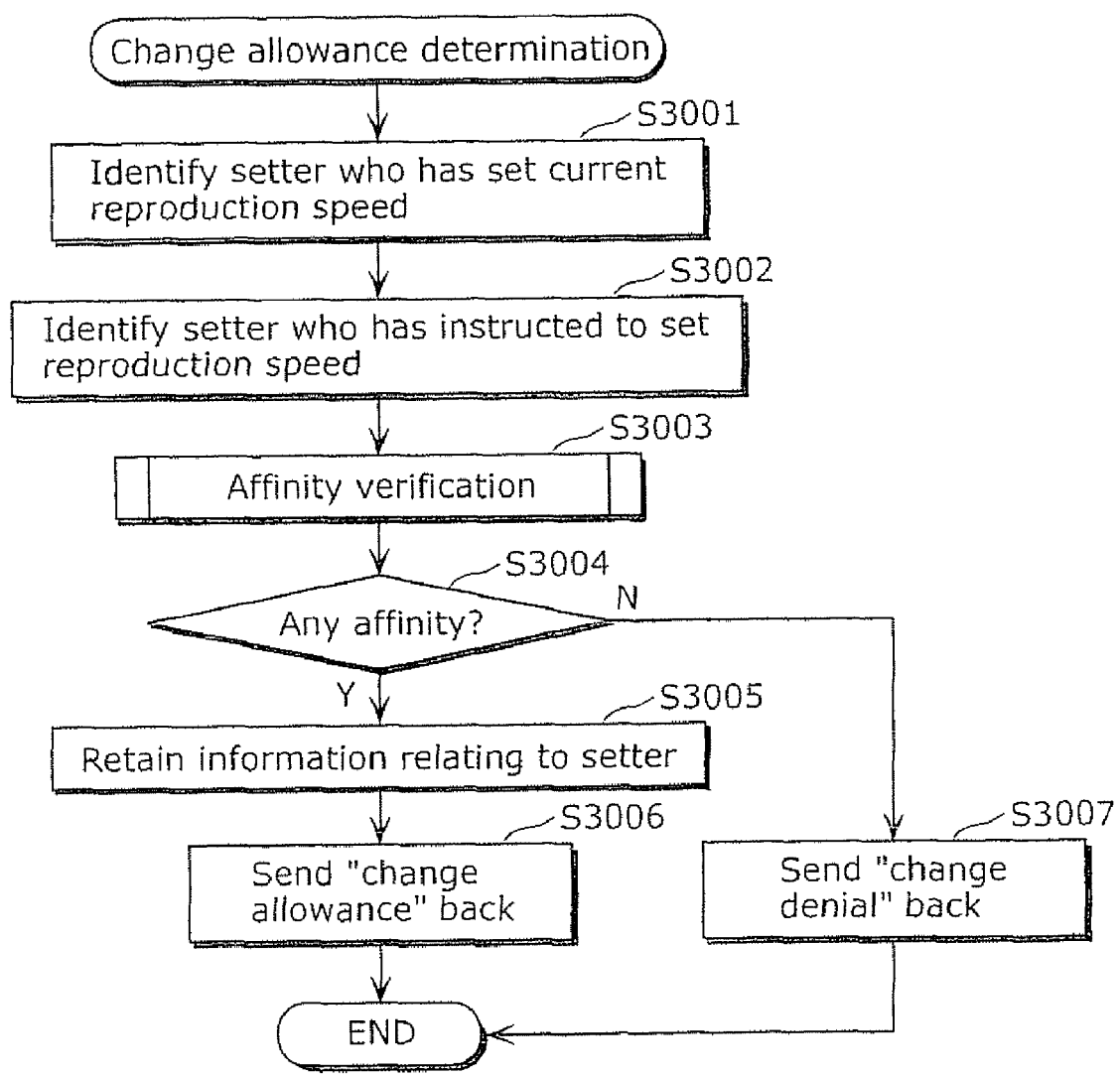
FIG. 30 is a flowchart according to the first embodiment.

FIG. 30 is a flowchart which shows a detailed procedure of the "change allowance determination (S2905)".

The moving picture trick play management unit 2501 specifies a setter (an application, constituent elements in the Java™ library 1005, or the service manager 1004) which causes to retain TB (S3001). Hereinafter, the setter specified in S3001 is referred to as an "old setter". It should be noted that a specific method of specifying a setter is less related to the present invention, so that the explanation is omitted. For example, it can be realized using publicly-known techniques such as a method of using a process in which a setter operates or a thread.

Figure 31A:
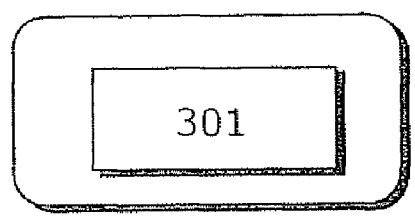
FIG. 31 is a flowchart according to the first embodiment.
Figure 31B:
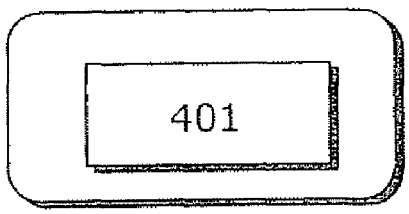

Furthermore, it is assumed that the moving picture trick play management unit 2501 can store, in the primary storage unit 511, information relating to the specified setter, and obtain the stored information. FIG. 31A and FIG. 31B are diagrams which schematically show information relating to a setter stored in the primary storage unit 511. In FIG. 31A, the primary storage unit 511 retains "301" as a Java program identifier. This indicates that current reproduction speed is set by the application having a Java program identifier of "301". In the case where the primary storage unit 511 accepts a setting instruction of reproduction speed from the application having a Java program identifier of "401", a state shown in FIG. 31B is obtained. Furthermore, in the case where the setter is other than the application (for example, the service manager 1004), additional information or a special value (for example, "−1") may be retained. Regardless of types of information to be retained, the present invention can be realized as long as information sufficiently enough to specify a setter can be retained.

Moreover, in a status where reproduction speed has never been set, it may be determined that an instruction setter that sent an instruction for reproduction to the JMF 1005a (e.g. the service manager 1004 or the application), as an old setter or treated as that there is no old setter.

Next, referring to FIG. 30, the moving picture trick play management unit 2501 specifies a setter which sent an instruction to set reproduction speed (S3002). Hereinafter, the setter specified in S3002 is referred to as a "new setter". Next, affinity verification between an old setter and a new setter is performed (S3003). Details of affinity verification are given later. Determining the result of the affinity verification (S3004), when it is determined that there is no affinity (S3004), the moving picture trick play management unit 2501 sends the determination result of "change denial" back (S3007), and terminates the processing. When it is determined that there is affinity, the moving picture trick play management unit 2501 stores information about the new setter into the primary storage unit 511 (S3005), sends the determination result of "change allowance" back (S3006), and terminates the processing.

Figure 32:
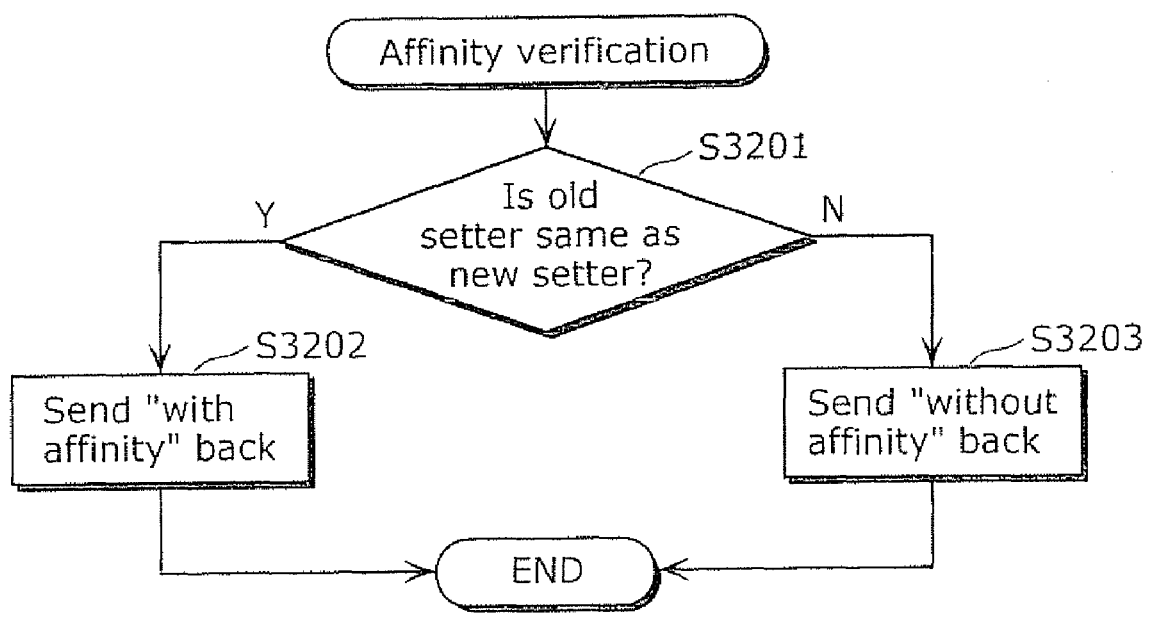
FIG. 32 shows an example of information stored in a primary storage unit 511 according to the present invention.

Next, processing of affinity verification (S3003) shall be described. FIG. 32 is a flowchart which shows a procedure of the affinity verification.

The moving picture trick play management unit 2501 compares information relating to the old setter with information relating to the new setter, and determines their similarity (S3201). When determining that they are same, the moving picture trick play management unit 2501 sends "with affinity" back (S3202), and terminates the processing. When determining that they are different from each other, it sends "without affinity" back (S3203), and terminates the processing.

In addition, in the present embodiment, the ROM 512 can be deleted by making the secondary storage unit 510 retain the details retained by the ROM 512. Further, the secondary storage unit 510 may be configured of a plurality of sub-secondary storage units, with each sub-secondary storage unit storing different information. It is possible to precisely divide the sub-secondary storage units: for example, only tuning information is stored in one of the sub-secondary storage units; the library 1001b of the OS 1001 is stored in another sub-secondary storage unit; downloaded Java™ programs are stored in yet another sub-secondary storage unit; and so on.

Furthermore, in the present embodiment, the registered Java™ program and contents are stored in the secondary storage unit 510, it is possible to store them in the primary storage unit 511. In the case where they are stored in the primary storage unit 511, all stored information disappears when the power is turned off.

Accordingly, in a status where normal reproduction is set, it is realized to receive a request from any setter and, in a status where trick play is set, it is realized to receive, an instruction to set reproduction speed/time only from the old setter. Therefore, it is possible to prevent an occurrence of situation in which the reproduction status is changed by another new setter while the old setter is performing trick play.

It should be noted that the details shown in FIG. 15 are not limited to the details indicated herein, and they only need to include information sufficient enough for recording processing. Furthermore, the details may be configured of plural tables. In addition, whereas it is described that the details are stored in the primary storage unit 511, information relating to recording reservation can be retained even after the power is cut-off by storing them in the secondary storage unit 510.

Second Embodiment

In the present embodiment, a procedure that is different from the procedure of "affinity verification" described in the first embodiment is described.

The configuration of hardware in the present embodiment is same as the one in the first embodiment, so that redundant explanations are omitted. Specifically, it is the hardware configuration shown in FIG. 5. In addition, the configuration of software in the present embodiment is same as the one in the first embodiment, so that redundant explanations are omitted. Specifically, it is the software configuration shown in FIG. 10. Furthermore, the operations of hardware and software are same as those explained using FIGS. 1 to 26 in the first embodiment, except the procedure of "affinity verification", so that redundant explanations are omitted.

In the case where there are plural applications in the same service, it is a common case that those applications recognize their existences and operate in conjunction with each other. In such case, it is not necessary to perform, among applications in the same service, exclusive processing relating to trick play. Accordingly, while, in the first embodiment, an old setter and a new setter are compared to determine whether or not they are in complete match, in the present embodiment, it is characterized to compare services to which respective setters belong.

Figure 33:
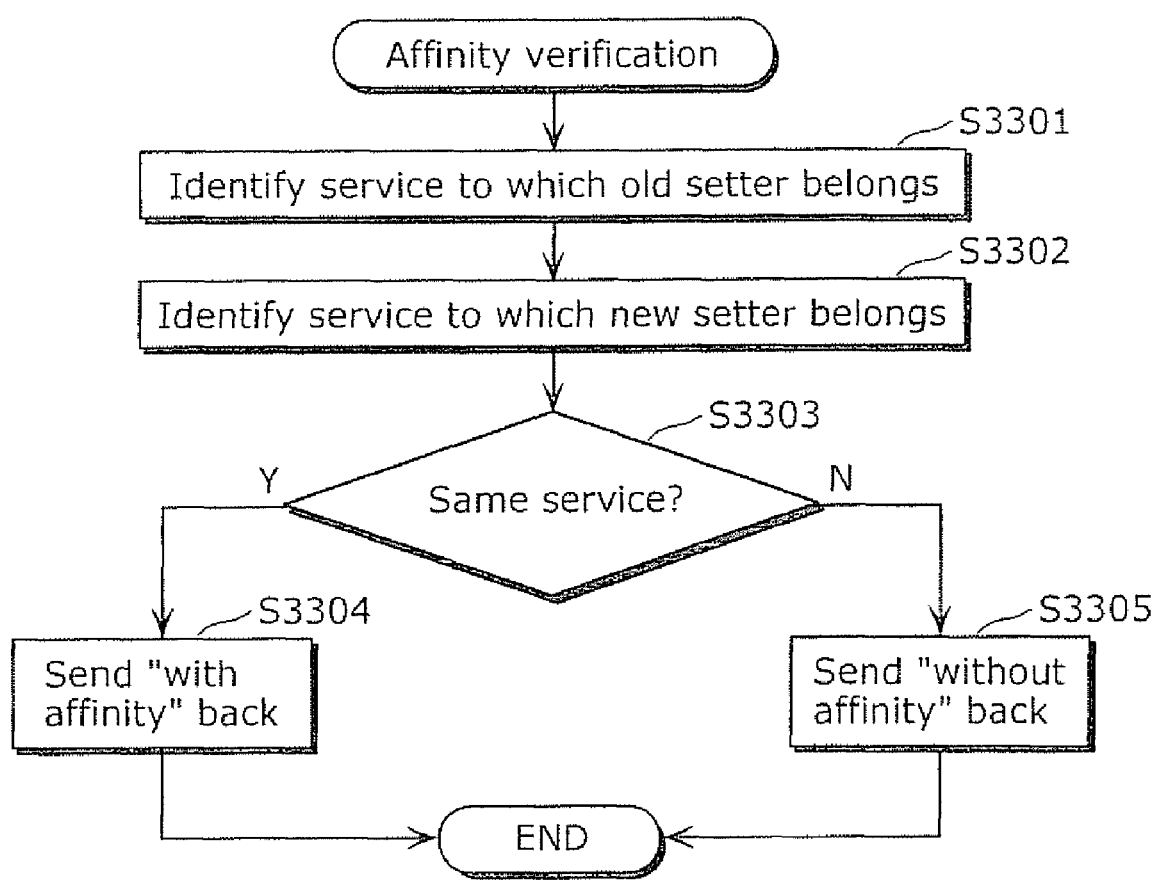
FIG. 33 is a flowchart according to the second embodiment.

FIG. 33 is a flowchart which shows a procedure of the affinity verification in the present embodiment.

The moving picture trick play management unit 2501 specifies a service to which the old setter belongs (S3301). The detailed explanation about a specific method for the specification is omitted in here since it is less related to the present invention. For example, the specification can be realized by which the AM 1005b retains a relation between information relating to the service provided to the AM 1005b by the service manager 1004 and the application started by the AM 1005b so as to allow the moving picture trick play management unit 2501 to obtain the retained information. It should be noted that the information relating to the application can be realized in compliance with the procedure described in the explanation of S3001 in FIG. 30.

Next, the moving picture trick play management unit 2501 specifies a service to which the new setter belongs (S3302).

The moving picture trick play management unit 2501 then compares the service to which the old setter belongs with the service to which the new setter belongs, and determines whether or not they are the same service (S3303). With respect to the comparison method, the present invention can be realized using any types of method. For example, it can be realized by comparing the service type 2401 with the service identifier 2402 shown in FIG. 24.

In S3303, when it is determined that they are the same service, the moving picture trick play management unit 2501 sends the determination result of "with affinity" back (S3304), and terminates the processing. When it is determined that they are not the same service, the moving picture trick play management unit 2501 sends the determination result of "without affinity" back (S3305), and terminates the processing.

It should be noted that, in the present embodiment, information relating to services is stored as information relating to setters in the process S3005 shown in FIG. 30, so that, in the process S3301 shown in FIG. 33, it is only necessary to obtain the retained details as a means for specifying a service.

Accordingly, in a status where normal reproduction is set, it is realized to receive a request from any setter, and, in the status where trick play is set, it is realized to receive, from only the setter belonging to the same service as the old setter, a setting instruction of reproduction speed/time. It is thus possible to prevent an occurrence of situation in which a new setter which belongs to a service other than the service to which the old setter belongs changes the reproduction status while the old setter is performing trick play.

Third Embodiment

In the present embodiment, a procedure that is different from the procedure of "affinity verification" described in the first embodiment is described.

The configuration of hardware in the present embodiment is same as the one in the first embodiment, so that redundant explanations are omitted. Specifically, it is the hardware configuration shown in FIG. 5. In addition, the configuration of software in the present embodiment is same as the one in the first embodiment, so that redundant explanations are omitted. Specifically, it is the software configuration shown in FIG. 10. Furthermore, the operations of hardware and software are same as those explained using FIGS. 1 to 26 in the first embodiment, except the procedure of "affinity verification", so that redundant explanations are omitted.

Accordingly, while, in the first embodiment, an old setter and a new setter are compared to determine whether or not they are in complete match, in the present embodiment, it is characterized to compare priorities given to the respective setters.

Figure 34:
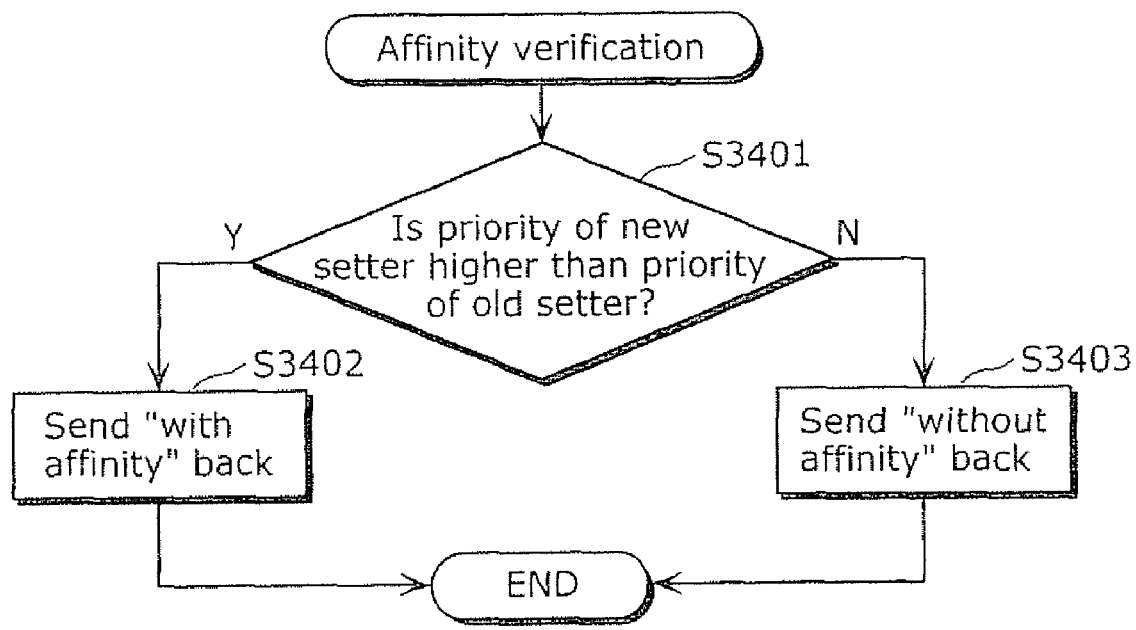
FIG. 34 is a flowchart according to the third embodiment.

FIG. 34 is a flowchart which shows a procedure of the affinity verification in the present embodiment.

The moving picture trick play management unit 2501 compares priorities respectively given to a new setter and an old setter (S3401). Here, in the case of applications, a priority level is information included in an AIT shown in FIG. 19 or an XAIT shown in FIG. 21 and is given to each application. Furthermore, in the case of constituent elements in the Java™ library 1005 or the service manager 1004, a predetermined arbitrary number may be previously given as a priority level. In S3401, for example, in the case where a higher priority level is preferred, if the priority level of the old setter is higher than that of the new setter, it is determined that the priority level is high. When it is determined that the priority level of the new setter is higher than the priority level of the old setter, the moving picture trick play management unit 2501 sends the determination result of "with affinity" back (S3402), and terminates the processing. On the other hand, when it is determined that the priority level of the new setter is lower than the priority level of the old setter, the moving picture trick play management unit 2501 sends the determination result of "without affinity" back (S3403), and terminates the processing. It should be noted that the present invention can be realized even any one of the determination results is made in the case where the priorities are equivalent to each other in S3401.

Accordingly, in a situation where normal reproduction is set, it is realized to receive a request from any setter, and, in the situation where trick-play is set, it is realized to receive, from only the setter having a priority level higher than that of the old setter, a setting instruction of reproduction speed/time. Consequently, it is possible to prevent an occurrence of situation in which a new setter having a priority level lower than that of the old setter changes the reproduction status while the old setter is performing trick play.

Fourth Embodiment

In the present embodiment, it is described about a new procedure of "affinity verification" that is a combination of characteristics described in the second and third embodiments.

The configuration of hardware in the present embodiment is same as the one in the first embodiment, so that redundant explanations are omitted. Specifically, it is the hardware configuration shown in FIG. 5. In addition, the configuration of software in the present embodiment is same as the one in the first embodiment, so that redundant explanations are omitted. Specifically, it is the software configuration shown in FIG. 10. Furthermore, the operations of hardware and software are same as those explained using FIGS. 1 to 26 in the first embodiment, except the procedure of "affinity verification", so that redundant explanations are omitted.

In the second embodiment, a change allowance is determined based on a determination about whether or not services are the same. In the third embodiment, a change allowance is determined by comparing priorities. In contract, the present embodiment is characterized in that a change allowance is determined by comparing the setters so as to determine whether or not they belong to the same service, and also by comparing the priorities.

Figure 35:
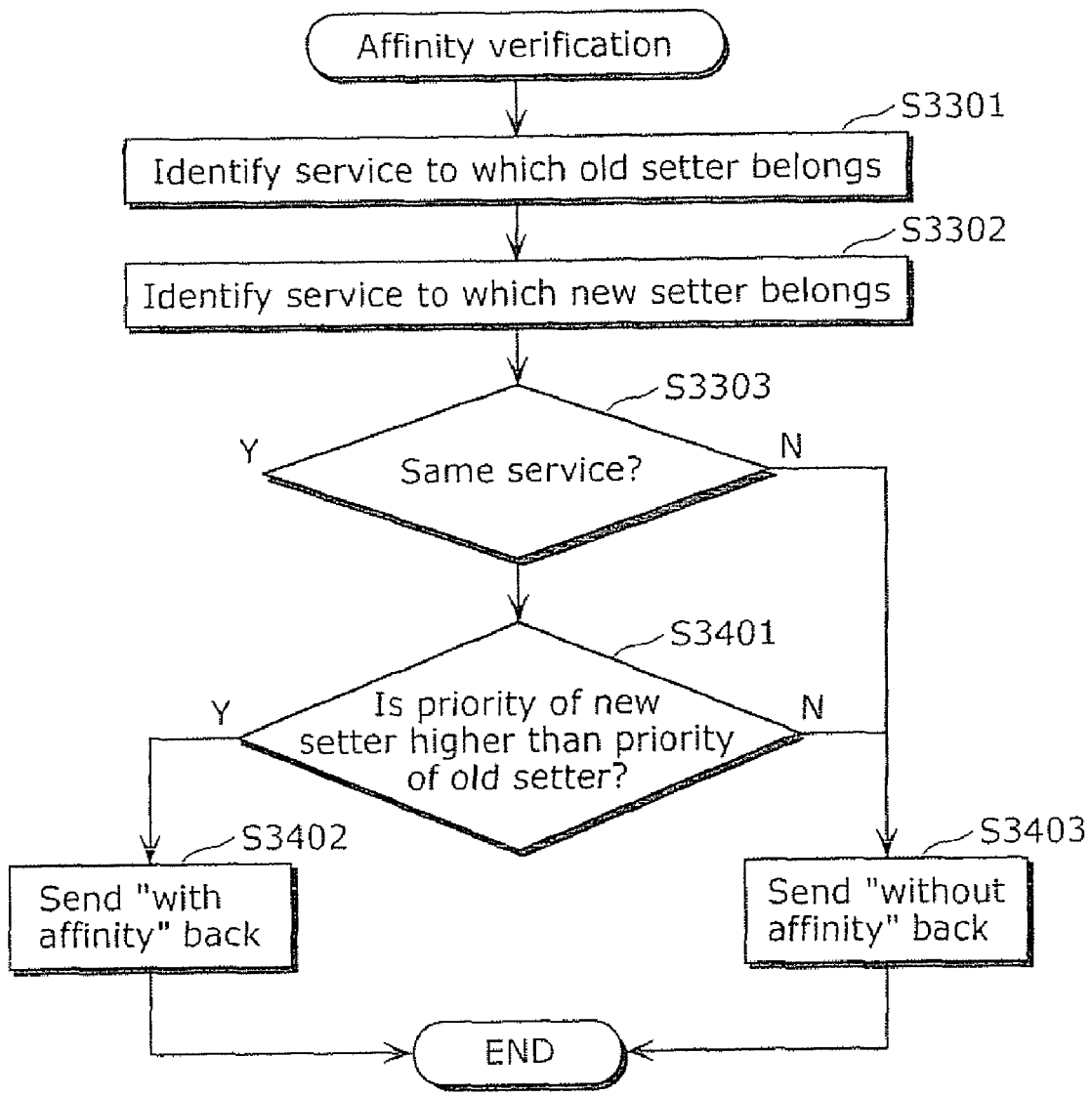
FIG. 35 is a flowchart according to the fourth embodiment.

FIG. 35 is a flowchart which shows a procedure of the affinity verification in the present embodiment. Same reference numbers are attached to the processes that are same in FIG. 33 and FIG. 34 so that the explanations about the same processes are omitted.

In S3303, when the services to which respective old and new setters belong are different from each other, the determination result of "without affinity" is sent back (S3403), and the processing is terminated. When the services are the same, priorities of respective old and new setters are compared (S3401). If the priority level of the new setter is higher than that of the old setter, the determination result of "with affinity" is sent back (S3402), and the processing is terminated. On the other hand, when the priority level of the old setter is higher than that of the new setter, the determination result of "without affinity" is sent back (S3203), and the processing is terminated. It should be noted that, also in the present embodiment, the present invention can be realized when any one of the determination results is made in the case where the priorities are equal to each other.

Figure 36:
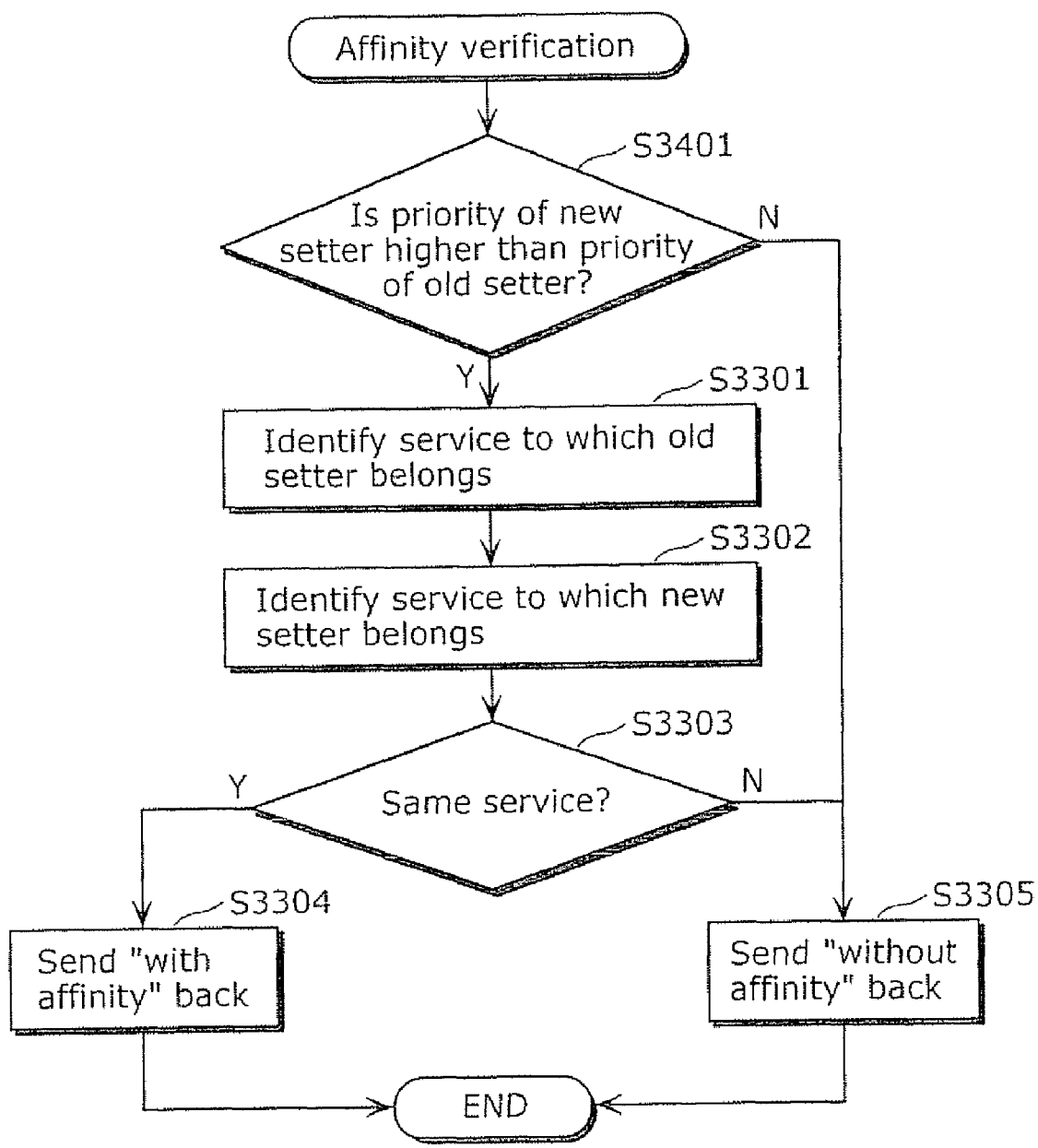
FIG. 36 is a flowchart according to the fourth embodiment.

Furthermore, in FIG. 35, comparison of priorities is performed after a determination about whether or not the services are the same is made. However, the order of procedures may be reversed, FIG. 36 is a flowchart which shows the reversed procedure.

In the case where priorities of respective old and new setters are compared (S3401), when the priority level of the new setter is higher than that of the old setter, the determination result of "with affinity" is sent back (S3305), and the processing is terminated. On the other hand, when the priority level of the new setter is higher than that of the old setter, specification of the service to which the old setter belongs (S3301) and specification of the service to which the new setter belongs (S3302) are performed and it is determined whether or not the specified services are the same service (S3303). When the services to which respective old and new setters belong are different from each other, the determination result of "without affinity" is sent back (S3305), and the processing is terminated. When the services are the same, the determination result of "with affinity" is sent back (S3304), and the processing is terminated.

Accordingly, in a status where normal reproduction is set, it is realized to accept a request from any setter, and, in a status where trick play is set, it is realized to accept a setting instruction of reproduction speed/time from only the setter belonging to the same service as the old setter and having a priority level higher than that of the old setter. Consequently, while the old setter is performing trick play, it is possible to prevent an occurrence of situation in which reproduction speed/time are changed by the new setter belonging to a service that is different from the service to which the old setter belongs and prevent an occurrence of situation in which reproduction status is changed by the new setter having a lower priority level than the old setter.

Fifth Embodiment

In the present embodiment, a procedure that is different from the procedure of "change allowance determination" described in the first embodiment is explained.

The configuration of hardware in the present embodiment is same as the one in the first embodiment, so that redundant explanations are omitted. Specifically, it is the hardware configuration shown in FIG. 5. In addition, the configuration of software in the present embodiment is same as the one in the first embodiment, so that redundant explanations are omitted. Specifically, it is the software configuration shown in FIG. 10. Furthermore, the operations of hardware and software are same as those explained using FIGS. 1 to 26 in the first embodiment, except the procedure of "change allowance determination", so that redundant explanations are omitted.

As shown in FIG. 30, in the first embodiment, a change allowance is determined by specifying an old setter and a new setter and verifying affinity between them. The present embodiment is characterized in that the affinity verification is performed by only specifying a new setter.

Figure 37:
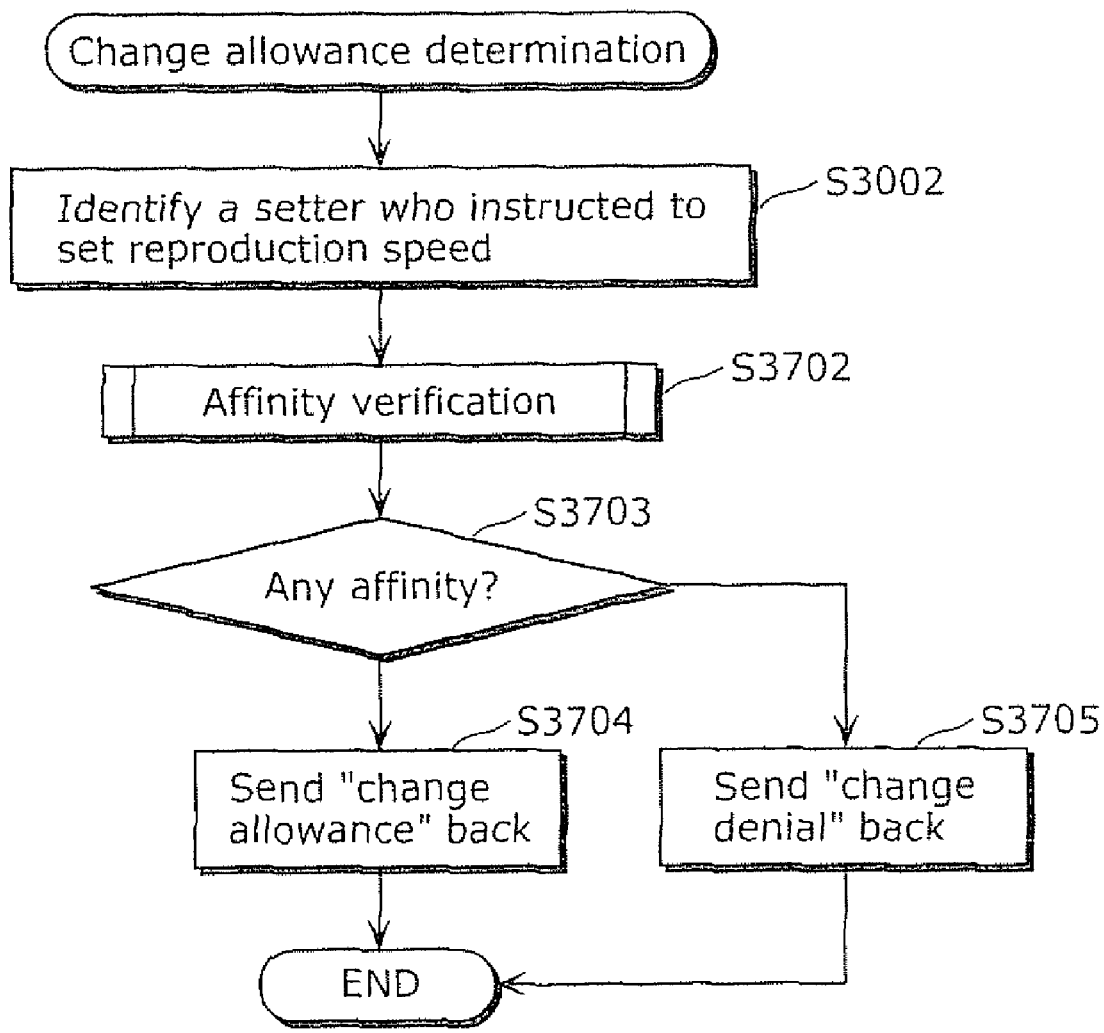
FIG. 37 is a flowchart according to the fifth embodiment.

FIG. 37 is a flowchart which shows a procedure of "change allowance determination" in the present embodiment. Same reference numbers are used for the processes same as in FIG. 30 and the redundant explanations are therefore omitted.

The moving picture trick play management unit 2501 specifies a new setter (S3002), and performs affinity verification based on the information about the new setter (S3702). Details of affinity verification are given later. Next, a return value of the affinity verification is determined (S3703). When it is determined that there is no affinity as the result of the affinity verification, the determination result of "change denial" is sent back (S3705), and the processing is terminated. When it is determined that there is affinity, the determination result of "change allowance" is sent back (S3704), and the processing is terminated.

Here, it is assumed that the moving picture trick play management unit 2501 retains a list for identifying a setter that receives an instruction to set reproduction speed (hereinafter, referred to as a determination list). Details of determination list are given later.

Figure 38:
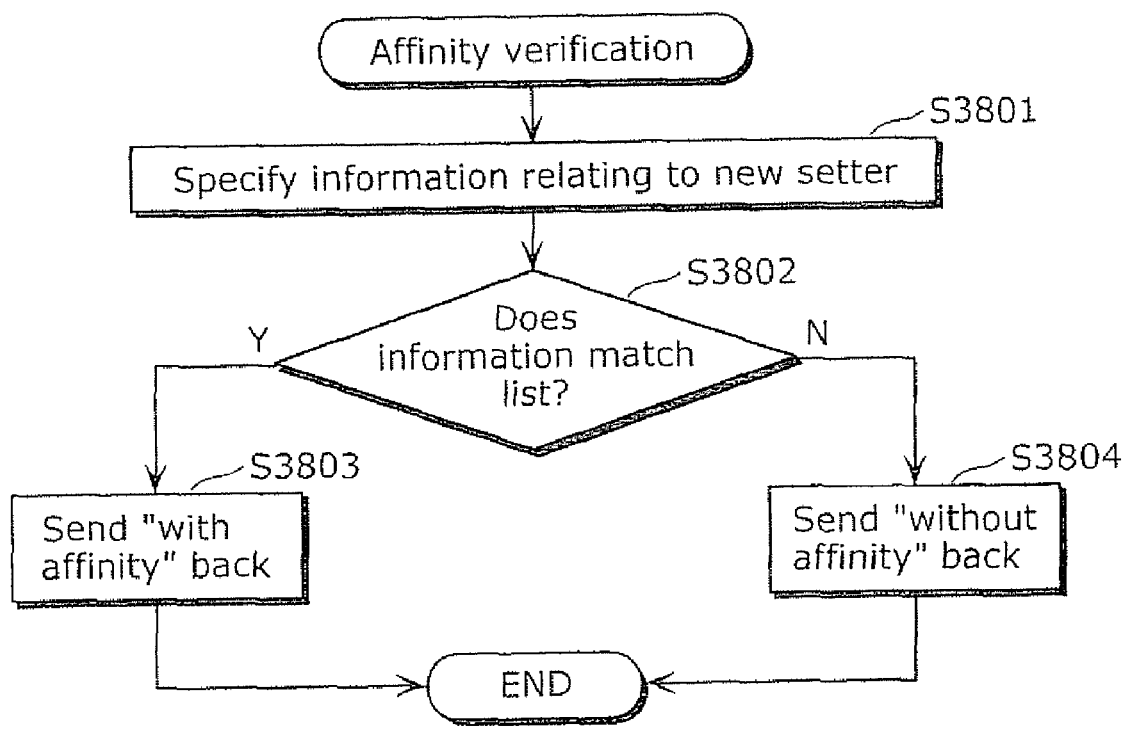
FIG. 38 is a flowchart according to the fifth embodiment.

Next, processing of affinity verification (S3702) is described. FIG. 38 is a flowchart which shows a procedure of the affinity verification. It should be noted that same reference numbers are used for the processes same as in FIG. 30 and the redundant explanations are therefore omitted.

The moving picture trick play management unit 2501 specifies information relating to a new setter (S3801). It is determined whether or not the specified information matches the information in the determination list (S3802). When determining that it matches the information in the determination list, the moving picture trick play management unit 2501 sends the determination result of "with affinity" back (S3803), and terminates the processing. When determining that it is not matching the information in the determination list, the moving picture trick play management unit 2501 sends the determination result of "without affinity" back (S3804), and terminates the processing.

Here, it is described in detail about the determination list retained by the moving picture trick play management unit 2501. Details included in the determination list are information necessary for determining whether or not the information specified in S3801 matches.

Figure 39:
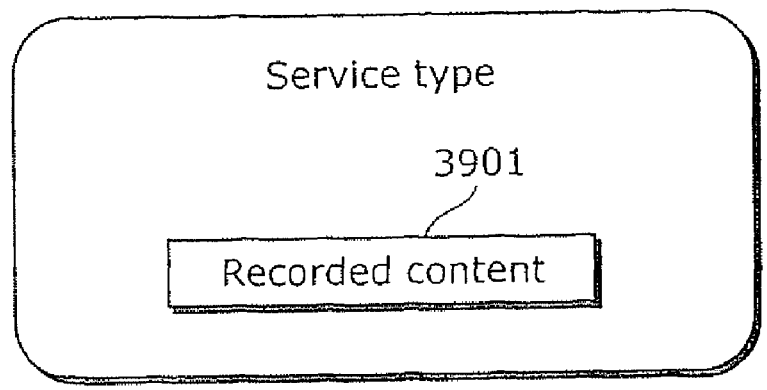
FIG. 39 shows an example of information stored in the primary storage unit 511 according to the present invention.

FIG. 39 is a diagram which schematically shows one example of the determination list in the case where information relating to the service to which the setter belongs in S3801 and a determination is made based on the specified information. Here, "Recorded content" is retained as a service type 3901. In this case, referring to FIG. 38, in the processing in S3801, it is determined that the specified information matches the information in the determination list only in the case where the service type of the service to which the new setter belongs is "Recorded content". It should be noted that, while only the "Recorded content" is retained as a service type in here, plural service types may be retained. Furthermore, other service types that are different from the "Recorded content" may be stored as long as the service manager 1003 can identify. Note that, in the case where plural service types are retained, it is determined that the specified information matches the information in the determination list if the information matches at least one of the service types included therein.

Figure 40:
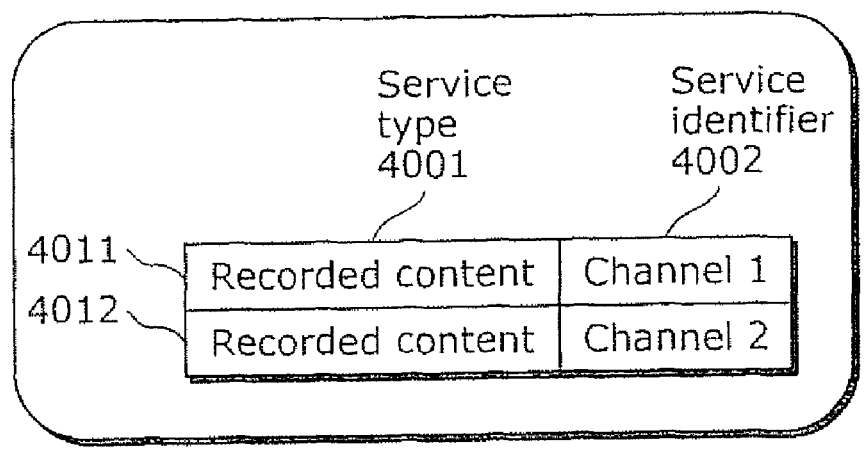
FIG. 40 shows an example of information stored in the primary storage unit 511 according to the present invention.

FIG. 40 is a diagram which schematically shows one example of a determination list retained by the moving picture trick play management unit 2501.

A column 4001 describes service types and a column 4002 describes service identifiers. A row 4011 and a row 4012 respectively indicate a service that is being reproduced and managed. Furthermore, the service indicated in the row 4011 has "Recorded content" as the service type 4001 and "Channel 1" as the service identifier 4002. Furthermore, the service indicated in the row 4012 has "Recorded content" as the service type 4001 and "Channel 2" as the service identifier 4002.

In this case, referring to FIG. 38, it is determined that, in the processing in S3801, the information is included in the list only in the case where the service type of the service to which a new setter belongs is "Recorded content" and the service identifier is "Channel 1" or "Channel 2". It should be noted that the determination list can include information other than service types or service identifiers. In such case, in the processing in S3801, the determination for determining whether or not the information is included in the determination list remains the same while details of the list change in accordance with the details of the list.

Figure 41:
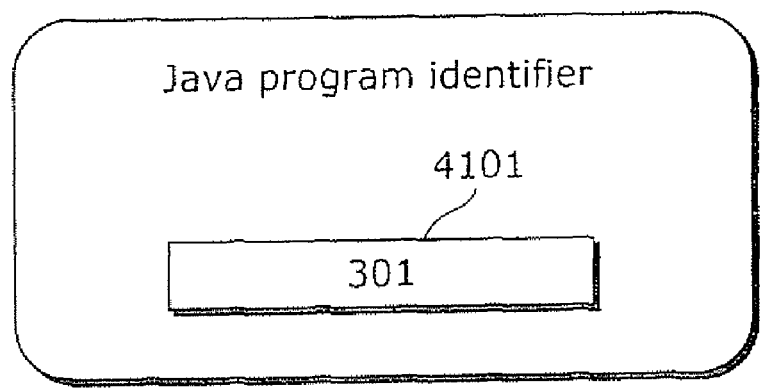
FIG. 41 shows an example of information stored in the primary storage unit 511 according to the present invention.

Next, an example in which determination is performed using a Java program identifier as information relating to a new setter is described. FIG. 41 is a diagram which schematically shows one example of the determination list used for determination to be performed using a Java program identifier. Here, the determination list retains "301" as a Java program identifier 4101. In this case, referring to FIG. 38, it is determined, in the processing in S3801, that the specified information matches the information in the determination list only in the case where the Java program identifier relating to the new setter is "301". It should be noted that, while only "301" is retained as the Java program identifier in this case, plural Java program identifiers may be retained, and, in addition, a range can be specified (for example, a range from 301 to 310).

It should be also noted that the present invention can be realized even in the case where details of the determination list retained by the moving picture trick play management unit 2501 cannot be updated since previously determined values have been already stored.

Furthermore, the present invention can be realized even when the details are updated halfway through the processing.

As the case of updating the details halfway through the processing, for example, it is possible to add or replace information of a service instructed to the JMF 1005*a* from the service manager 1004.

Furthermore, it is possible to refuse all setting instructions by not putting anything in the determination list.

In addition, the details may be dynamically changed in accordance with an operation situation, for example, by setting, to a determination list, a service to which an application having the highest priority level among the applications managed by the AM 1005*b* belongs.

It should be noted that the external unit may be allowed to refer to or update the details of the determination list. In this case, some restrictions (for example, a priority level, a Java program identifier, an authorization retained by an application, and the like) may be provided.

Accordingly, in a status where normal reproduction is set, it is realized to receive a request from any setters and, in the status where trick play is set, it is realized to receive, from only the setter which matches the information in the determination list, a setting instruction of reproduction speed/time. Therefore, it is possible to prevent an occurrence of situation in which a reproduction status is changed by another new setter while the old setter is performing trick play.

Sixth Embodiment

Differing from the first to fifth embodiments, the present embodiment is characterized in that change allowance determination is performed despite the details of the retained reproduction speed (TB) in a procedure at which the moving picture trick play management unit 2501 receives an instruction to set a reproduction speed from the external unit as shown in FIG. 29.

The configuration of hardware in the present embodiment is same as the one in the first embodiment, so that a redundant explanation is omitted. Specifically, it is the hardware configuration shown in FIG. 5. In addition, the configuration of software in the present embodiment is same as the one in the first embodiment, so that redundant explanations are omitted. Specifically, it is the software configuration shown in FIG. 10. Furthermore, the operations of hardware and software are same as those explained using FIGS. 1 to 26 in the first embodiment, except operations of the moving picture trick play management unit 2501 performed upon receiving a setting instruction of reproduction speed from the external unit, so that redundant explanations are omitted.

Figure 42:
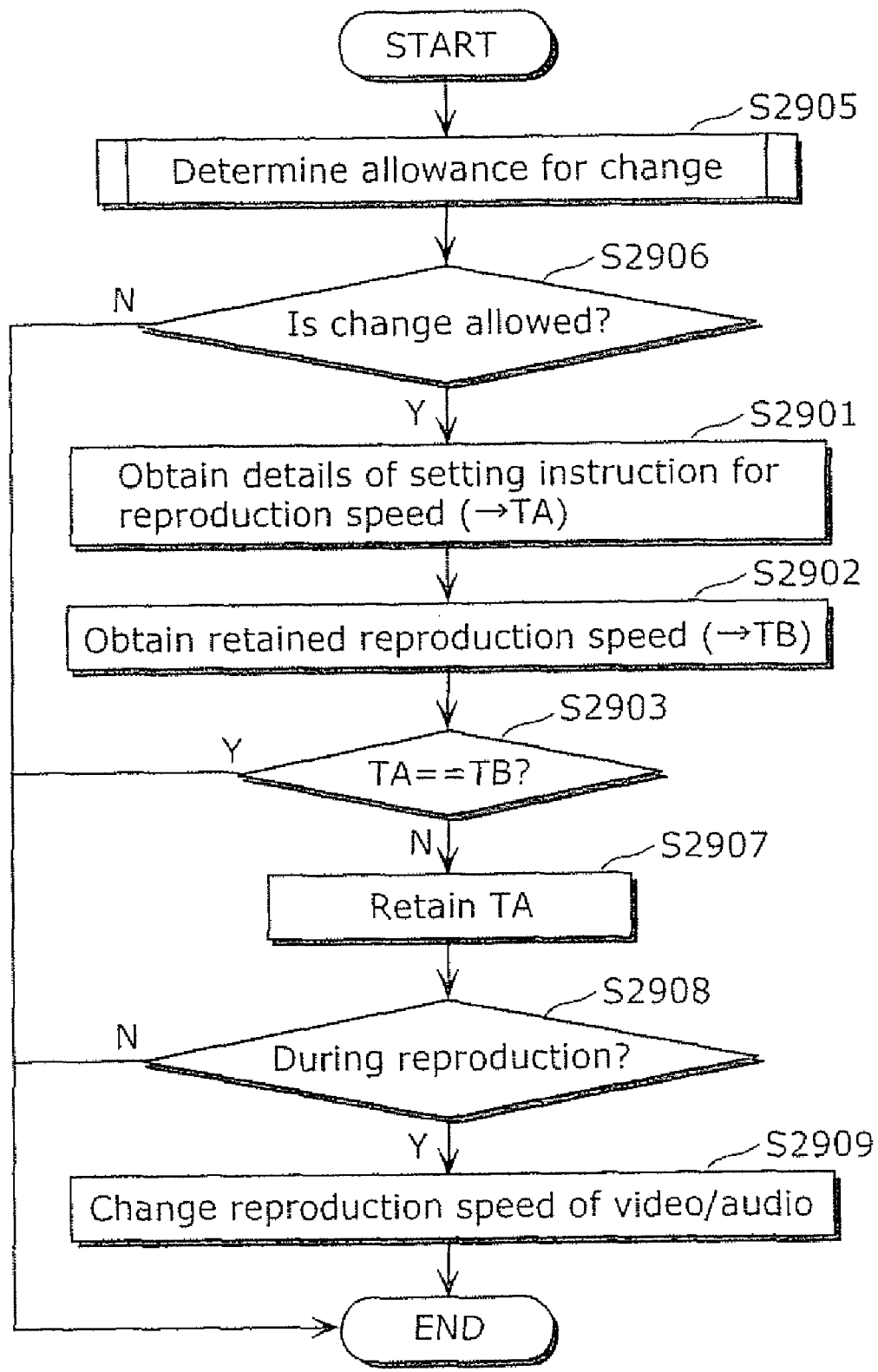
FIG. 42 is a flowchart according to the sixth embodiment.

FIG. 42 is a flowchart, in the present embodiment, which shows a procedure at which the moving picture trick play management unit 2501 receives an instruction to set reproduction speed from the external unit. Same reference numbers are used for the processes same as in FIG. 29 and the explanations are therefore omitted in here.

The moving picture trick play management unit 2501 receives an instruction to set reproduction speed from the external unit, and determines whether or not a change is allowed (S2905). The details about the change allowance determination are applicable to a process described in any one of the first to fifth embodiments, so that the explanations are omitted in here. The moving picture trick play management unit 2501 determines a return value in S2905 (S2906), and when determining that change is not allowed in S2905, terminates the processing. When determining that change is allowed, the moving picture trick play management unit 2501 obtains details of an instruction to set reproduction speed received from the external unit (S2901), obtains reproduction speed that has been stored in the primary storage unit 511 (S2902), and compares the obtained details and reproduction speed for determining whether or not they are the same (S2903). The processing is terminated when they are the same. When they are different from each other, the details stored in the primary storage unit 511 are replaced to the details obtained in S2902 (S2907). Next, the moving picture trick play management unit 2501 inquires the moving picture reproduction processing unit 2502 about a reproduction status, and determines whether or not the result indicates that the reproduction is being performed (S2908). When it does not indicate that the reproduction is being performed, the processing is terminated. When it indicates that the reproduction is being performed, the moving picture trick play management unit 2501 instructs a reproduction speed to the moving picture reproduction processing unit 2502 (S2909). Accordingly, the instruction to set reproduction speed from the external unit is reflected to a reproduction status of video and audio.

Consequently, it can be prevented to cause situation in which an unexpected new setter changes a reproduction situation, by performing change allowance determination described in the first to fifth embodiments, despite the fact whether or not normal reproduction is set.

Seventh Embodiment

Differing from the first to sixth embodiments, the present embodiment is characterized in that whether or not an instruction to set a reproduction speed is accepted is determined in advance before an instruction to set reproduction speed is made.

The configuration of hardware in the present embodiment is same as the one in the first embodiment, so that redundant explanations are omitted. Specifically, it is the hardware configuration shown in FIG. 5. In addition, the configuration of software in the present embodiment is same as the one in the first embodiment, so that redundant explanations are omitted. Specifically, it is the software configuration shown in FIG. 10. Furthermore, the operations of hardware and software are same as those explained using FIGS. 1 to 26 in the first embodiment, except points that the moving picture trick play management unit 2501 performs recording reservation allowance determination processing and that different operations of change allowance determination of reproduction speed are performed, so that redundant explanations are omitted.

FIG. 43 is a method of Java which shows one example of a unit of processing a recording reservation request. A reserve method accepts a recording reservation request. A release method accepts a request to release the recording reservation status.

In the present embodiment, it is described about the case where the moving picture trick play management unit 2501 has units shown as examples in FIG. 43.

Figure 44:
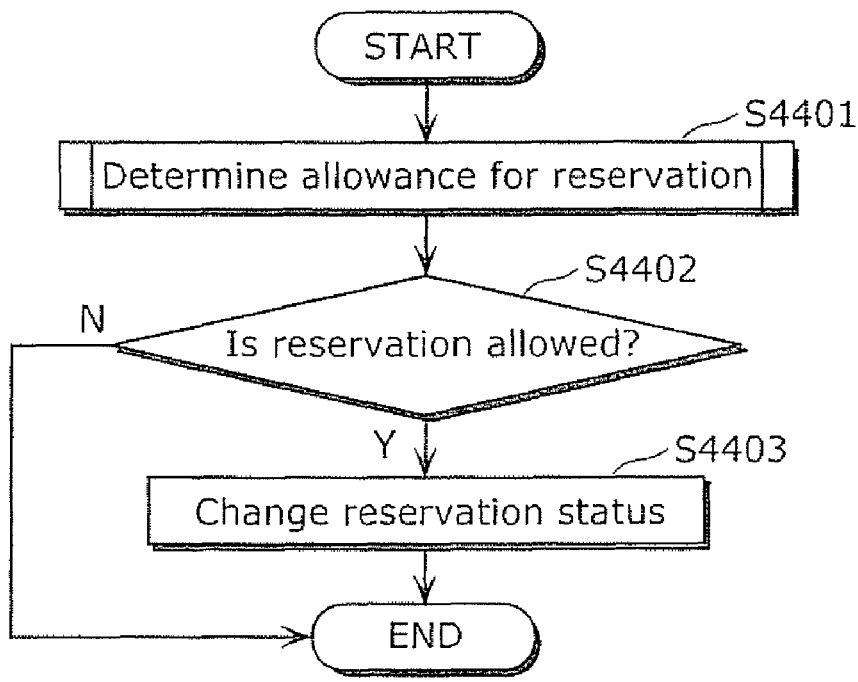
FIG. 44 is a flowchart according to the seventh embodiment.

FIG. 44 is a flowchart which shows a procedure of recording reservation processing performed by the moving picture trick play management unit 2501 in the case where a setter makes a recording reservation request to the moving picture trick play management unit 2501 in order to predetermine whether or not to receive an instruction to set reproduction speed.

The moving picture trick play management unit 2501 receives a recording reservation request from a setter and performs recording reservation allowance determination (S4401). Next, it determines a return value of a recording reservation allowance determination (S4402). Details of recording reservation allowance determination are given later. As the result of recording reservation allowance determination, the moving picture trick play management unit 2501 terminates the processing when the determination result of "reservation denial" is sent back. In this case, it indicates that a setter which sent a recording reservation request could not program the recording. In S4401, the moving picture trick play management unit 2501 changes the recording reservation status (S4403) when the determination result of "reservation allowance" is sent back, and terminates the processing. In this case, it indicates that a setter which sent a recording reservation request could program the recording. It should be noted that the setter (in other words, the setter which could program the recording) which sent a recording reservation request herein is referred to as a reservation holder. This case also indicates that, for the reservation holder which has previously programmed the recording reservation, the recording reservation is taken by another new reservation holder. Therefore, it may be notified to the previous reservation holder that the recording reservation has been taken by another reservation holder.

It should be noted that, in S4403, the setter indicates the setter which programmed the recording so that S4403 is same as in the case where information relating to the setter which programmed the recording is retained in S3005 according to the first embodiment.

It should be also noted that the result about whether or not the recording reservation has been programmed may be notified to the setter which sent a recording reservation request. With respect to the notification method, the present invention can be realized using any type of method such as an exceptional mechanism in Java™ language that is a publicly-known technique and a return value of method.

Figure 45:
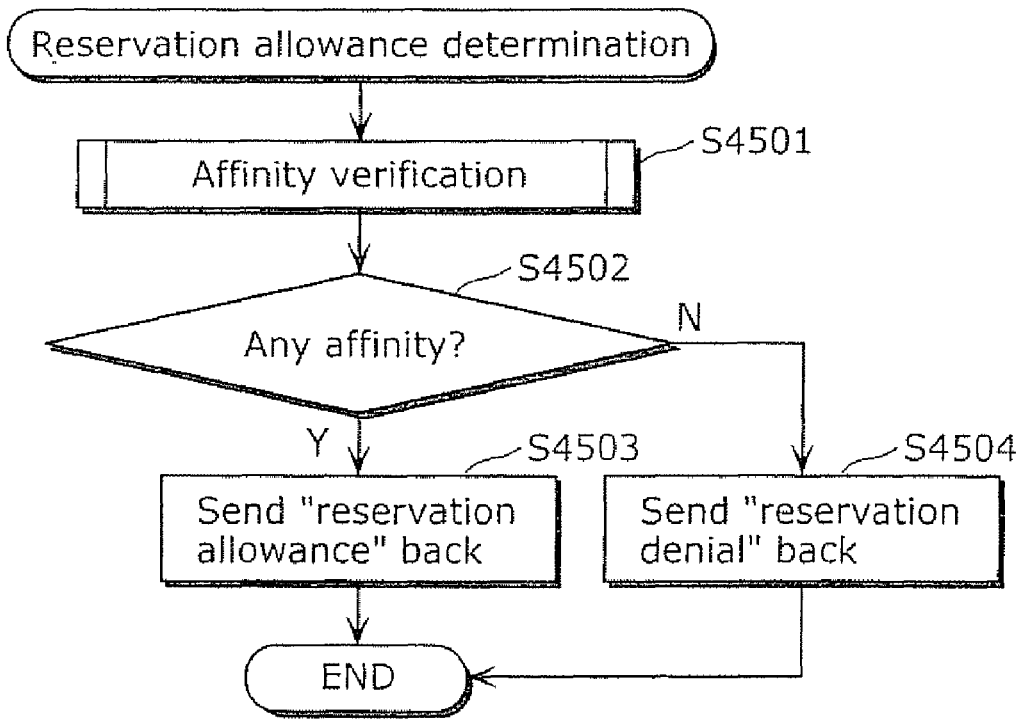
FIG. 45 is a flowchart according to the seventh embodiment.

FIG. 45 is a flowchart which shows a detailed procedure of the "recording reservation allowance determination (S4401)".

A moving picture trick play management unit 2501 performs affinity verification (S4501). Details about the affinity verification can be realized by applying any one of the affinity verifications described in the first to sixth embodiments. As the result in S4501, the moving picture trick play management unit 2501 determines whether or not the determination result of "with affinity" is sent back (S4502), sends "reservation allowance" back in the case of "with affinity" (S4503), and terminates the processing. In the case of "without affinity", it sends "reservation denial" back (S4504), and terminates the processing.

Next, in the present embodiment, it is described about a procedure performed at the time when the moving picture trick play management unit 2501 receives an instruction to set reproduction speed from the external unit.

The procedure at the time when the moving picture trick play management unit 2501 receives an instruction to set reproduction speed from the external unit follows the flowcharts of FIG. 29 in the first embodiment and of FIG. 42 in the sixth embodiment. However, "change allowance determination (S2905)" in FIG. 29 and FIG. 42 is different in the present embodiment.

Figure 46:
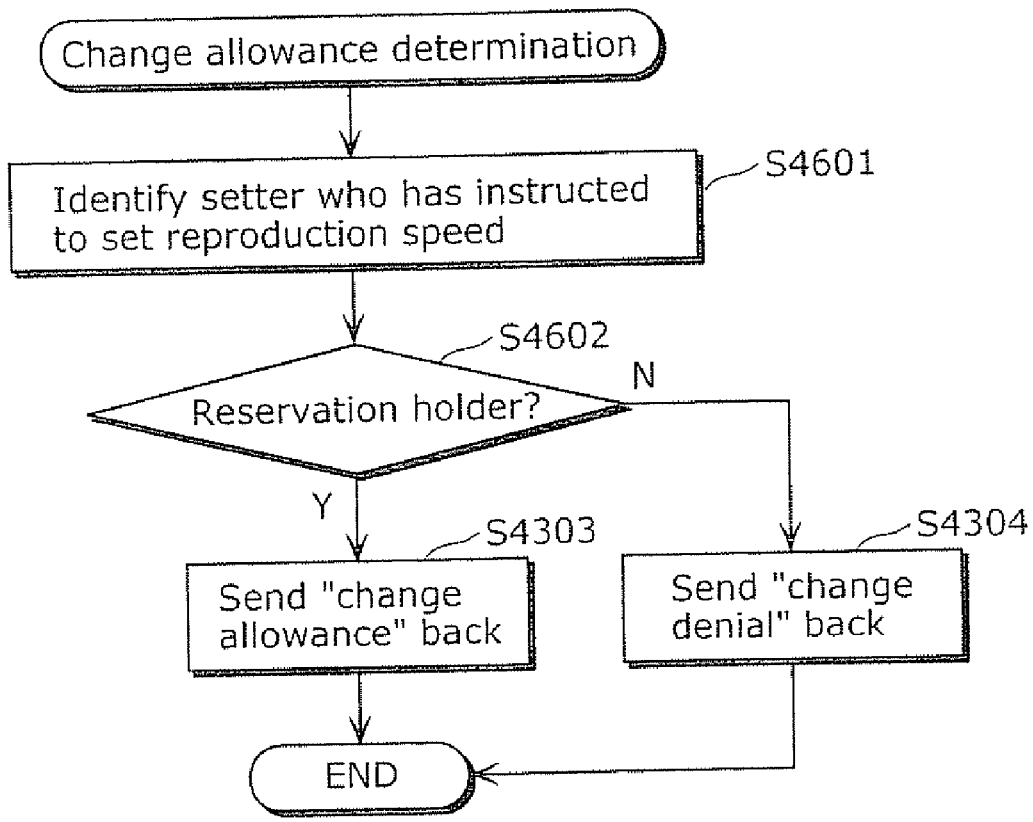
FIG. 46 is a flowchart according to the seventh embodiment.

FIG. 46 is a flowchart which shows a detailed procedure of the "change allowance determination (S2905)" in the present embodiment.

Figure 47:
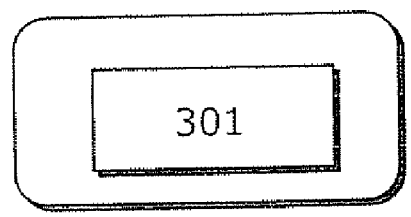
FIG. 47 shows an example of information stored in the primary storage unit 511 according to the present invention.

First, the moving picture trick play management unit 2501 specifies a setter which has instructed to change reproduction speed (S4601). It should be noted that the specific method of specifying a setter is same as described in the above. Next, the moving picture trick play management unit 2501 determines whether or not the specified setter is a reservation holder (S4602). The specific determination method can be realized, for example, by storing a Java program identifier of the reservation holder in the primary storage unit 511 in S3005, and comparing the stored Java program identifier of the reservation holder with a Java program identifier of the setter in S4601. FIG. 47 is a diagram which schematically shows one example of a state in which the moving picture trick play management unit 2501 stores, in the primary storage unit 511, "301" as a Java program identifier of a reservation holder.

In S4602, when determining that the setter is the reservation holder, the moving picture trick play management unit 2501 sends "change allowance" back (S4603), and terminates the processing. When determining that the setter is not the reservation holder, the moving picture trick play management unit 2501 sends "change denial" back (S4604), and terminates the processing.

It should be noted that, whereas an example of determination processing using Java program identifiers was shown in the above, the present invention can be realized using any type of information attached to a setter, as long as the information is sufficiently enough for the determination processing in S4502.

For example, it is described, as another format, about the case where determination is performed based on a service to which a setter belongs.

In this case, in S4602, information relating to the service to which the setter belongs is obtained and used for comparison. It can be realized, for example, by previously storing, in the primary storage unit 511, a service identifier of the service to which the reservation holder belongs in S3005, and comparing the stored service identifier of the reservation holder with a service identifier of a service to which the setter belongs in S4601.

Figure 48:
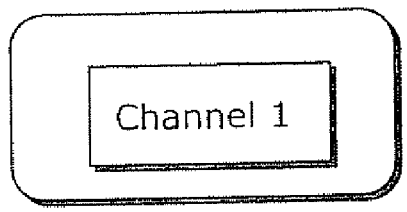
FIG. 48 shows an example of information stored in the primary storage unit 511 according to the present invention.

FIG. 48 is a diagram which schematically shows one example of a state in which the moving picture trick play management unit 2501 stores, in the primary storage unit 511, "Channel 1" as a service identifier of a service to which a reservation holder belongs.

Further, a unit other than the moving picture trick play management unit 2501 (that is, in the case where units shown as an example in FIG. 43 are included in a unit other than the moving picture trick play management unit 2501) performs recording reservation processing (recording reservation processing shown in FIG. 44 and FIG. 45 or a part of the processing) and determination in S4602, while the moving picture trick play management unit 2501 may request the unit to perform determination in S4602, and judge only the determination result.

Figure 49:
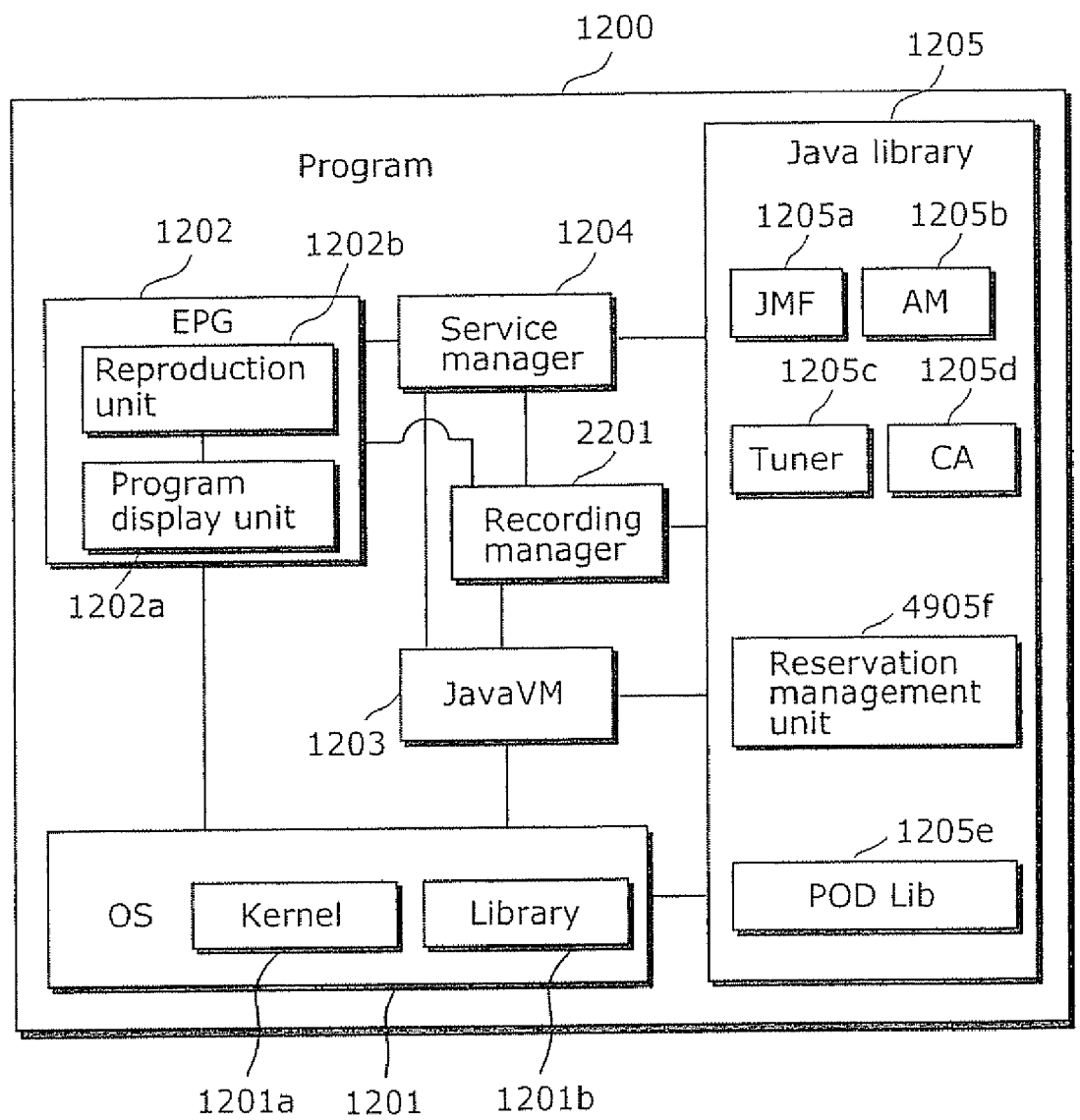
FIG. 49 is a diagram showing a configuration of a terminal apparatus in the cable television system according to the eighth embodiment.

For example, by placing a new reservation management unit in the Java library 1005, the new reservation management unit may perform recording reservation processing and determination in S4602. FIG. 49 is a block diagram in the case where the reservation management unit 4905*f* is included in the Java library 1005. In this case, the setter sends a recording reservation request not to the moving picture trick play management unit 2501 but to the reservation management unit 4905*f*, in order to decide whether or not an instruction to set reproduction speed is previously received. When receiving the recording reservation request sent from the setter, the reservation management unit 4905*f* performs processing following the flowcharts shown in FIG. 44 and FIG. 45.

It should be noted that, in the case of a program such as the service manager 1004 and the recording manager 1210 which can be instructed from the JMF 1005*a*, the present invention can be realized by including the processing of the reservation management unit 4905*f* in the program and using the program as the reservation management unit 4905.

Accordingly, the setter which could make recording reservation processing can always change reproduction speed and can prevent an occurrence of situation in which a reproduction status is changed by another setter as long as the recording reservation is not taken by the another setter.

Eighth Embodiment

The present embodiment is characterized in that AIT or XAIT determines whether or not to allow changing reproduction speed.

The configuration of hardware in the present embodiment is same as the one in the first embodiment, so that redundant explanations are omitted. Specifically, it is the hardware configuration shown in FIG. 5. In addition, the configuration of software in the present embodiment is same as the one in the first embodiment, so that redundant explanations are omitted. Specifically, it is the software configuration shown in FIG. 10. Furthermore, the operations of hardware and software are same as those explained using FIGS. 1 to 26 in the first embodiment, except that configurations of AIT and XAIT are different and that change allowance determination procedure of reproduction speed by the moving picture trick play management unit 2501 is different, so that redundant explanations are omitted.

FIG. 50 shows one example of AIT which includes a reproduction speed change allowance flag 5001 in addition to details of the AIT shown in FIG. 19.

Figure 51:
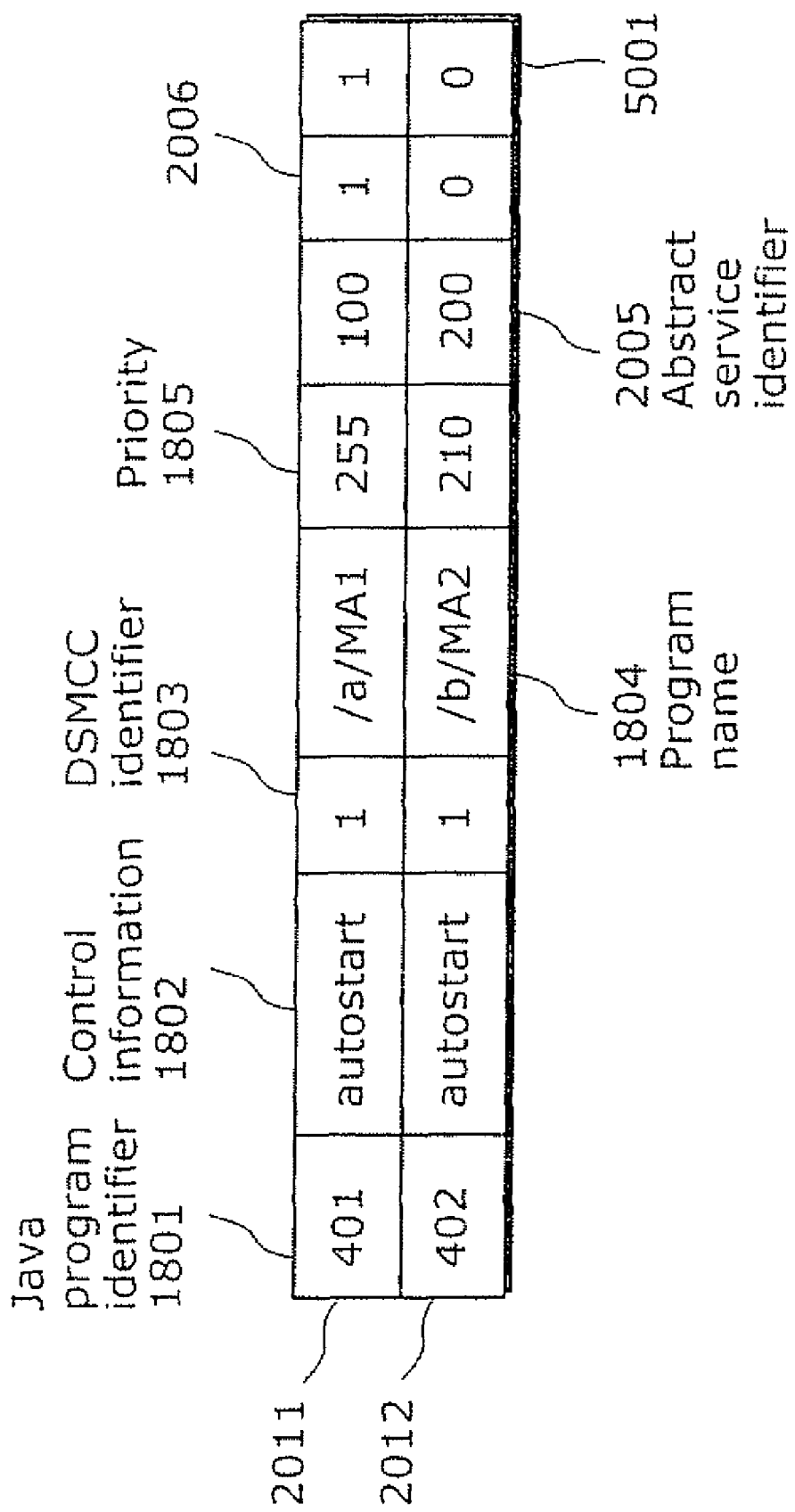
FIG. 51 is diagram which shows an example of an XAIT according to the eighth embodiment.

FIG. 51 shows an example of AIT which includes a reproduction speed change allowance flag 5001 in addition to details of the XAIT shown in FIG. 21.

In the present embodiment, it is assumed that applications to be started are all started by the AM 1005b based on the information shown in FIG. 50 or FIG. 51. While the moving picture trick play management unit 2501 performs processing shown in FIG. 29 or FIG. 42 when receiving an instruction to set reproduction speed from the external unit, the processing of "change allowance determination (S2905)" is different in the present embodiment.

Figure 52:
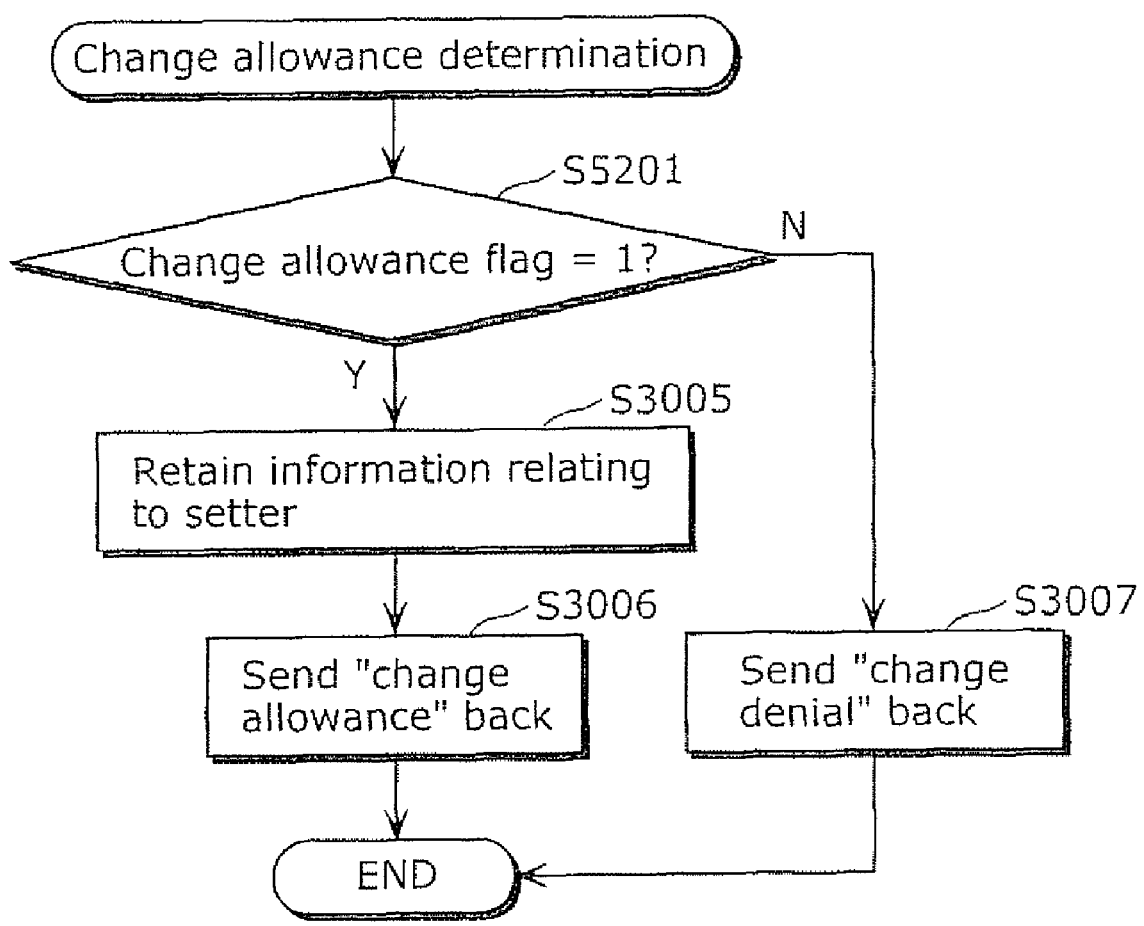
FIG. 52 is a flowchart according to the eighth embodiment.

FIG. 52 is a flowchart which shows detailed processing of the "change allowance determination (S2905)" in the present embodiment. Same reference numbers are used for the processes same as in FIG. 30 and the explanations about the same processes are therefore omitted.

The moving picture trick play management unit 2501 obtains a change allowance flag relating to a setter, and determines whether or not the obtained change allowance flag is 1 (S5201). Note that, while the above judgment is made based on the information of 1, any type of information that is different from 1 can be used to realize the above processing as long as the information can be used for change allowance determination. When the change allowance flag is 1, the moving picture trick play management unit 2501 stores information relating to the setter (S3005), sends the determination result of "change allowance" back (S3006), and terminates the processing. When the change allowance flag is not 1, the moving picture trick play management unit 2501 sends the determination result of "change denial" back (S3007), and terminates the processing.

Accordingly, it can be determined whether or not an instruction to set reproduction speed can be allowed according to change allowance flags included in AIT or XAIT. Therefore, it can be learned in advance about whether or not there are possibilities that the reproduction speed is to be changed by another new setter, and that to which set value the reproduction speed is changed.

Ninth Embodiment

The present embodiment is characterized in that a change of reproduction speed can be instructed by instructing to start reproduction of the recorded content and that a change of reproduction speed cannot be instructed by instructing to stop the reproduction of the recorded content.

The configuration of hardware in the present embodiment is same as the one in the first embodiment, so that redundant explanations are omitted. Specifically, it is the hardware configuration shown in FIG. 5. In addition, the configuration of software in the present embodiment is same as the one in the first embodiment, so that redundant explanations are omitted. Specifically, it is the software configuration shown in FIG. 10. Furthermore, the operations of hardware and software are same as those explained using FIGS. 1 to 26 in the first embodiment, except that operations of the moving picture reproduction processing unit 2502 at the time of reproduction start and ending instructions are different and that operations of the moving picture trick play reproduction management unit 2501 for the change allowance determination of reproduction speed are different, so that redundant explanations are omitted.

When an application instructs to start video/audio reproduction by a start method of the moving picture trick play processing unit 2502, in addition to the operations described in the first embodiment, the moving picture trick play processing unit 2502 stores, into the primary storage unit, a Java program identifier for identifying the application which has called the start method. Accordingly, the application reserves an instruction to set reproduction speed of the content which has been started reproducing by the start method, that is, the application has a right to change the reproduction speed of the current content. On the other hand, when the application which has called said start instructs to terminate the reproduction of video/audio by the close method of the moving picture reproduction processing unit 2502, in addition to the operations described in the first embodiment, the moving picture playback processing unit 2502 deletes a Java program identifier for identifying the application which has called the start method stored in the primary storage unit.

Accordingly, the application releases the reservation of the instruction of setting the reproduction speed of the content which has started the reproduction by the start method, that is, the application abandons the right to change the reproduction speed of the current content. Other operations of the moving picture reproduction processing unit 2502 are same as those described in the first embodiment.

FIG. 46 is a flowchart which shows a detailed procedure of the "change allowance determination (S2905)" performed by the moving picture trick play management unit 2501 in the present embodiment. Except the operation of the change allowance determination, the moving picture trick play management unit 2501 of the present embodiment is same as the moving picture trick play management unit in the first embodiment. It should be noted that, while FIG. 46 is used in the seventh embodiment, it is used again in the present embodiment.

First, the moving picture trick play management unit 2501 identifies a setter, in other words, an application, which has made an instruction to change reproduction speed (S4601). It should be noted that the specific method of identifying the setter is same as described in the above. Next, the moving picture trick play management unit 2501 determines whether or not the identified setter is a reservation holder (S4602). The specific determination method can be realized, for example, by comparing the Java program identifier of the reservation holder recorded in the primary storage unit 511 by the moving picture processing unit 2502 with the Java program identifier of the setter identified in S4601.

In S4602, when determining that the identified setter is a reservation holder, the moving picture trick play management unit 2501 sends "change allowance" back (S4603), and terminates the processing.

It should be noted that, while an example of determination processing using Java program identifiers are shown in the present embodiment, the present invention can be realized using any type of information attached to the setter unless there are sufficient information for the determination processing in S4502.

For example, as another method, it is described a case where the determination is performed based on services to which setters belong.

In this case, in S4602, the information relating to the services to which the setters belong are obtained and compared. For example, it can be realized by which the moving picture reproduction processing unit stores, in the primary storage unit 511, a service identifier of the service to which the reservation holder belongs, and the moving trick play management unit 2501 compares, in S4601, said service identifier with the service identifier to which a setter belongs.

Accordingly, only the setter that has successfully made a recording reservation by the reproduction start instruction of a content can change the reproduction speed and the occurrence of situation in which the reproduction status is changed by another setter can be prevented as long as the reservation is not taken by another setter.

Tenth Embodiment

The present embodiment is characterized in that a change of reproduction speed can be instructed by instructing a service manager to select a recorded content, and that a change of reproduction speed cannot be instructed by instructing the service manager to cancel the selection of the recorded content.

The configuration of hardware in the present embodiment is same as the one in the first embodiment, so that redundant explanations are omitted. Specifically, it is the hardware configuration shown in FIG. 5. In addition, the configuration of software in the present embodiment is same as the one in the first embodiment, so that redundant explanations are omitted. Specifically, it is the software configuration shown in FIG. 10. Furthermore, the operations of hardware and software are same as those explained using FIGS. 1 to 26 in the first embodiment, except that operations of the service manager 1004 after selecting the content and that operations of the moving picture trick play reproduction management unit 2501 for the change allowance determination of reproduction speed are different, so that redundant explanations are omitted.

When the application selects and instructs a content recorded by the select (int channel) method of the service manager 1004, in addition to operations described in the first embodiment, the service manager 1004 stores, into the primary storage unit, a Java program identifier for identifying the application which has called the select method. Accordingly, the current application reserves an instruction to set reproduction speed of "Recorded content" which has started reproducing by the select method, in other words, the application has a right to change the reproduction speed of the current content.

On the other hand, in the case where the application which has called the aforementioned select instructs to cancel the selection of video/audio by instructing null to the channel parameter of the select (int channel) of the service manager 1004, in addition to operations described in the first embodiment, the service manager 1004 deletes the Java program identifier for identifying the application which has called the select method stored in the primary storage unit. Accordingly, the application releases a reservation of the instruction to set the reproduction speed of the "Recorded content" which has started being reproduced by the select method, that is, the application abandons the right to change the reproduction speed of the current content. Other operations of the service manager 1004 are same as in the first embodiment.

FIG. 46 is a flowchart which shows a detailed procedure of the "change allowance determination (S2905)" performed by the moving picture trick play management unit 2501 in the present embodiment. Except the operation of the change allowance determination, the moving picture trick play management unit 2501 of the present embodiment is same as the moving picture trick play management unit in the first embodiment. It should be noted that, while FIG. 46 is used in the seventh embodiment, it is used again in the present embodiment.

First, the moving picture trick play management unit 2501 identifies a setter, in other words, an application, which has made an instruction to change reproduction speed (S4601). It should be noted that the specific method of identifying the setter is same as described in the above. Next, the moving picture trick play management unit 2501 determines whether or not the identified setter is a reservation holder (S4602). The specific determination method can be realized, for example, by comparing the Java program identifier of the reservation holder recorded in the primary storage unit 511 by the service manager 1004, that is, the application which has called the select method and instructed to select "Recorded content", with the Java program identifier of the setter identified in S4601.

In S4602, when determining that the identified setter is a reservation holder, the moving picture trick play management unit 2501 sends "change allowance" back (S4603), and terminates the processing.

It should be noted that, while an example of determination processing using Java program identifiers are shown in the present embodiment, the present invention can be realized using any type of information attached to the setter unless there are sufficient information for the determination processing in S4502.

For example, as another method, it is described a case where the determination is performed based on services to which setters belong.

In this case, in S4602, the information relating to the services to which the setters belong are obtained and compared. For example, it can be realized by which the service manager 1004 stores, in the primary storage unit 511, a service identifier of the service to which the reservation holder belongs, and the moving trick play management unit 2501 compares, in S4601, said service identifier with the service identifier to which a setter belongs.

Accordingly, only the setter that has successfully made a reservation by the reproduction start instruction of a content can change the reproduction speed and the occurrence of situation in which the reproduction status is changed by another setter can be prevented as long as the reservation is not taken by another setter.

In the above, the first to ninth embodiments of the present invention were explained.

It should be noted that in the first to ninth embodiments, the present invention can be realized by applying any type of recording unit and a reproduction unit, as long as video and audio are reproduced included in a recorded content upon reproducing the recorded content, and in the case where the video and audio are included in an application, as long as the application is to be executed. Note that, in the all aforementioned embodiments, as another recording method, the outputs from the audio encoder 2101 and the video encoder 2102 may be stored in the second storage unit 510. In such case, one of the following processes is taken the output destinations of the audio encoder 2101 and the video encoder 2102 are previously determined as the second storage unit 510; and the CPU 154 instructs, to the audio encoder 2101 and the video encoder 2102, the secondary storage unit 510 as the output destination.

Furthermore, as another recording method, the CPU 154 can designate the multiplexer 2103 as the output destination for the audio encoder 2101 and the video encoder 2102.

Furthermore, as another recording method, the output from the QAM demodulation unit 501 may be directly recorded onto the secondary storage unit 510 without through the POD 504.

Furthermore, as another recording method, the output from the QAM demodulation unit 501 may be outputted to the TS decoder 505 without through the POD 504, the output from the TS decoder 505 may be inputted to the multiplexer 2103, and the output from the multiplexer 2103 may be recorded onto the secondary storage unit 510.

Note that, in the case where a content is recorded without through the POD 504 (in other words, in the case where there is a possibility that the content remains to be encoded), it is necessary to bypass the POD 504 at the stage of reproducing the recorded content.

It should be also noted that, as a recording method, the output from the multiplexer 2103 may be stored in the secondary storage unit 510. In such case, one of the following processes is taken: the output destination of the multiplexer 2103 is previously determined as the secondary storage unit 510; and the CPU 154 designates the secondary storage unit 510 as the output destination of the multiplexer 2103.

Furthermore, as another recording method, the CPU 154 can designate the secondary storage unit 510 as the output destination of the TS decoder 505.

Furthermore, as another recording method, the CPU 154 can designate the multiplexer 2103 as the output destination of the TS decoder 505, and the secondary storage unit 510 as the output destination of the multiplexer 2103.

Furthermore, in the case where information other than video and audio, for example, details of DSMCC including an application, are recorded, data to be stored from among the outputs from the TS decoder 505 are processed by the CPU 514 and then directly stored into the secondary storage unit 510.

Furthermore, it is possible that the data to be stored from among the outputs from the TS decoder 505 are outputted to the multiplexer 2103, the outputs are multiplexed by the multiplexer 2103 together with the outputs from the audio encoder 2101 and the video encoder 2102, and the resultants are stored in the secondary storage unit 510.

Note that, while a large-capacity medium such as a hard-disk and a DVD-RAM is preferred for the secondary storage unit 510, any medium is applicable as long as it is recordable.

Note that, the data treated as inputs and outputs of the TS decoder 505, the audio decoder 506, the video decoder 508, the audio encoder 2101, the video encoder 2102 and the multiplexer 2103 may be arbitrary encoded at an arbitrary stage.

The recorded contents may record the details included in the original contents (in other words, video, audio, application and the like) simultaneously with their relevance and additional information (for example, time and program information).

It should be noted that the present invention can be realized as long as the recorded contents can be reproduced despite recording methods and recording units.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The recording and reproduction apparatus (the moving picture reproduction apparatus) according to the present invention determines, in response to an instruction for normal reproduction or trick play, whether or not the instruction to be accepted in accordance with a rule. In the case of accepting the instruction, the moving picture reproduction apparatus includes a moving picture trick play management unit which retains details of the instruction and a moving picture reproduction processing unit which reproduces a moving picture based on the details retained by the moving picture trick play management unit, so that, in the moving picture reproduction by the digital television receiving device, the present invention can prevent occurrence of a reproduction status that is not expected by an application and the present invention is useful for increasing stability of operations of the application. Furthermore, the present invention can be applied for an increase of stability of operations of information devices controlled by software, such as not only a digital television but also a personal computer and a cellular phone.

What is claimed is:

1. A recording and reproduction apparatus which receives and records a content included in a broadcast wave, and executes an application program included in a predetermined service in parallel with reproduction of the recorded content, said recording and reproduction apparatus comprising:

a storage in which the received content and the application program are stored;

an executor operable to execute the application program;

a reproducer operable to reproduce the content stored in said storage; and a reproduction speed controller operable to receive a reproduction speed of the content requested by the application program, and to control a reproduction speed of the content to be reproduced by said reproducer so as to be in the received reproduction speed, wherein in the case where a first application program which has requested the reproduction speed of the content already accepted as a normal reproduction and a second application program which requests a new reproduction speed are different, when receiving the new reproduction speed request, said reproduction speed controller is operable to compare a priority level of the first application program with a priority level of the second application program, and to control the reproduction speed of the content so as to be in a reproduction speed requested by the application with a higher priority level.

2. A recording and reproduction method for receiving and recording a content included in a broadcast wave, and executing an application program included in a predetermined service in parallel with reproduction of the recorded content, said recording and reproduction method comprising:

storing the received content and the application program;

executing the application program;

reproducing the content stored in said storing; and receiving a reproduction speed of the content requested by the application program, and controlling a reproduction speed of the content to be reproduced in said reproducing so as to be in the received reproduction speed, wherein in the case where a first application program which has requested the reproduction speed of the content already accepted as a normal reproduction and a second application program which requests a new reproduction speed are different, when receiving the new reproduction speed request, said controlling includes comparing a priority level of the first application program with a priority level of the second application program.

and controlling the reproduction speed of the content so as to be in a reproduction speed requested by the application program with a higher priority level.

* * * * *

UNITED STATES PATENT AND TRADEMARK OFFICE
CERTIFICATE OF CORRECTION

PATENT NO. : 7,894,710 B2  
APPLICATION NO. : 11/420982  
DATED : February 22, 2011  
INVENTOR(S) : Y. Kawakami et al.

Page 1 of 1

It is certified that error appears in the above-identified patent and that said Letters Patent is hereby corrected as shown below:

At column 46, line 11 (claim 2, line 21) of the printed patent, change "program." to --program,--.

Signed and Sealed this
Fourteenth Day of June, 2011

David J. Kappos
*Director of the United States Patent and Trademark Office*